US010332206B2

(12) United States Patent
Studnitzer et al.

(10) Patent No.: US 10,332,206 B2
(45) Date of Patent: Jun. 25, 2019

(54) TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE

(71) Applicant: Chicago Mercantile Exchange Inc., Chicago, IL (US)

(72) Inventors: Ari Studnitzer, Chicago, IL (US); Zachary Bonig, Chicago, IL (US); Ryan Eavy, Chicago, IL (US); Frank Kmiec, Chicago, IL (US); Barry Galster, Chicago, IL (US); Paul Callaway, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 556 days.

(21) Appl. No.: 14/074,668

(22) Filed: Nov. 7, 2013

(65) Prior Publication Data
US 2015/0127514 A1 May 7, 2015

(51) Int. Cl.
*G06Q 40/00* (2012.01)
*G06Q 40/04* (2012.01)
(52) U.S. Cl.
CPC .................... *G06Q 40/04* (2013.01)
(58) Field of Classification Search
CPC ........ G06Q 40/00; G06Q 40/04; G06Q 40/02; G06Q 40/06; G06Q 40/025
USPC ...................................... 705/37, 35
See application file for complete search history.

(56) References Cited

U.S. PATENT DOCUMENTS

| 7,636,703 | B2 | 12/2009 | Taylor |
| 7,840,482 | B2 | 11/2010 | Singla et al. |
| 7,921,046 | B2 | 4/2011 | Parsons et al. |
| 7,954,114 | B2 | 5/2011 | Chamberlain et al. |
| 8,027,904 | B2 * | 9/2011 | O'Callahan ..................... 705/37 |
| 8,069,102 | B2 | 11/2011 | Indeck et al. |
| 8,407,122 | B2 | 3/2013 | Parsons et al. |
| 8,458,081 | B2 | 6/2013 | Parsons et al. |

(Continued)

FOREIGN PATENT DOCUMENTS

| WO | 2008154306 | 12/2008 |
| WO | 2011134975 | 11/2011 |
| WO | 2012079041 | 6/2012 |

OTHER PUBLICATIONS

Investopedia ("What is a stripped bond?" Investopedia http://www.investopedia.com/ask/answers/127.asp Apr. 28, 2007).*

(Continued)

*Primary Examiner* — Bruce I Ebersman
*Assistant Examiner* — Mark H Gaw
(74) *Attorney, Agent, or Firm* — Lempia Summerfield Katz LLC

(57) ABSTRACT

The disclosed embodiments relate to implementation of a trading system, which may also be referred to as a trading system architecture, having improved performance which further assures transactional determinism under increasing processing transaction loads while providing improved trading opportunities, fault tolerance, low latency processing, high volume capacity, risk mitigation and market protections with minimal impact, as well as improved and equitable access to information and opportunities.

26 Claims, 25 Drawing Sheets

(56) References Cited

U.S. PATENT DOCUMENTS

| | | | |
|---|---|---|---|
| 8,548,900 B1 | 10/2013 | Glackin et al. | |
| 2005/0149428 A1 | 7/2005 | Gooch et al. | |
| 2006/0106707 A1* | 5/2006 | Shetty et al. | 705/37 |
| 2006/0253354 A1* | 11/2006 | O'Callahan | G06Q 40/00 705/35 |
| 2007/0100732 A1* | 5/2007 | Ibbotson | G06Q 40/04 705/37 |
| 2007/0118460 A1* | 5/2007 | Bauerschmidt | G06Q 10/10 705/37 |
| 2008/0010183 A1* | 1/2008 | Holmes et al. | 705/37 |
| 2008/0126853 A1 | 5/2008 | Callaway et al. | |
| 2009/0012892 A1* | 1/2009 | Biase | 705/37 |
| 2009/0182683 A1 | 7/2009 | Taylor et al. | |
| 2009/0287628 A1 | 11/2009 | Indeck et al. | |
| 2010/0017321 A1* | 1/2010 | Callaway et al. | 705/37 |
| 2010/0153254 A1* | 6/2010 | Shalen | 705/37 |
| 2010/0241758 A1 | 9/2010 | Oddie et al. | |
| 2011/0145447 A1 | 6/2011 | Dimond | |
| 2011/0178911 A1 | 7/2011 | Parsons et al. | |
| 2011/0178912 A1 | 7/2011 | Parsons et al. | |
| 2011/0178917 A1 | 7/2011 | Parsons et al. | |
| 2011/0178918 A1 | 7/2011 | Parsons et al. | |
| 2011/0178919 A1 | 7/2011 | Parsons et al. | |
| 2011/0178957 A1 | 7/2011 | Parsons et al. | |
| 2011/0179050 A1 | 7/2011 | Parsons et al. | |
| 2011/0184844 A1 | 7/2011 | Parsons et al. | |
| 2011/0264578 A1 | 10/2011 | Chapman et al. | |
| 2011/0313905 A1* | 12/2011 | Siddall | G06Q 40/04 705/37 |
| 2011/0320335 A1 | 12/2011 | Gorelik et al. | |
| 2012/0089496 A1 | 4/2012 | Taylor et al. | |
| 2012/0089497 A1 | 4/2012 | Taylor et al. | |
| 2012/0095893 A1 | 4/2012 | Taylor et al. | |
| 2012/0246052 A1 | 9/2012 | Taylor et al. | |
| 2012/0259757 A1 | 10/2012 | Nager | |
| 2012/0290460 A1 | 11/2012 | Curry, Jr. et al. | |
| 2013/0030963 A1 | 1/2013 | Cramer et al. | |
| 2013/0226764 A1 | 8/2013 | Battyani | |
| 2014/0143121 A1 | 5/2014 | Stevens | |
| 2014/0279342 A1 | 9/2014 | Maynard | |
| 2014/0289094 A1 | 9/2014 | Gaber et al. | |

OTHER PUBLICATIONS

Fiscal Agents—Strip Bonds. http://www.fiscalagents.com/newsletter/4stripbd.shtml. May 1995 (Year: 1995).*

"High Performance Trading—Deployment of Leading Edge Technology Thinking", Argon Design, 2013, 2 pages.

"Real-time Operating System", Wikipedia, Retrieved May 19, 2013, http://en.wikipedia.org/wiki/Real-time_operating_System, 6 pages.

"Solace Message Routers and Cisco Ethernet Switches: Unified Infrastructure for Financial Services Middleware", White Paper, 2010, 15 pages, Cisco Systems, Inc.

"What is a Real-Time Operating System (RTOS)?", National Instruments, Oct. 2, 2012, 2 pages.

Benjamin Geib, "Investigating Low Latency Trading with an HT Enabled FPGA", Universitat Heidelberg, Aug. 2, 2011, 17 pages.

C. Leber et al., "High Frequency Trading Acceleration Using FPGAs", International Conference on Field Programmable Logic and Applications, 2011, 317-322.

Cisco Systems, Inc., "Design Best Practices for Latency Optimization", 1992-2007, 8 pages.

Corvil, "Nanosecond Latency Management", Whitepaper, 2011, 10 pages.

International Search Report in International Patent Application No. PCT/AU2009/000849, dated Aug. 6, 2009, 4 pages.

International Search Report in International Patent Application No. PCT/EP2011/056611, dated Jan. 20, 2012, 3 pages.

Leber et al., "How to Get World's Best Possible Ultra Low Latency in High Frequency Trading (Tick to Trade Method)", 2012.

Lockwood, et al., "A Low-Latency Library in FPGA Hardware for High-Frequency Trading (HFT)", 2012 IEEE 20th Annual Symposium on High-Performance Interconnects, 2012, 8 pages.

low-latency.com, "Groundbreaking Results for High Performance Trading with FPGA and x86 Technologies", Newswire, Sep. 25, 2013, 2 pages.

Risca et al., "Trading Floor Architecture", Cisco Systems, 2008, 36 pages.

Scott Caudell, "Co-location, Performance Management and Technology Innovation for Ultra-low Latency Trading", High Performance Technologies for Trading, Apr. 2010, 5 pages, Issue 5.

Tse et al., "High Frequency Trading—Measurement, Detection and Response", Trading Strategy, Dec. 6, 2012, 12 pages.

Tse et al., "High Frequency Trading—The Good, the Bad, and the Regulation", Trading Strategy, Dec. 5, 2012, 7 pages.

Wikipedia, "Real-time Business Intelligence", Retrieved May 19, 2013, 4 pages, http://en.wikipedia.org/wiki/Real-time_business_intelligence.

International Search Report and Written Opinion, from PCT/US2014/064001, dated Feb. 13, 2015, WO.

* cited by examiner

TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE

BACKGROUND

A financial instrument trading system, such as a futures exchange, referred to herein also as an "Exchange", such as the Chicago Mercantile Exchange Inc. (CME), provides a contract market where financial instruments, for example futures, options on futures and spread contracts, are traded among market participants, e.g. traders, brokers, etc. Futures is a term used to designate all contracts for the purchase or sale of financial instruments or physical commodities for future delivery or cash settlement, and which are traded on a commodity futures exchange. A futures contract is a standardized legally binding agreement to buy (long) or sell (short) a commodity or financial instrument at a specified price at a predetermined future time. An option is the right, but not the obligation, to sell (put) or buy (call) the underlying instrument (for example, a futures contract) at a specified price within a specified time. The commodity or instrument to be delivered in fulfillment of the contract, or alternatively the commodity, instrument or reference for which the cash market price shall determine the final settlement price of the futures contract, is known as the contract's "underlying" reference, instrument or commodity, also referred to as the "underlier." The terms and conditions of each futures contract are standardized as to the specification of the contract's underlier, the quality and quantity of such underlier, delivery date, and means of contract settlement, i.e. physical delivery or cash settlement. Cash Settlement is a method of settling a futures contract whereby the parties effect final settlement when the contract expires by paying/receiving the pecuniary loss/gain of the contract, e.g. by comparing the contract price to the market price or other reference price of the underlier at the time of settlement, related to the contract in cash, rather than by effecting physical delivery, i.e. the actual exchange of the underlying reference or commodity at a price determined by the futures contract.

Typically, the Exchange provides for centralized "clearing" by which all trades are confirmed and matched, and open positions are settled each day until expired (such as in the case of an option), offset or delivered. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e. a trading pit, and trade with each other via oral and visual/hand based communication.

In particular, electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product.

A market data feed, referred to as market data or market feed, is a compressed or uncompressed real time (with respect to market events), or substantial approximation thereof, data/message stream provided by the Exchange directly, or via a third party intermediary. A market data feed may be comprised of individual messages, each comprising one or more packets or datagrams, and may carry, for example, pricing or other information regarding orders placed, traded instruments and other market information, such as summary values and statistical values, or combinations thereof, and may be transmitted, e.g. multi-casted, to the market participants using standardized protocols, such as UDP over Ethernet. More than one market data feed, each, for example, carrying different information, may be provided. The standard protocol that is typically utilized for the transmission of market data feeds is the Financial Information Exchange (FIX) protocol Adapted for Streaming (FAST), aka FIX/FAST, which is used by multiple exchanges to distribute their market data. Pricing information conveyed by the market data feed may include the prices, or changes thereto, of resting orders, prices at which particular orders were recently traded, or other information representative of the state of the market or changes therein. Separate, directed/private, messages may also be transmitted directly to market participants to confirm receipt of orders, cancellation of orders and otherwise provide acknowledgment or notification of matching and other events relevant, or otherwise privy, only to the particular market participant.

As may be perceived/experienced by the market participants from outside the Exchange or electronic trading system operated thereby, the following sequence describes how, at least in part, information may be propagated in such a system and how orders may be processed:

(1) An opportunity is created at a matching engine of the Exchange, such as by placing a recently received but unmatched order on the order book to rest;
(2) The matching engine creates an update reflecting the opportunity and sends it to a feed engine;
(3) The feed engine multicasts it to all of the market participants to advertise the opportunity to trade;
(4) The market participants evaluate the opportunity and each, upon completion of their evaluation, may or may not choose to respond with an order responsive to the resting order, i.e. counter to the resting order;
(5) The Exchange gateway receives any counter orders generated by the market participants, sends confirmation of receipt back directly to each submitting market participant, and forwards the received orders to the matching engine; and
(6) The matching engine evaluates the received orders and matches the first arriving order against the resting opportunity and a trade is executed.

To gain and maintain the trust and confidence of market participants and encourage participation, electronic trading systems ideally attempt to offer a more efficient, fair and balanced market where market prices reflect a true consensus of the value of traded products among the market participants, and which minimize, if not eliminate, surreptitious or overt subversion, influence of, or manipulation by, any one or more market participants, intentional or otherwise, and unfair or inequitable advantages, with respect to access to information or opportunities. To accomplish these goals, for example, electronic trading systems should operate in a deterministic, i.e. a causal, predictable, or otherwise expected, manner as understood and experienced by the market participants, i.e. the customers of the Exchange. Electronic trading systems which implement markets which are overtly or covertly inefficient, unfair or inequitable risk not only losing the trust, along with the patronage, of market participants, but also increased regulatory scrutiny as well as potential criminal and/or civil liability.

Accordingly, the operators of electronic trading systems, alone or in conjunction with, or at the direction of, regulatory or industry organizations, typically publish or otherwise promulgate rules or regulations, referred to as business or operating rules, which govern the operation of the system. These rules define how, for example, multiple transactions are processed by the system where those transactions have relationships or dependencies there between which may affect the result of such processing. Such business rules may include, for example, order allocation rules, i.e. rules which dictate which of multiple competing resting orders will be matched with a particular incoming order counter thereto having insufficient quantity to fill all of the suitable resting orders. For example, under a first-in-first-out methodology, the first order, of the competing resting orders, that was received by the electronic trading system will be matched with the incoming counter-order and filled to the extent possible by the available quantity, with any residual quantity of the incoming counter order then being allocated to the next received suitable competing resting order and so on until the available quantity of the incoming counter order is exhausted. However, additional or alternative matching/allocation rules may be implemented as well, for example to ensure fair and equal access, improve trading opportunities, etc., by allocating, such as proportionally, the available quantity of the incoming counter order among all, or a subset, of the competing resting orders until the available quantity is exhausted.

Once such business rules are established, or modified, market participants will expect, and overseeing regulatory entities may require, that the electronic trading system operate in accordance therewith. That is, if the Exchange adopts a rule to give first arriving orders priority over later arriving orders, a market participant who submits an earlier arriving order will expect their order to be filled prior to a later arriving order submitted by another market participant. It will be appreciated that these rules, by which operators of an electronic trading system may choose to operate their system, may vary at the discretion of the operators, subject to regulatory concerns. Generally, the term "transactional determinism" may refer to the processing, or the appearance thereof, of orders in accordance with the defined business rules.

In addition to efficiency, fairness and equity, electronic trading systems further provide significant performance improvements allowing for rapid high volume transaction processing which benefits both the Exchange and market participants. Metrics of electronic trading system performance include latency and throughput. Latency may be measured as the response time of the Exchange. This can be measured in a number of different contexts: the time elapsed from when an order, or order cancelation, is received to when a confirmation/acknowledgment of receipt is transmitted, from when an order is received to when an execution notification is transmitted, or the time elapsed from when an order is received to information about that order being disseminated in the market data feed. Throughput may be measured as the maximum number of orders or trades per second that the electronic trading system can support, i.e. receive and acknowledge, receive and match, etc.

Generally, market participants desire rapid market data updates, low latency/high throughput order processing, and prompt confirmations of their instructions to allow them to: competitively, frequently and confidently evaluate, react to, and capitalize upon or, conversely, avoid, discrete, finite, fast moving/changing or ephemeral market events; leverage low return transactions via a high volume thereof; and/or otherwise coordinate, or synchronize their trading activities with other related concerns or activities, with less uncertainty with respect to their order status. Higher volume capacity and transaction processing performance provides these benefits as well as, without detrimentally affecting that capacity or performance, further improves market access and market liquidity, such as by allowing for participation by more market participants, the provision of additional financial products, and/or additional markets therefore, to meet the varying needs of the market participants, and rapid identification of additional explicit and implicit intra- and inter-market trading opportunities. The Exchange benefits, for example, from the increased transaction volume from which revenue is derived, e.g. via transaction fees.

Current electronic trading systems already offer significant performance advantages. However, increasing transaction volumes from an increasing number of market participants, implementation by some market participants of algorithmic and/or high frequency trading methodologies whereby high speed computers automatically monitor markets and react, usually in an overwhelming manner, to events, coupled with a continued demand for ever-decreasing processing latencies and response times, is driving a need for additional capacity and performance improvements to maintain performance as experienced by each market participant and avoid detrimental consequences, such as capacity exhaustion and inequitable access. For example, the increasing speed at which market participants may evaluate and respond to changes in market data, such as responsive to a market event, is increasing the rate at which transactions are received by the electronic trading system, narrowing the time of receipt gap there between and necessitating a need for a higher degree of discrimination so as to resolve the order in which those transactions are received, upon which the deterministic operation of the electronic trading system may be based, e.g. for order allocation, etc. Furthermore, the addition, by electronic trading systems, of additional channels of communication in an effort to increase capacity and opportunity, along with increased bandwidth of each channel, allows for more transactions to be submitted over multiple parallel paths into the system. Accordingly, not only must the electronic trading system discriminate among closely received incoming transactions, but must further arbitrate among transactions received simultaneously, or temporally so close together as to be considered simultaneously received, i.e. the difference in their time of receipt being to close to measure by the implemented discrimination mechanisms, also referred to as "substantially simultaneously".

In addition to increased capacity and lower latency, the global nature of business has further driven a need for fault tolerance to increase availability and reliability of electronic trading systems. Scheduled outages must be minimized and unscheduled outages must be eliminated.

Furthermore, to implement the Exchange's clearing function, which mitigates the concerns of market participants relating to performance by counter parties, protects the interests of the Exchange and otherwise adequately manages/mitigates risk, risk management systems having corresponding operational efficiency and performance are needed so as to protect the Exchange from loss while minimizing impediments to market operations or distractions to market participants with ancillary and unnecessary tasks. In addition, increased transaction volume may further translate into greater exposure for market participants requiring greater amounts of capital to be posted to cover losses. Accordingly, more accurate and/or tailored risk assessment may be required to ensure that only the necessary minimum amount of capital is required to be allocated by the market participants to cover potential losses and avoid undue encumbrances on/impediments to the ability of those market participants to conduct their business.

Improved speed and efficiency also, unfortunately, improves the speed at which problems may occur and propagate, or otherwise be exploited, such as where the market ceases to operate as intended, i.e. the market no longer reflects a true consensus of the value of traded products among the market participants. Such problems are typically, but not always, evidenced by extreme market activity such as large changes in price, whether up or down, over a short period of time or an extreme volume of trades taking place. In particular, market participants, whether human or electronic, may not always react in a rational manner, such as when presented with imperfect information, when acting in fraudulent or otherwise unethical manner, and/or due to faulty training or design. For example, while communications technologies may have improved, inequities still exist in both access to information and access to opportunities to participate, which may not be due to any violations of legislative, regulatory and/or ethical rules, e.g. some traders receive information before other traders because they can afford faster communications channels, some traders may be able to place trade orders more quickly than others because they have faster computers. In many cases, irrational and/or exploitive trader behavior may be triggered by a market event, such as a change in price, creating a feedback loop where the initial irrational reaction may then cause further market events, such as continued price drops, triggering further responses and resulting in an extreme change in the price of the traded product in a short period of time. High speed trading exacerbates the problem as there may be little time for traders/algorithmic trading systems, or those overseeing them, to contemplate and temper their reactions before significant losses may be incurred. Furthermore, improved communications among traders facilitates exploitation of information inequities and propagation of irrational behavior in one market to other markets as traders in those other markets react to the results of the irrational behavior. Market protection systems may therefore be needed to monitor and evaluate trading activity, detect illegitimate/exploitive activity and appropriately react more quickly to mitigate the spread of problems, again without impeding legitimate market operation.

Accordingly high performance electronic trading systems need to assure transactional determinism under increasing loads while providing improved trading opportunities, fault tolerance, low latency processing, high volume capacity, minimal impact risk mitigation and market protections, as well as equitable access to information and opportunities.

DETAILED DESCRIPTION

Figure 1:
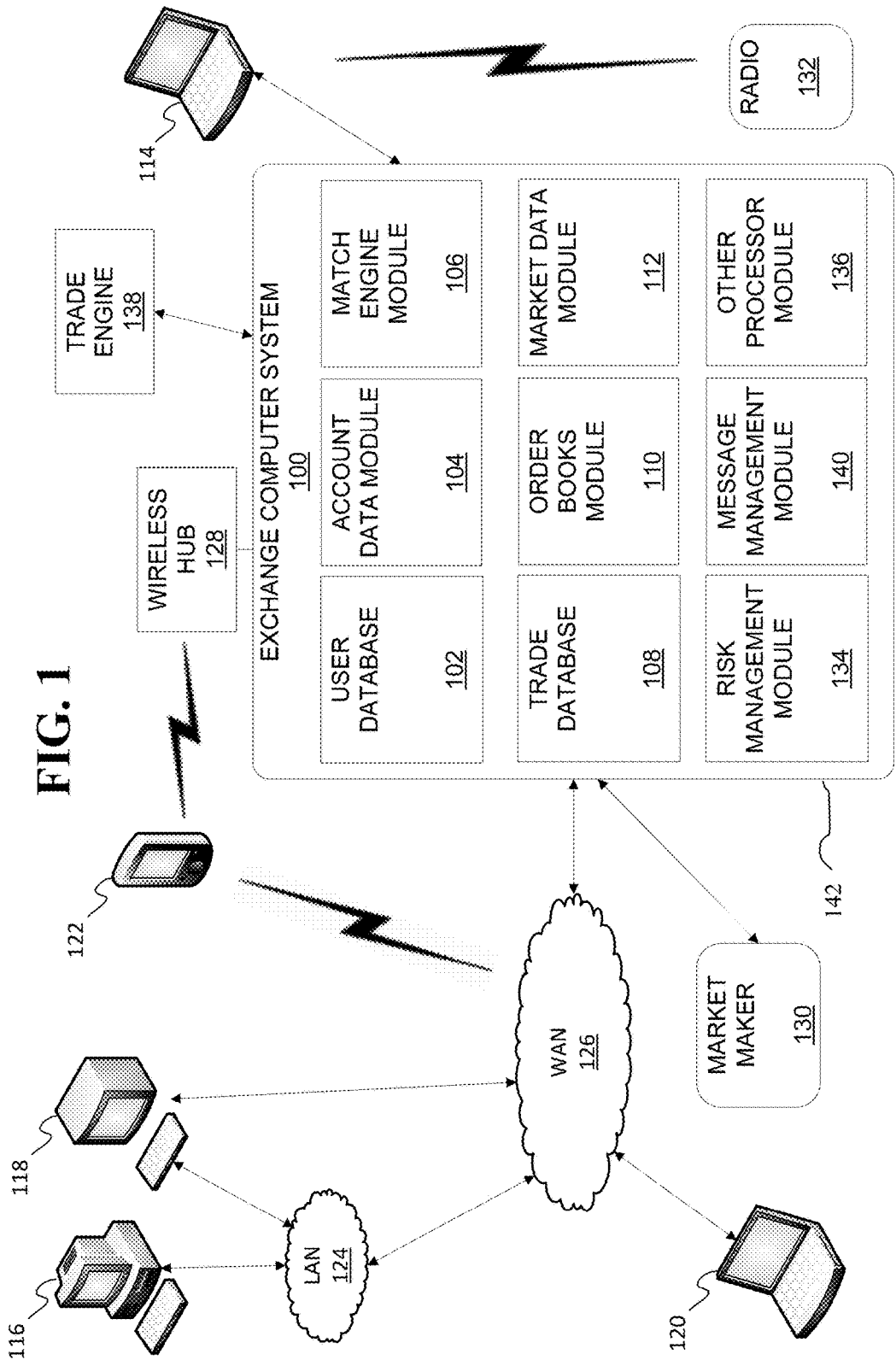
FIG. 1 depicts an illustrative electronic trading system that may be used to implement aspects of the disclosed embodiments.

The disclosed embodiments relate to implementation of a trading system, which may also be referred to as a trading system architecture, having improved performance and which further assures transactional determinism under increasing processing transaction loads while providing improved trading opportunities, fault tolerance, low latency processing, high volume capacity, risk mitigation and market protections with minimal impact, as well as improved and equitable access to information and opportunities.

Underpinning the provisioning of these features is a need to improve transaction processing performance while also improving the volume of transactions which can be processed by the electronic trading system. Electronic trading systems, as will be described, are implemented using computer technology, e.g. processors, memories, electronic communications networks, and the like. As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be interwired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory To improve performance and volume, merely implementing existing systems using newer and faster general purpose technology may be insufficient. General purpose processors, operating systems and compilers implement general optimizations and operations designed to improve performance and reliability while maintaining broad applicability across a wide variety of applications. As such, these optimizations are not necessarily optimized for any one application, e.g. such as for implementing a match engine of an electronic trading system. These optimizations, which are largely defined by the manufacturer and may be out of the control of an application developer, may include interrupt handling algorithms, algorithms to improve multitasking, memory management algorithms, pre-fetching, branch prediction, program code optimizations, etc. However, such optimizations may, in fact, undermine the application for which the general purpose processor is being used. In particular, with respect to the business transactions processed by an electronic trading system, where transactional determinism is paramount, underlying optimizations may be disruptive thereof.

As described above, as used herein a business transaction may be defined as one or more operations or acts which are undertaken according to one or more associated business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the associated business rules, may be characterized as deterministic in that they be characterized by an interdependency or relationship which affects their result, such as a dependency on the order in which they are processed, such as a temporal order, and/or a dependency on real time processing, as defined by business rules, so as to effect the business/commercial purpose and/or meet participant expectations, referred to herein as "transactional determinism." Generally, a set of deterministic transactions will provide a particular result when executed in one order and a different result when executed in a different order. In some applications, deterministic processing may be preferred/prioritized over real time processing.

For example wherein the business rules define a first-in-first-out ("FIFO") process for matching offers with counter-offers to effect an exchange or trade, when an offer transaction is received to which no prior counter offer transaction has been previously received, it should be matched with the next suitable counter offer transaction received rather than a later received counter offer transactions. It will be appreciated that the processing of a given transaction may involve delaying further processing of that transaction in favor of a later received transaction, such as dependent upon conditions specified by the earlier transaction and/or the defined business rules. It will further be appreciated that, at a minimum, any representation of the current state of a business environment, e.g. market, or changes thereto, in which the business transactions are transacted should present an accurate reflection of the actual state or state change in accordance with the defined business rules, so as to not mislead participants or provide an unfair advantage. In the disclosed embodiments, the phrase "financial transaction" will refer to a business transaction involving the purchase or sale of financial instruments, such as futures contracts or options thereon, spread or other combination contracts and the like, as will be described. As was described above, electronic trading systems generally define their business rules and then must ensure transactional determinism in compliance therewith.

Generally, when the rate of business transaction processing is less than the underlying instructions processing capacity of the underlying general purpose processor, general performance optimizations implemented by the processor or operating system may be hidden or otherwise imperceptible at the transactional level. That is, the processor is able to perform these optimizations (e.g. page switches, instruction pre fetch, branch mis-predictions, cache miss processing, error/packet recovery) fast enough so as not to affect the executing business application. However, as the rate and volume of transactions increases, contention for internal processor resources, such as memory bandwidth, also increases. Accordingly, the impact of internal optimizations on the executing application may no longer be imperceptible. In a multiprocessor environment, this impact may affect the ability to maintain application tasks/processes, which are divided among multiple processors, in sync which each other which may result in out of order execution of one or more transactions.

General purpose processors and operating systems further suffer from their general availability and applicability which has made them susceptible to being reverse engineered and compromised by unknown or uncorrected deficiencies or defects, particularly security related, making them vulnerable to hacking, viruses and other threats. Accordingly, firewalls or other security appliances, applications or protocols may be required to ensure the safety and security of such systems which further adds latency, degrades throughput or otherwise impedes performance.

Alternatively, as will be described, the embodiments described below may be implemented using FPGA's or other reconfigurable logic. Implementing processing tasks and algorithms using an FPGA can yield significant performance enhancements over implementations using traditional microprocessors and operating systems. In particular, an FPGA based system implementation may avoid the processing overhead and uncontrollable/unnecessary optimizations implemented by general purpose processors, compilers, operating systems and communications protocols, as well as the security vulnerabilities thereof. For example, an FPGA may avoid interrupt handling, error correction, pre-fetching and other unnecessary microprocessor operations/optimizations, as well as generic processing/housekeeping tasks of the operating system which are not needed, such as garbage collection, unnecessary memory swaps, cache loads, task switching, cycle stealing, etc. Further an FPGA implementation may avoid the use of general purpose compilers which may introduce, for example, undesired program code optimizations.

For example, using an FPGA based implementation may permit components of a trading system to be collocated, such as via a custom interface, or otherwise closely interconnected with networking equipment, such as a router or switch, e.g. via a backplane thereof. This would allow the trading system to have access to incoming transactions as quickly as possible and avoid the latency introduced, not only by having to route the transaction over conventional networking media, but also by the communications protocols, e.g. Transport Control Protocol ("TCP"), used to perform that routing. One exemplary implementation is referred to as a "Smart Network Interface Controller" or "SmartNIC" which is a device which typically brings together high-speed network interfaces, a PCIe host interface, memory and an FPGA. The FPGA implements the NIC controller, acting as the bridge between the host computer and the network at the "physical layer" and allows user-designed custom processing logic to be integrated directly into the data path. This may allow a smart NIC to function as a programmable trading platform under the supervision of a host CPU. Under the Open System Interconnection ("OSI") model, which is a conceptual model that characterizes and standardizes the internal functions of a communication system by partitioning it into abstraction layers, the physical abstraction layer defines electrical and physical specifications for devices. In particular, it defines the relationship between a device and a transmission medium, such as a copper or fiber optical cable. This includes the layout of pins, voltages, line impedance, cable specifications, signal timing, hubs, repeaters, network adapters, host bus adapters (HBA used in storage area networks) and more. The major functions and services performed by the physical layer include: establishment and termination of a connection to a communications medium; participation in the process whereby the communication resources are effectively shared among multiple users, for example, contention resolution and flow control; and modulation or conversion between the representation of digital data in user equipment and the corresponding signals transmitted over a communications channel, these signals operating over the physical cabling (such as copper and optical fiber) or over a radio link.

However, merely increasing operating performance, whether via an improved general purpose processor or via an FPGA based implementation, may expose, or reduce tolerance of, fundamental flaws of traditional computer hardware, operating systems or the algorithms/programs implemented thereon, as well as network interconnects/communications media. Such flaws, which may result in non-deterministic operation, include manufacturing imperfections/variabilities (clock skew, long paths, Resistance/Capacitance ("RC") delay, alpha particles, etc.), susceptibility to environmental conditions or changes thereto (temperature, humidity, solar flares, etc.), and human error (intermittent or loose connections, improper configuration, etc.). These flaws may introduce transient errors, such as race conditions, bit errors or packet loss, which affect deterministic operation. These issue may be compounded in a multiprocessor (whether distributed or co-located, e.g. in the same room, the same box, the same package, or on the same substrate) environment, which is desirable for fault tolerance and/or improved performance, where new interconnects and imperfections/variabilities are introduced/multiplied, interconnects are longer (increasing the occurrence of race conditions and/or jitter, i.e. variability over time of communications latency), coherence issues are introduced necessitating complex coherency management mechanisms (thread or resource locking, etc.), and resource (data, memory, bus) contention or conflicts may occur.

Furthermore, mere improvements to performance can reveal problems with the applications themselves, such as trading applications or their underlying algorithms. For example, an increase in the rate of transaction processing may cause variances/divergence, between actual operation and ideal or expected operation, to emerge, be amplified, exacerbated (possibly exploited) or compounded beyond an acceptable level, e.g. before the application can be reset or other corrective action taken. In particular, deficiencies with assumptions, e.g. factors thought to be negligible or at least acceptable, may become significant, such as the assumed requisite degree of precision or rounding, assumed number decimal places, assumed number of bits (which may cause overflow), assumed or limited precision constants or variables (e.g. a time variable incapable of nanosecond or other requisite precision), factors assumed to be constant which are in fact variable, variables ignored for convenience or to reduce complexity, trade offs and compromises (made for convenience/to reduce cost/complexity or improve performance of the implementation). Further, the occurrence of unaccounted for, or intentionally ignored, assumed-statistically-insignificant events/factors, variables, rounding errors, corner cases, rare or unexpected/unanticipated states or state transitions may present an increasing risk. Generally, speed becomes a lens which creates, or magnifies/reveals underlying, defects and/or divergences, e.g. where a later transaction may overtake an earlier transaction (race condition), as well as limits recovery time from, or otherwise reduces tolerance for, errors (transient or systemic (delay) such as bit errors, packet loss, etc.). Such flaws may cause inconsistencies and/or may be unfairly exploited.

Accordingly, beyond mere performance improvements, improved architectures and algorithms for implementing electronic trading systems may be needed to ensure proper, e.g. transactionally deterministic, operation by avoiding optimizations and operations which may undermine intended operation and avoid, account and/or compensate for performance related/introduced/revealed inadequacies.

The disclosed architecture, and implementations thereof, described in detail below, facilitate improved, e.g. low latency and high volume, transactional performance and fault tolerance with assured transactional determinism, while further enabling additional value added functionality to improve information outflow, trading opportunities, e.g. the ease with which trades can occur or liquidity, risk mitigation and market protections, as will be described below.

In the exemplary embodiments, all transactions are ultimately received at the electronic trading system via a single point of entry, i.e. a single communications interface, at which the disclosed embodiments apply determinism, which as described is moved away from the point where matching occurs and closer to the point where the electronic trading system first becomes "aware" of the incoming transaction. This may require improving the performance of this communications interface to process the influx of transactions without being overwhelmed. In some implementations, more orders may be submitted by market participants via more parallel inputs/channels/communications pathways implemented to increase capacity and/or reduce resource contention. However, for many of the reasons described above, parallel communication paths complicate deterministic behavior, e.g. by creating opportunity, such a via asymmetric delays among communications paths, for later transmitted or arriving transactions to overtake earlier arriving or transmitted transactions, and may require mechanisms to discriminate among closely received transactions and arbitrate among simultaneously, or substantially simultaneously, received transactions, e.g. transactions received at the same time or received within a threshold of time unresolvable by the system. Accordingly, mechanisms may be implemented to improve and impart deterministic handling of discrimination and arbitration among closely received transactions.

In particular, in one embodiment, an architecture for an electronic trading system is disclosed. As will be described in more detail below with respect to FIG. 2, the architecture implements a set of redundant match engines to improve fault tolerance. This set of redundant match engines may include two or more match engines, such as three or five match engines. Incoming transactions, e.g. orders to trade, are processed by an Orderer component of the architecture which serializes, or otherwise sequences, the incoming transactions based on their order of receipt by the Orderer. In this manner, the Orderer is the point of determinism for the system as each transaction is then augmented with an indicium, such as a time stamp or other sequence encoding, indicative of its order of receipt relative to the other received transactions, ensuring their ordered processing thereafter. The sequenced transactions are then substantially simultaneously communicated, e.g. broadcasted, to each match engine of the set of redundant match engines, each of which then processes the transaction, based on the sequencing imparted by the orderer, and determines a result, referred to as a match event, indicative, for example, of whether the order to trade was matched with a prior order, or reflective of some other change in a state of an electronic marketplace, etc. As used herein, match events generally refer to information, messages, alerts, signals or other indicators, which may be electronically or otherwise transmitted or communicated, indicative of a status of, or updates/changes to, a market/order book, i.e. one or more databases/data structures which store and/or maintain data indicative of a market for, e.g. current offers to buy and sell, a financial product, described in more detail below, or the match engines associated therewith, and may include messages which are indicative of, or otherwise generated based upon:

REST—indicates that a new order has been placed on an order book but not matched with a previously received order counter thereto (this event may also be indicated by a series of price improvement match events or deep book change match events, which may both be considered rests);

FILL—indicates that a new incoming order matched with one or more previously received but unsatisfied orders which were resting on an order book resulting in a trade;

MOD—indicates that an existing/resting order's values (price, quantity, etc.) have been modified/changed;

CANCEL—indicates that an existing/resting order has been canceled/removed;

MARKET OPEN—indicates that a market for trading has opened;

MARKET CLOSE—indicates that a market for trading has closed;

MARKET HALT—indicates that a market for trading has been paused for some period of time due to internal restrictions (usually that price velocity has gotten too high);

NEW PRODUCT—indicates that a new product is available;

CLOSE/CANCEL PRODUCT—indicates that a product is removed from trading;

PRODUCT TRANSITION—indicates that the market for a product is transitioning state, e.g. opening, closing, pausing, or reserving;

TRADING SCHEDULES—indicates the market hours;

FIRST TRADE—indicates that a first trade for a product has been placed;

PRODUCT LIMITS—indicates the price limits for a product;

TRADE—indicates that a trade for a particular product has occurred;

BUST—indicates that a trade has been invalidated;

RFQ—indicates a request for quote, e.g. a request to send in orders for a particular product;

HEARTBEAT—indicates an administrative message of the electronic trading system used to ensure communications of market events are functioning properly;

or other event or status.

Each match engine may generally operate asynchronously with respect to the remaining match engines simplifying the implementation thereof, i.e. without complex interconnection or synchronization there between. As each match engine generates its result/match event, that result/match event is communicated to a Decider component of the architecture. The Decider collects the results/match events from at least a subset of the set of redundant match engines and determines, of the received results, which is the correct result. In one embodiment, this determination may be based on a defined quorum vote, i.e. minimum number of match engines whose results must agree. This quorum may be a majority or super-majority of the match engines. The determined result/match event may then be provided to a market data component, for example, which updates data records, e.g. an order book, reflective of the match event and/or otherwise reports the match event to the market participants involved in the transaction, as well as the market as a whole, as will be described.

Accordingly, fault tolerant operation is achieved via the redundant match engines coupled with the Decider component which coalesces the results therefrom while deterministic operation is preserved via the sequencing of transactions by the Orderer component. Further, maintenance may be simplified by allowing faulty match engines to be reset or otherwise swapped out without impeding the processing of transactions. In addition, processing tasks, such as housekeeping tasks, e.g. garbage collection, which the processor implementing a match engine must periodically perform and which may impede that match engine's ability to process transactions, may be tolerated. For example, the set of redundant match engines may be designed such that only one match engine at a time may perform such housekeeping tasks, while the remaining match engines continue to process transactions as usual. This may be implemented by transmitting a directive or administrative transaction to all of the match engines injected into the transaction stream, such as by an administrative component coupled therewith. The directive/administrative transaction may act as a synchronizing transaction and/or a direction to instruct each match engine when to perform its housekeeping/maintenance tasks. The Decider component, via its normal operation as was described, may then ignore the lack of a result/match event from the particular match engine allowed to perform its housekeeping tasks, assuming it has received results from a sufficient number of the remaining match engines. In one implementation, the Decider may be further operative to determine when a match engine becomes non-responsive or otherwise faulty. In this embodiment, the threshold for determining a non-response match engine may be set to a value that is greater than the time it would take a match engine to perform its housekeeping tasks to avoid identifying that match engine as non-responsive. Once determined to be faulty, the match engine could then be removed from the quorum wherein the Decider evaluates and determines the result based on the results received from the remaining match engines using a modified quorum value, i.e. a lesser number of concurring results, to determine the correct result. It will be appreciated that the faulty match engine could then be rebooted, reinstated, restarted or otherwise replaced with Decider then restoring full operation therewith.

As was described above, the Orderer component, by the nature of its role to sequence transactions for subsequent processing, may be designated the de facto point of determinism for the system as, based on when it perceives receipt of transactions, defines the order in which those transactions will be further processed. Accordingly, it may be desirable to locate the Orderer close to the point at which transactions ingress, or are otherwise received by, the electronic trading system. In one implementation, the Orderer is implemented using an FPGA coupled, or otherwise integrated with, the network switch/gateway into which transactions are received from sources external to the electronic trading system. This allows the Orderer to receive transactions as quickly as possible, such as by bypassing the typical network hardware and software infrastructure. The network switch/gateway may then be further coupled with the set of redundant match engines allowing the Orderer to quickly communicate the sequenced transactions thereto.

Similarly, it may be further advantageous to report match events to market participants as quickly as possible. Accordingly, in one embodiment, the Decider may also be implemented in an FPGA, either the same as or different from the FPGA in which the Orderer is implemented, also coupled with the network switch/gateway which couples the electronic trading system with the external infrastructure that interconnects with the market participants. In this manner, match events can be communicated out of the electronic trading system as quickly as possible.

It will further be appreciated that to increase fault tolerance of the electronic trading system, the entire architecture, i.e. orderer, redundant match engines and decider, which may be collectively referred to as a "match engine quorum," may also be replicated in a redundant manner.

In another embodiment, an improved market monitoring system, also referred to as direct market instrumentation, is provided which facilitates activity/transactional-level resolution recording of the operation of the entire electronic trading system. The disclosed market monitoring system leverages the unique perspective of being able to monitor the state of the entire market and the activities of all market participants to enable: monitoring of market activity, e.g. transactions and other actions undertaken by market participants, administrators, regulators and other participating entities which affect the state of the market, including both inter- and intra-market participant activity; derivation of market and market participant metrics; identification and monitoring of transactional patterns which may be indicative of, or portend market events, such as a market crash, or illegal, fraudulent or malicious activity; and/or post event replication/replay, inspection and analysis of market events and the activity leading thereto. In one implementation, the market monitoring system is implemented in an FPGA having a memory and coupled with the transaction ingress point of the electronic trading system, such as the Orderer, described above, or an order entry gateway of a single match engine-based trading architecture. By utilizing an FPGA having an onboard memory, rapid data transfers can be achieved to copy and store transactions in the memory as they are received. Rather than preserving only snapshots of market activity or significant state changes in the market, a complete transactional record enables the ability to replay that activity and recreate desired market states, perform event driven and/or real time analysis, as well as analyze the activity at a later time to derive metrics and look for patterns. Further, simulation and testing of hypothetical scenarios may be enabled by allowing for synthetic activity to be created and executed, as well as allow recorded activity to be modified, such as by changing the parameters of one or transactions, to discern how the modified activity affects the resultant market state.

As used herein, a financial message or financial data message may refer both to messages communicated by market participants to an electronic trading system and vice versa. Financial messages communicated to the electronic trading system, also referred to as "inbound" messages, may include request messages, such as trader orders, order modifications, order cancellations and other transaction requests, as well as other message types. Financial messages communicated from the electronic trading system, referred to as "outbound" messages, may include messages responsive to inbound messages, such as confirmation and/other response messages, or other messages such as market update messages, quote messages, and the like, e.g. market data messages.

Financial messages may further be categorized as having or reflecting an impact on a market, also referred to as an "order book" or "book," for a traded product, such as a prevailing price therefore, etc., or not having or reflecting an impact on a market or a subset or portion thereof. For example a request to place a trade may result in a response indicative of the trade either being matched with, or being rested on an order book to await, a suitable counter-order. In some cases, requests may elicit a non-impacting response, such as temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein. It will be appreciated that additional conditions may be specified, such as a time or price limit, which may cause the order to be dropped or otherwise canceled and that such an event may result in another non-market-impacting communication instead. As will be described below, in some implementations market impacting communications may be communicated separately from non-market impacting communications, such as via a separate communications channel or feed. It will be further appreciated that various types of market data feeds may be provided which reflect different market or aspects thereof. Market participants may then, for example, subscribe to receive those feeds of interest to them. For example, a particular market data feed may only communicate information related to the top buy/sell prices for a particular product, referred to as "top of book" feed. In this case, a request message may be considered market-impacting only if it affects the top buy/sell prices and otherwise is considered non-market-impacting. As market impacting communications tend to be more important to market participants then non impacting communications, this separation may reduce congestion and or noise among those communications having or reflecting an impact on a market or portion thereof.

Market data feeds may further be characterized as providing a "view" or "overview" of a given market, an aggregation or a portion thereof. For example, a market data feed may convey the entire state of a market for a particular product, e.g. all presently resting buy/sell orders and prices associated therewith as well as trade notifications, etc., only a portion of a market, e.g. only the top 10 resting buy/sell orders, and/or an aggregation of multiple markets or portions thereof. As used herein, a market impacting request may be said to impact the "view" of the market as presented via the market data feed.

Various types of market data feeds may be provided by electronic trading systems, such as the CME, in order to provide different types or subsets of market information or to provide such information in different formats. Examples include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index). It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available of later developed, are contemplated herein.

In another embodiment, customized market data feeds are provided allowing market participants to specify a customized field order and/or additional custom data fields to be included in their market data feed. As was described above, electronic trading systems broadcast market data feeds to the market participants to notify them of changes in the state of the market, such as price updates, trade notifications, etc. The feeds comprise a stream of individual event messages which are multi-casted to the market participants in a predefined format, e.g. FIX/FAST, such that all market participants receive the same information. Upon receipt, many market participants, including feed aggregators which aggregate data feeds from other exchanges and which further may modify and/or relay the data feed to others, typically further process the market data from the feed, such as by using a Ticker Plant, to tailor the data, e.g. the content and/or format, to their particular needs, and then rebroadcast the modified data, such as to their individual trader/trader terminals.

This tailoring may further include extracting one or more subsets of data from each data feed message considered to be more important than the remaining data, reordering the data in a format further suitable for subsequent processing, e.g. so that more critical data is processed first, and deriving, extracting or otherwise computing values or metrics based on the data. It will be appreciated that such tailoring of the market data feed may occur elsewhere, such as at a trader terminal. Examples of derived values include "Greeks" which is a set of different measures/dimensions/variables of risk involved in taking a position in an option (or other derivative). Each Greek, or particular measure of risk, is a result of an imperfect assumption or relationship of the option with another underlying variable. Various sophisticated hedging strategies are used to neutralize or decrease the effects of one or more of these measures of risk. Not all of these risk measures are important to all market participants and some are more important than others. With the exception of vega (which is not a Greek letter), each measure of risk is represented by a different letter of the Greek alphabet. Greeks include

- Δ (Delta) represents the rate of change between the option's price and the underlying asset's price—in other words, price sensitivity;
- Θ (Theta) represents the rate of change between an option portfolio and time, or time sensitivity;
- Γ (Gamma) represents the rate of change between an option portfolio's delta and the underlying asset's price—in other words, second-order time price sensitivity;
- γ (Vega) represents the rate of change between an option portfolio's value and the underlying asset's volatility—in other words, sensitivity to volatility; and
- ρ (Rho) represents the rate of change between an option portfolio's value and the interest rate, or sensitivity to the interest rate.

It will be appreciated that there may be other derived or computed values, now available or later developed, of interest to market participants which may be provided by the electronic trading system in a customized market data as described. For example, such other derived or computed values may include:

- non-public data—e.g. such as order identifiers or hidden quantities privy only to a specific trader;
- Position data—data showing a trader's risk exposure (similar to delta, but tied to actual orders) due to a shift in the market; or
- Requests For Quote(s)—certain requests for quotes may not be fully public, and need to be filtered only to the traders allowed to respond to the RFQ.

The disclosed embodiments recognize such processing, wherever it may take place outside of the electronic trading system, of the market data feed upon receipt imparts delay in ultimately providing that data, or the information derived therefrom, to the recipients who are waiting for it. Furthermore, Ticker Plants and trading software interfaces, which are typically comprised of custom software, are costly and not all market data recipients can afford to implement them or afford efficient implementations which minimize delay or provide all of the necessary functionality.

Accordingly, the disclosed embodiments offer a "value added" market data feed by providing the capability for a market participant to customize the market data feed to their needs by specifying the order of the data within each feed message and/or specifying desired computed or derived values to be included in, or otherwise coalesced with, the feed message. Other market participants would continue to receive the standard market data feed. In one embodiment, customized market data feeds may be provided as a service, such as a subscription service, whereby a market participant pays the operator of the electronic trading system a fee, such as a one-time or periodic, e.g. monthly, annual, etc., for the service. This fee, which may vary depending upon the amount of customization or other factors, may be in addition to, or included within, a fee paid for the standard market data feed. For example, the operator of the electronic trading system may provide a web site to which market participants log in via an account associated therewith. The web site may present the various options for customizing the market data feed and the cost associated therewith and allow the market participant to choose the desired customizations. A sample of the customized market data message may then be provided, based on a real or synthetic market data message to allow the market participant to confirm their desired customizations. Further, the web site may permit the market participant to provide a payment medium, such as a credit card, etc., or authorization to cover the costs. In one embodiment, the market data feed customizations may be limited to a set of defined customizations, or templates, from which the market participant may select. Alternatively, the market participant may be permitted to customize all aspects of the market data feed. It will be appreciated that the number, type and degree of permitted customization, from predefined templates to fully customized specifications, is implementation dependent and all are contemplated herein.

As will be described below, the customization of market data feeds may be implemented close, logically and/or physically, to the point at which market data feed messages egress the electronic trading system en route to their ultimate destination to ensure that the time of dispatch of all of the market data messages, i.e. both the customized and the standard messages, is normalized so as to avoid providing any advantage to a market participant in receiving their messages prior to other market participants. Further, the disclosed customization may further be implemented close, logically and/or physically, to the match engines of the electronic trading system so as to have expedient access to market event data for the computation and/or derivation of data or metrics therefrom. In one embodiment, a market data customization component is implemented on the same FPGA as the Decider component described above. Alternatively, the market data customization component may be separately implemented, such as on a separate FPGA. It will be appreciated that the disclosed market data customization may be implemented with the Order/Decider match engine architecture described herein or with the current match engine architecture.

By providing customized market data feeds, the need by the market participants to further process the market data messages upon receipt is eliminated thereby avoiding the need to implement costly and complex software to process the data and the processing delay incurred thereby. Furthermore, as the disclosed embodiments substantially simultaneously, i.e. with little to no discernable time difference there tween, transmit both the standard market data feed and the customized market data feeds, market participants desiring customized data feeds need no longer incur the disadvantage of the delay imparted by processing the received data compared with market participants who do not process the market data feed. Accordingly, more equitable access to customized data feeds is provided without loss of parity among the market participants.

With current electronic trading system architectures, improving performance may result in reaching or exceeding the capacity of existing infrastructure components, which as was described above, may cause or reveal underlying faults or flaws, such as disparity along communications paths causing jitter or race conditions which results in non-deterministic operation. In particular, with respect to acknowledgement messages sent to specific traders indicative of order receipt confirmation, match events or other trader specific/privy notifications, and corresponding market data feed messages sent to all market participants reflecting corresponding market state or changes thereto, these disparities may result in the acknowledgement message being transmitted to the particular market participant prior to the corresponding market data message being transmitted to all of the market participants, or vice versa, which may result inequitable/unfair access to information. Such unfair information access may then be exploited to gain unfair financial or other advantages. Other solutions to ensuring equitable information access have included combining the acknowledgment and market data feeds into a single feed using participant-unique tokens or identifiers to signal when a particular feed message is also an acknowledgment to a particular trader, or encrypting the acknowledgement feed messages such that they can only be decrypted by a key provided within the corresponding market data feed message. The disclosed embodiments take a different approach, which may used in conjunction with or independent of these other solutions, by gating corresponding acknowledgement messages and market data messages against each other at the point at which these messages egress the electronic trading system such that an acknowledgement message cannot be transmitted to a market participant until the corresponding market data message has been transmitted, or is ready to transmit, to all market participants.

In one implementation, gating logic is implemented at the point of message traffic egress from the electronic trading system, such as at the network switch or gateway, or other device through which both acknowledgement messages and market data messages flow en route to their recipients. As described above, the gating logic may be implemented in an FPGA coupled with the switch/gateway fabric/backplane. In operation, as will be described, the gating logic maintains a log or other data structure which stores data indicative of market data messages which have been transmitted prior to the corresponding acknowledgment message. Upon receipt of an acknowledgement message, the queue of market data messages is checked. If a corresponding market data message has already been transmitted, as indicated in the log, then the acknowledgment message is allowed to be forwarded on towards its destination. However if the corresponding market data message has not yet been transmitted, then the acknowledgement message is stored in a buffer or other memory. Similarly, upon receipt of a market data message, the buffer of stored acknowledgment messages is checked and if a corresponding acknowledgement message is found, both market data message and corresponding acknowledgment message are forwarded to their respective destinations. If a corresponding acknowledgment message has not yet been received, i.e. is not stored in the buffer then the market data message is forwarded toward its destination and data indicative thereof is stored in the log to await receipt of the corresponding acknowledgment message.

In one embodiment, opportunities to transact, i.e. market liquidity, may be improved. It will be appreciated that liquidity of a market is implementation dependent and/or may depend upon the perspective of one or more participants thereof. Generally, market liquidity may be defined as an asset's ability to be bought or sold without causing a significant movement in the price and with minimum loss of value, e.g. where there are ready and willing buyers and sellers at all times, which may be indicated by a market with many bid and ask orders, whereby the best bid and best offer prices are "relatively" close to one another. For example, liquidity of a market may be measured as the probability that the next trade in that market will be executed at a price equal to the most recent concluded trade in that market, e.g. better than 50%. Objectively, liquidity of a market may be measured by the difference in price tick value between the best bid price and the best ask price, such as where the difference is within a defined threshold value such as two price ticks. It will be appreciated that such a threshold may be specified as a fixed value or may be dynamically specified and vary based on, for example, time of day, day of month, month of year, order volume, current price level of the best ask and/or best bid prices, instrument type, a parameter of a correlated market, or other parameter or combination thereof. In known markets, liquidity may be defined specifically based on the contract type, delivery month(s) or range thereof, commodity type, etc., such as, for example, where a market for a instrument deliverable in December is considered liquid as opposed to any other month. Alternatively, for example, a market for an instrument deliverable in the current month is considered liquid. Further, a market for an instrument may be determined to be substantially liquid when an implied order in that market will not substantially improve, e.g. reduce, a spread between a best bid price and a best ask price in the market for the instrument, such as not reduce it by more than 1 price tick.

An order to trade, or trade order, is effectively an order or request for a transaction with respect to a financial instrument, such as futures contract, options on future, spread or other combination contract, etc., wherein the transaction further specifies at least whether the trader desires to buy (bid) or sell (offer) the financial instrument, the desired price therefore, and quantity thereof. It will be further appreciated that other factors, such as conditions, e.g. stop orders, etc., may also be specified. Further the price may be specified as a fixed value, relative value, upper or lower limit value, or range of values. The financial instrument may comprise one or more component instruments or component transactions. A financial instrument comprising more than one component instrument may also be referred to as a combination contract or combination financial instrument. A combination contract, also referred to as a strategy, may be defined as a combination of orders for outright contracts where each order for an outright contract forms a "leg" of the strategy, also referred to as a leg order. The definition of the combination contract further specifies whether buying a unit quantity of the strategy, i.e. the combination contract, requires a given leg to be bought or sold and in what quantity. Strategies may be defined by the exchange and advertised to traders as tradable instruments and/or they may be defined upon request by a market participant, such as via a request submitted to the Exchange. As described above, a combination contract permits the simultaneous trading of the component instruments thereof, i.e. simultaneous submission on the orders therefore, into a market for that instrument. Combination contracts may be used to hedge risk, e.g. risk that a price of the underlier will rise or fall in the future, risk that prices will be volatile, risk of a rise or fall in interest rates, or other risk. It will be appreciated that market participants may attempt to simulate combination contracts, particularly those not defined by the Exchange and therefore were no specific market for the combination contract exists, by separately submitting the component transactions as separate orders into the associated markets but may incur additional transaction fees and the risk, referred to as "leg risk," that the individual orders may be not be processed as desired, such as due to a change in the market at the time of submission or proximate thereto.

An order for a financial instrument comprising more than one component instrument, i.e. a combination financial instrument or contract, enables a trader to transact in multiple instruments with a single transaction which, for example, reduces transaction fees and/or the delay between submission of orders for the involved financial instruments (which may be advantageous when prices for those instruments are quickly changing), thereby reducing leg risk. A common example of a combination contract is a spread. A spread is the simultaneous buying of one financial instrument and selling of another financial instrument. For example, in a calendar spread, the trader buys (or sells) a futures contract for a particular underlier expiring in a particular month and sells (or buys) another futures contract for the same underlier expiring in another month, such as a later month. Using a calendar spread, the trader is seeking to take advantage of a rise or fall in price, as the case may be, between the expiration months of the two futures contracts. Each financial instrument of the combinations financial instrument may be referred to as a leg, leg contract or leg order. Combination financial instruments are themselves tradeable objects which are typically listed on their own order book separate from the order books for the individual component financial instruments, i.e. leg contracts, which can be separately traded as well. For example, a trader may buy or sell a spread contract which comprises a buy of A and sell of B. Further, a separate spread contract comprising a sell of A and buy of B may also be offered for trading. Other examples of combination financial instruments, which may have two or more component financial instruments, include inter-commodity spreads, intra-commodity spreads, futures strips, condor spreads, butterfly spreads, crack spreads, collar contracts, strangle contract, straddle contracts, etc. It will be appreciated that a given component financial instrument may itself be comprised of component financial instruments. For example, a financial instrument may comprise two separate spread contracts. It is possible to define combination contracts where the purchase of a single unit of the combination requires the purchase or sale of any number of units in the legs. The number of units required of any given leg is referred to as its volume ratio. Examples of strategies that include legs having different volume ratios include, but are not limited to, the butterfly, the double butterfly, crack spreads, crush spreads, and other ratio spreads.

Upon receipt of an incoming order to trade in a particular financial instrument, whether for a single component financial instrument, e.g. a single futures contract, or for multiple component financial instruments, e.g. a combination contract such as a spread contract, a match engine, as will be described in detail below, will attempt to identify a previously received but unsatisfied order counter thereto, i.e. for the opposite transaction (buy or sell) in the same financial instrument at the same or better price (but not necessarily for the same quantity unless, for example, either order specifies a condition that it must be entirely filled or not at all). Previously received but unsatisfied orders, i.e. orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e. to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments.

The order for a particular financial instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate among them, such as by picking the implied match comprising the least number of component financial instruments or the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed to appear available to trade in order to solicit the desired orders from the market participants. Depending on the number component financial instruments involved, and whether those component financial instruments further comprise component financial instruments of their own, there may be numerous implied opportunities, the submission thereof, would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

Furthermore, identifying implied matches is also computationally intensive. Generally, for an incoming order, a match in the outright market/order book therefore is preferred over implied matches. However, once it is determined that a suitable outright order is not available or there is still residual quantity available in the incoming order, if an implied match is to be found, it must be done so quickly so as not to miss the trading opportunity, e.g. if the implied markets are highly liquid or otherwise volatile, or unduly delay posting the unsatisfied incoming order, or unsatisfied portion thereof, to the order book. While successful identification of a suitable implied match would benefit the trader by providing a heretofore unavailable opportunity to trade, the delay in performing the identification process may create or increase leg risk or otherwise, especially if unsuccessful, may unduly prejudice that trader. Identifying an implied match is a complex process because of, among other considerations, the large number of potential order combinations upon which implied orders may be based. For example, a single commodity product available in 72 different delivery months will have 72 possible outright contracts, each of which may have a resting buy order or a resting sell order. There are 2556 (=(72*71)/2) potential spread contracts, noting that the buy/sell combination and sell/buy combination of any two outright contracts both correspond to the same spread contract. For a simple implied where two real orders combine to form a third order, there are 5256 (=2*72+ 2*2556) choices of the order to imply and 71 (=72−1) ways to choose a combination of two orders implying any given third order, leading to 373,156 combinations overall. As the number and complexity of the contracts involved in implication gets larger, the number of possible combinations grows exponentially.

For these reasons, trading systems that derive implied orders are often limited by computing capacity and speed. Conventional trading systems do not have an efficient method of determining all possible or best possible implied markets, especially when the order combinations involve more than a few orders. Accordingly, they limit the degree to which implication may be carried out, for example to only the component financial instruments of the financial instrument of the incoming order, or a limited subset of the combinations thereof. This has the practical effect of limiting the degree of liquidity, i.e. opportunities to trade, which the Exchange may offer, thereby limiting the potential revenue, via transaction fees, that the Exchange may earn.

In current electronic trading systems, the implication process occurs within the match engine so as to have access to the match event data as quickly as possible and determine whether an implied match exists, or whether an implied opportunity should be advertised, before the match event is communicated to the market participants. This in turn implies that this match engine must be privy to all of the markets, i.e. order books, which the implication process needs. Limited computational capacity/resources of the match engine results in a limited number of order books which can be managed and, therefore, limits the degree of implication.

In one embodiment, using the orderer/decider architecture described above, the implication process is moved outside the match engine, such as to be, for example, co-located with the Decider of one or more Order/Decider match engines, described above, such as on the same FPGA or within the same switch, gateway or other network device, so as to be privy to the match events generated thereby indicative of whether incoming orders are matched or not. In one implementation, an implicator is provided which listens to all match events and, using a set of self-maintained "shadow order books", attempts to identify, calculate or derive implied matches. If an implied match is identified, the implicator generates one or more synthetic orders into the necessary markets and injects them into the stream of incoming orders to the relevant Orderers. These synthetic orders are then processed like any other orders resulting in the necessary implied matches. As the implicator may be privy to the match event data from multiple markets, and in one embodiment all markets, it can identify a wider array of implied intra- and inter-market matches thereby improving liquidity. These synthetic orders can be injected ahead of any real orders that may be inbound to complete the implied transaction ahead thereof. The ability to identify implied matches across a wider variety of markets further enables the electronic trading system to offer a wider variety of combination financial instruments, e.g. more complex combinations, even where the market therefore may be characterized by lower liquidity, such as due to the lower demand for such a complex product. In particular, the disclosed system may improve liquidity via the identification of implied matches in the relevant component financial instrument markets alleviating the need for liquidity in the specific market for the financial instrument.

Further, in one embodiment, the process by which implied matches are identified may be separated from the process by which implied opportunities are identified. In particular, once it has been determined that an incoming order has not been satisfied, or has only been partially satisfied, both my attempting to identify an outright order match and an implied match, the incoming order, with its residual quantity, will be placed on the order book to rest and to be advertised to the market participants as being available to trade. As was described above, to further improve liquidity by creating additional opportunities for this order to be traded, an implied opportunity processor may then determine what, if any, one or more orders in related markets, if received, would allow the incoming order to trade. To facilitate this process, the implied opportunity generator, as will be described, may maintain its own shadow set of order books. It will be appreciated that the implied opportunity processor, as will be described, may derive, calculate, or otherwise compute more than one implied opportunity, each of which may, alone or in concert with other resting outright orders, allow the incoming order to trade and wherein when any one of these one or more implied opportunities is traded against, the remaining implied opportunities are canceled. Further, should orders be placed against more than one of these implied opportunities, arbitration mechanisms may be provided to determine which will prevail. Alternatively, the implied opportunity processor may determine that more than one implied opportunity is needed, alone or in concert with presently resting orders. As implied opportunities are synthetic and only tradeable if all of the related orders are tradeable, mechanisms may be necessary, for example, to ensure that all of the implied opportunities are simultaneously traded together or not at all. Alternatively, the implied opportunity may be permitted to trade under the assumption that the remaining opportunities will also be traded eventually, thereby allowing all of the related orders to be traded, wherein the Exchange, or another entity, such as a Market Maker, adopts the synthetic counter position and the risk that all of the implied opportunities will not be traded.

The identified implied opportunities are then added to the market data so as to solicit the desired orders. That is, synthetic market data events are generated to advertise the availability of the implied opportunity in order to solicit the desired order(s). In one embodiment, synthetic orders identical to those needed are injected into the incoming order stream of the relevant markets. As the implied match function would have already determined that suitable counter orders do not exist in those markets, these synthetic orders will not be matched and instead will be rested on the respective order books and advertised to the market participants via the standard market data feed. Should a market participant choose to trade against one of these synthetic orders, the implied matching functionality described above, may see such orders to create an implied match and execute trades among all of the relevant orders.

Separating implied opportunity from implied match allows streamlining of both functions so that the processing can be performed quickly. In particular, identification of implied matches involves reviewing the order books of products which share at least one common component instrument to discern if the requisite orders are resting therein. In contrast, the identification of implied opportunities requires knowledge of the available order books for products sharing at least one common component instrument but review of those order books may be unnecessary assuming an implied match was not previously identified. In one embodiment, while the functions of implied match identification and implied opportunity identification may be separated, they may still be coupled with each other so as, for example, allow the implied match processor to identify those orders that it was unable to identify during its process to the implied opportunity generator. Furthermore, identification of implied matching typically requires analysis of a greater number of generations of combination instruments as the component instruments typically further comprise component instruments of their own, as compared to identification of implied opportunities where such opportunities are typically readily identified via identification of common singular component instruments. Further, while identification of implied matches is done as part of/in concert with the matching process, a process which must be performed sequentially, quickly and deterministically, the identification of implied opportunities is effectively merely producing information to be broadcast to the market participants and can be performed in parallel with the matching process or otherwise separately therefrom. Separation further permits the electronic trading system to offer either identification of implied matches or implied opportunities but not both if necessary. For example, due to high volumes, it may be desirable to turn down the frequency of implied opportunity identification, however, turning off implied match identification may change the liquidity pool and alter the market, so it should remain on during the life of a trading session.

The ability to see all incoming transactions and match events for a given set of markets, such as by the Orderer and Decider components of the Orderer/Decider architecture described above and in more detail below, allows for improved market protection mechanisms, such as improved credit controls based on pre-trade transactions, e.g. incoming orders, referred to as "in band." Credit controls generally evaluate trader activity, e.g. trade orders, against specified activity limits, e.g. credit limits, to control the amount of risk, which may be defined as the predicted maximum dollar amount/value that may be lost over a defined period of time based on a particular confidence level, that a market participant, or group thereof, may undertake. Risk, as opposed to the mere magnitude of the transaction, is generally a derived value which contemplates the transaction in combination with other factors, such as other transactions, which may dampen or magnify the risk of the particular transaction, or for which the risk thereof may be dampened or magnified by the particular transactions. One methodology for measuring risk is referred to as percentage of value at risk (VaR) which is a statistical technique to measure and quantity a level of financial risk over a period time based on market velocity and direction, i.e. the rate and direction of price changes in the market. Credit controls may be applied to individual traders and/or organizations of traders, such as all of the traders working for a particular broker.

Applying credit controls requires determining the risk incurred with each transaction undertaken by the market participant which generally involves making one or more assumptions as to future events and applying those assumptions to the current transaction. As such transactions may be related to other transactions undertaken by that market participant as well as other factors, the quantification of the risk of any one transaction may be performed in numerous different ways based on different assumptions, each possibly yielding a different result, and is generally computationally intensive. Accordingly, credit controls have generally been applied after transactions have been processed, e.g. after the matching process, so as not to impede transaction throughput. As opposed to evaluating credit limits and applying credit controls based on post-trade results, referred to as "out of band," the disclosed embodiments enable proactive operations to apply credit controls eliminating the need, for example, to retroactively "unwind" completed transactions which exceeded a trader's credit limit.

The disclosed embodiments generally implement a high speed credit evaluator to maintain credit limits, such as for each product, for each individual account, for each individual side of a trade, for each trading firm, for each clearing firm, or combinations thereof. The disclosed embodiments may further accept limit updates from external sources on a periodic, non-real time basis, disseminate position and limit data on a scheduled or ad-hoc basis, and enforce positional limits, as calculated based on quantity, in real-time for all incoming orders to the match engine.

In particular, the disclosed embodiments, having access to all incoming orders, may evaluate not only a specific trader activity, but all other trader's activity as well so as to be able to determine how a particular transaction will affect a particular trader's credit position, e.g. present level of risk as compared to their limit, as well as the effect on all of the other traders' credit positions. As opposed to credit control mechanisms implemented by the market participants themselves, which are only privy to the transaction of those market participants, the disclosed embodiments can evaluate the effects of transactions not only on the party but also on the counter party thereto, as well as other market participants engaged in related transactions.

Furthermore, the disclosed embodiments enable consideration of incoming transactions in conjunction with resting orders and/or open positions (completed orders) in the submitting market participant's and/or other market participants' portfolios, consideration of the probability that the incoming order will be fully or partially satisfied/filled such as by looking at the current market depth, other incoming orders for the same product or counter party activity, as well as consideration of risk to the entire market based on size of the incoming order.

When it is determined that a given transaction causes an increase in risk above the defined credit limit, the transaction may be blocked. It will be appreciated that transactions which do not increase risk above a particular threshold, are risk neutral or reduce risk, may be permitted even when the particular market participant's credit limit has been exceeded. In one embodiment, a risk exceeding transaction may only be partially filled according to a modified allocation algorithm designed to reduce the risk of the transaction thereby. In one embodiment, multiple credit limit thresholds may be defined whereby a lower limit is specified to cause preemptive actions to occur, such as a warning message and/or may trigger more intensive scrutiny of subsequent transactions, such as via the application of more accurate, but also possibly more computationally intensive, risk computation algorithms. In one embodiment, patterns of risky activity may be identified based on pre-defined or dynamically defined activity patterns. Furthermore, the disclosed embodiments, may implement proactive mechanisms to reduce risk such as by computing and soliciting risk reducing transactions from the market participants in a similar manner as implied opportunities.

As was described above, in order to compute implied matches and/or opportunities, access to all of the interdependent order books is necessary so as to be able to identify suitable markets and actual or hypothetical resting orders therein which permit a given transaction to be completed. However, limited data storage capacity and/or bandwidth therewith limits the number of order books which may be stored and/or accessed by any given match engine. Aside from restricting liquidity and the variety of product offerings, this also necessitates providing specific match engines to handle specific markets which necessarily constrains transaction throughput and fault tolerance.

Accordingly, in one embodiment of the disclosed electronic trading system architecture, multiple generic match engines, or redundant match engine sets, as described above, may be provided which are capable of processing a transaction for any of the markets provided by the electronic trading system. All of the order books may be maintained in a centrally accessible memory architecture. As incoming orders are received, they may be allocated or otherwise disseminated to one of the generic match engines (or match engine sets). To determine which match engine (or set) to send the transaction for processing, the system may determine the outright and all related order books to the given transaction. If the identified order books have not yet been allocated to a match engine (or set thereof), an available match engine (or set) is selected, the identified order books are allocated and the incoming transaction is routed thereto. If the identified order books are already allocated to one of the match engines (or sets), the incoming order is routed to that match engine (or set). During transaction processing, the match engine (or set) accesses and updates the order books as needed to perform the matching and implication functions as described. When the match engine (or set) has completed processing of all transactions, before another transaction is routed thereto, it relinquishes its allocation of the identified order books, and is then available for a new transaction for a new set of identified order books.

In one embodiment, the allocation of identified order books may further include allocation of a defined matching algorithm to be applied by the match engine (or set). This allows different matching algorithms to be used by each match engine.

Allocation of the identified order books may be implemented by actually transferring the data representative thereof to a memory associated with the selected match engine and then transferring the updated order books back to the central memory upon deallocation. Alternatively, access to the central memory and, further, to the identified order books, may be allocated such as by providing the memory address locations of identified order books in the central memory to the selected match engine (or set), such as via provision of a sparse matrix or other data structure which comprises the identification of the requisite memory locations. Updates to the order books in the central memory may then be accomplished via remote direct memory access ("RDMA") or other back channel network based memory access. It will be appreciated other storage resource sharing mechanisms may be utilized, such as non-uniform memory architecture (NUMA) compliant mechanisms, structured or unstructured databases, such as tag clouds, etc.

The disclosed embodiment, thereby, provide for fungible generic match engines which can handle independent/unrelated markets in parallel. In one embodiment, the number of generic match engines (or sets thereof) may be set so as to statistically minimize transaction latency among transactions to independent/unrelated markets. Order books are only tied to a given match engine (or set) for the duration of the order processing of transactions therein. By altering the degree of interdependencies computed to identify related order books, parallelism among transaction processing and/or liquidity/trading opportunities can be balanced.

While the disclosed embodiments may be discussed in relation to futures and/or options on futures trading using a central limit order book ("CLOB"), it will be appreciated that the disclosed embodiments may be applicable to any financial instrument, e.g. equity, options or futures, trading system or market now available or later developed, which may use a CLOB, a Request for Quote or other methodology. A CLOB is a trading method used by most exchanges globally. It is a transparent system that matches customer orders (e.g. bids and offers) on a 'price time priority' basis. The highest ("best") bid order and the lowest ("cheapest") offer order constitutes the best market or "the touch" in a given security or swap contract. Customers can routinely cross the bid/ask spread to effect low cost execution. They also can see market depth or the "stack" in which customers can view bid orders for various sizes and prices on one side vs. viewing offer orders at various sizes and prices on the other side. The CLOB is by definition fully transparent, real-time, anonymous and low cost in execution. In the CLOB model, customers can trade directly with dealers, dealers can trade with other dealers, and importantly, customers can trade directly with other customers anonymously. In contrast to the CLOB approach, the RFQ trading method is an asymmetric trade execution model. In this method, a customer queries a finite set of participant market makers who quote a bid/offer ("a market") to the customer. The customer may only "hit the bid" (sell to the highest bidder) or "lift the offer" (buy from the cheapest seller). The customer is prohibited from stepping inside the bid/ask spread and thereby reducing its execution fees. Contrary to the CLOB model, customers can only trade with dealers. They can not trade with other customers, and importantly, they can not make markets themselves.

A limit order is an order to buy a security at no more than a specific price, or to sell a security at no less than a specific price (called "or better" for either direction). This gives the trader (customer) control over the price at which the trade is executed; however, the order may never be executed ("filled"). Limit orders are used when the trader wishes to control price rather than certainty of execution. A market order is a buy or sell order to be executed immediately at current market prices. As long as there are willing sellers and buyers, market orders are filled. Market orders are therefore used when certainty of execution is a priority over price of execution. A conditional order is any order other than a limit order which is executed only when a specific condition is satisfied, such as a stop or stop-loss order which is an order to buy or sell a stock once the price of the stock reaches a specified price.

As was described above, an order to trade, whether it be a limit order, market order, conditional order or some other order type, may be considered a business transaction, i.e. one or more operations or acts which implement one or more business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the business rules, may be deterministic in that they must occur, or be processed, in an (temporal) order and/or in real time as defined by business rules and/or to effect the business/commercial purpose or meet participant expectations. It will be appreciated that such deterministic processing may, in fact, result in out of order processing depending on the business rules, such as where conditions for processing orders are imposed which may not be met by an earlier transaction before a later transaction. Deterministic order may be paramount. Real time processing may be secondary. For example, when an offer transaction is received to which an prior offer transaction counter thereto has not been previously received, it should be matched with the next offer transaction received counter thereto (in a FIFO market). However, if the earlier offer transaction specifies a condition, such as that it must be completely filled or not at all, it may be deferred in favor of a later arriving offer transaction when the condition is not met. As was discussed above, the representation (but not, perhaps, the perception) of the current state of the business environment, e.g. market, in which the business transactions are transacted, or changes therein, should present an accurate reflection of the actual state or state change so as to not mislead participants or provide an unfair advantage.

An exemplary trading network environment including the disclosed electronic trading system 100 is shown in FIG. 1. In the exemplary environment, the electronic trading system 100 receives orders and transmits market data, e.g. related to orders and trades, to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The electronic trading system 100 may be physically implemented with one or more mainframe, desktop or other computers, such as the computer 2500 described below with respect to FIG. 25, reconfigurable logic components, network switches, gateways, routers and other communications devices operative to facilitate communications within the electronic trading system 100 and between the electronic trading system 100 and the market participants. Logically, the electronic trading system 100 implements numerous functions/functional modules each of which, as will be described, may be implemented in software, hardware or a combination thereof, as single standalone component or combination of interconnected components or in combination with another function/functional module.

It will be appreciated that identifying and defining the boundaries of an inter-networked communications system, the internal components thereof being interconnected as well, such as between the electronic trading system 100 and market participants and the infrastructure which allows communications there between, may be complex. Physically, the various network device, e.g. switches, gateways, routers, and the cabling and connections there between, may be owned, leased and/or controlled by different entities, as well as physically located in disparate geographic locations which may be geographically proximate to, or remote from, the entity which owns, leases or controls the network device. In some cases, a network device owned and operated by a service provider may be physically located within the premises of entity to which the services are provide or, alternatively, the network device owned and operated by the service recipient may be physically located within the premises of the service provider, both situations being referred to as colocation. Logically, the paths, and the boundaries there between, over which transactions flow and the boundaries between entities may be more difficult to discern.

Accordingly, as generally used herein, the electronic trading system 100, or the components or boundaries thereof, may be defined in numerous ways. In particular, the physical electronic trading system 100 may be defined by the entity defines the business rules for processing trading transactions and which owns or otherwise controls the components which implement those rules, wherever those components may be geographically located. The logical boundaries of the electronic trading system 100, which may also be referred to as the demarcation point or edge 142, may be defined as the first, or last, point at which the electronic trading system 100 can control or otherwise manipulate an incoming, or outgoing, transmission, e.g. data message or packet. For example, for an outgoing data packet, the edge 142 of the electronic trading system 100 may be defined as the last point at which the electronic trading system 100, or component thereof, can recall or otherwise stop the transmission. For example, the demarcation point or edge 142 may be the point at which a market data message is provided to the multi-casting protocol for transmission or other point where data packets are individually forwarded toward their respective destinations, e.g. individually distinguishable by destination address. In at least one disclosed embodiment, the edge or demarcation point 142 may further be defined as the point at which data messages or packets destined for multiple market participants are transmitted simultaneously, or substantially simultaneously, i.e. transmitted with short a time period such that an observer would consider them simultaneously transmitted or otherwise find the difference there between practically, logically or physically imperceptible. Thereafter, variation in network path latencies, etc. may impart unequal delays on the delivery of those messages.

Generally, the edge 142 will lie between a component of the electronic trading system 100, such as a router or gateway device (not shown), and a component, such as router or gateway device (not shown), controlled by another entity, such as an Internet Service Provider or other operator of the LAN 124 or WAN 126 shown in FIG. 1. As described above, the edge or demarcation point 142 may be geographically located anywhere, e.g. it may be geographically proximate to or remote from the other components of the electronic trading system 100. In some embodiments, market participants may collocate devices for receiving data from the electronic trading system 100 in the same geographic location as the components of the electronic trading system 100 which transmit that data.

Referring back to FIG. 1, functions/functional modules of the electronic trading system 100 may include a user database 102, stored in a memory other storage component, e.g. see the description below with respect to FIG. 25, which includes information identifying market participants, e.g. traders, brokers, etc., and other users of electronic trading system 100, such as account numbers or identifiers, user names and passwords. An account data function 104 may be provided which may process account information that may be used during the matching and trading process, such as processing trading fees or maintaining credit limits, etc. A match engine function 106, described in detail below, may be included to receive incoming transactions and access order books, such as may be stored in the order book function 110, and match incoming and resting transactions, such as bid and offer prices, and may be implemented with software that executes one or more algorithms for matching bids and offers, e.g. FIFO, pro rata, etc. A trade database 108, stored in a memory or other storage medium, may be included to store information identifying trades and descriptions of trades. In particular, a trade database may store information identifying the time that a trade took place and the contract price. An order book function 110 may be included to store resting offers to buy or sell for the various products traded on the exchanges and to compute or otherwise determine current bid and offer prices for those products. A market data function 112 may be included to collect market data and prepare the data for transmission to market participants. A risk management function 134 may be included to compute and determine a user's risk utilization in relation to the user's defined risk thresholds, i.e. implement credit controls as will be described. An order processing function 136 may be included to decompose delta based and bulk order types for processing by the order book function 110 and/or match engine function 106. A volume control function 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the electronic trading system 100 components, including the user database 102, the account data function 104, the match engine function 106, the trade database 108, the order book function 110, the market data function 112, the risk management function 134, the order processing function 136, or other component or function of the electronic trading system 100.

The trading network environment shown in FIG. 1 includes exemplary computer devices 114, 116, 118, 120 and 122 which depict different exemplary methods or media by which a computer device may be coupled with, either directly or indirectly, the electronic trading system 100 or by which a user may communicate, e.g. send and receive, trade or other information therewith. It will be appreciated that the types of computer devices deployed by market participants and the methods and media by which they communicate with the electronic trading system 100 is implementation dependent and may vary and that not all of the depicted computer devices and/or means/media of communication may be used and that other computer devices and/or means/media of communications, now available or later developed may be used. Each computer device, which may comprise a computer 2500 described in more detail below with respect to FIG. 25, may include a central processor that controls the overall operation of the computer and a system bus that connects the central processor to one or more conventional components, such as a network card or modem. Each computer device may also include a variety of interface units and drives for reading and writing data or files and communicating with other computer devices and with the electronic trading system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 2520 shown in FIG. 25 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the electronic trading system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computers and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126, such as via a network gateway or router (not shown), which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 2520 shown in FIG. 25 and described below with respect thereto.

As was described above, the users, i.e. the market participants, of the electronic trading system 100 may include one or more market makers 130 which may maintain a market by providing constant bid and offer prices for a derivative or security to the electronic trading system 100, such as via one of the exemplary computer devices depicted. The electronic trading system 100 may also exchange information with other trade engines, such as trade engine 138. One skilled in the art will appreciate that numerous additional computers and systems may be coupled to electronic trading system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to the electronic trading system 100. In another example, the exemplary computer device 118 may include computer-executable instructions for receiving market data from the electronic trading system 100 and displaying that information to a user.

Of course, numerous additional servers, computers, handheld devices, personal digital assistants, telephones and other devices may also be connected to the electronic trading system 100. Moreover, one skilled in the art will appreciate that the topology shown in FIG. 1 is merely an example and that the components shown in FIG. 1 may include other components not shown and be connected by numerous alternative topologies.

A. Deterministic Redundant Architecture

Figure 2:
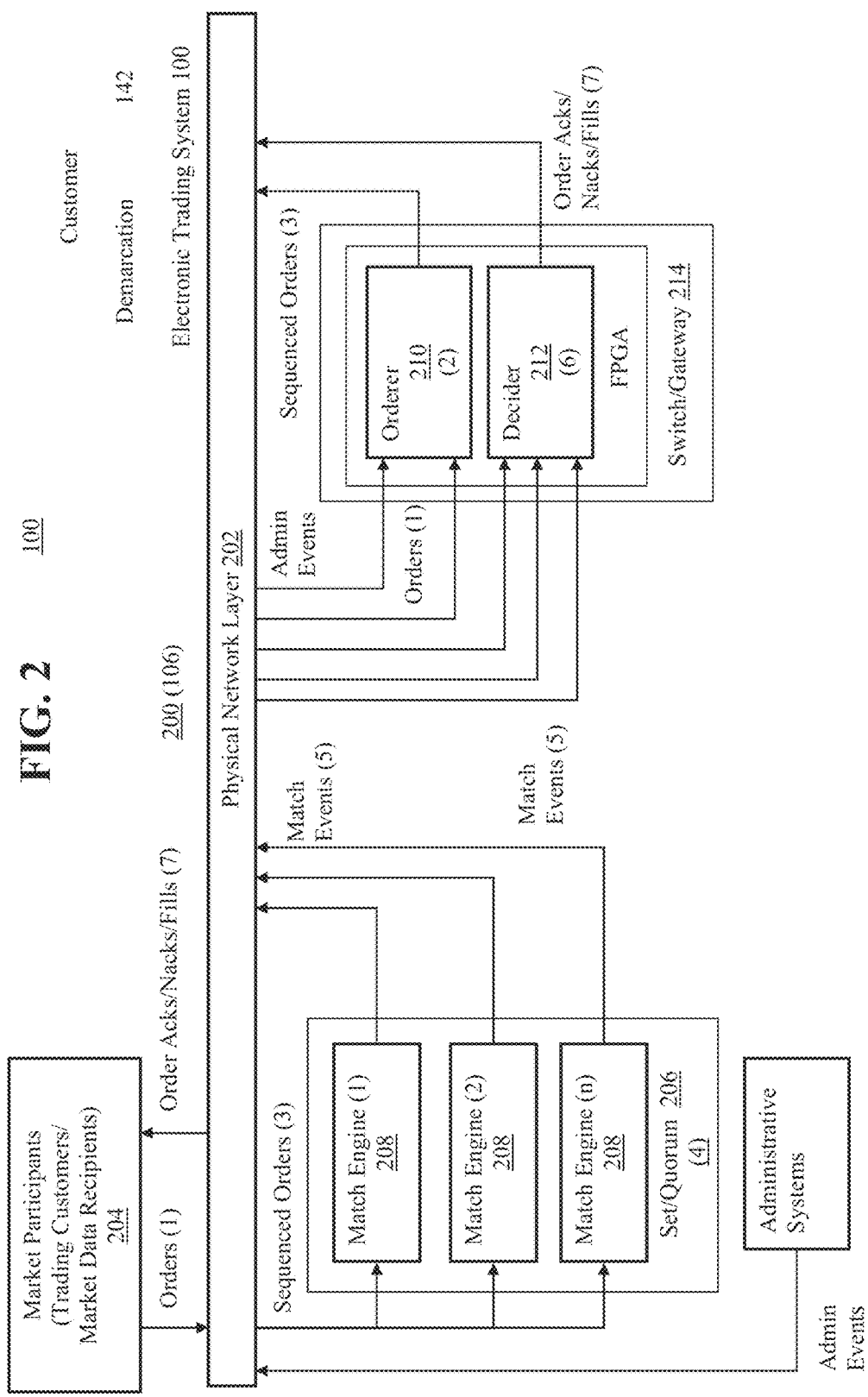
FIG. 2 a block diagram of an exemplary implementation of the system of FIG. 1 according to one embodiment.

FIG. 2 shows a block diagram depicting, in more detail, the match engine 106 and order processor 138 function of the electronic trading system 100, according to one embodiment. It will be understood that numbers shown in parentheses next to arrows in this figure and in the other figures are indicative of one exemplary order of data flow through the depicted system and show how data/transactions enter the electronic trading system's 100 physical network layer 202 and are routed, processed and/or transformed by the components shown in the figure and described herein. As shown in FIG. 2, the electronic trading system 100 includes a interconnecting infrastructure, such as a physical communication network 202, which may include network devices such as gateways, switches, and interconnecting media there between, such as backplane interconnects, optical and electrical communications media or other wired or wireless interconnect. The interconnecting infrastructure generally couples the various components of the electronic trading system 100 together and with market participant devices 204 as was described.

The electronic trading system 100, as described above, includes a match engine function 106 which may be implemented by one or more sets 206 of redundant transaction processors 208, i.e. match engines. While a single set 206 of match engines 208 will be described herein, it will be appreciated that many such sets 206 may be implemented both to improve fault tolerance through redundant operation and to increase the transaction handling capacity of the electronic trading system 100.

Coupled with the set 206 of redundant match engines 208 via the interconnecting infrastructure is the order processing function 138 of the electronic trading system. In one embodiment, the order processing function 138 is implemented on one or more FPGA devices, i.e. by one or more logic components thereof, coupled with the network gateway device (not shown), such as via a backplane interconnect, through which incoming transactions ingress the electronic trading system 100 and outgoing messages egress the electronic trading system 100. The network gate way device is further coupled with the interconnecting infrastructure to which the set 206 of match engines 208 are also coupled. It will be appreciated that the set 206 of transaction processors may be coupled with the order processing function 138 via other means such as a dedicated interconnection there between. Further, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

As was described above, the order processing function 138 receives incoming transactions from the market participants 204 and ensures deterministic processing thereof, i.e. that the incoming transactions are processed according to the defined business rules of the electronic trading system 100, e.g. in the order in which they are received by the order processing function 138. Further, the order processing function 138 receives the output of each of the redundant match engines 208 of the set 206 and evaluates those results to determine the correct result. The order processing function 138 may then further generate, or cause to be generated, appropriate acknowledgements and/or market data based thereon which are then communicated to the market participants 204.

In particular, FIG. 2 depicts a block diagram of a system 200, which may also be referred to as an architecture, for processing a plurality, e.g. a series or sequence, of financial transactions, such as orders to trade a financial product, received via a network, such as the network 126 of FIG. 1, from a plurality of market participants 204, the processing of each transaction operative to cause a change in a current state of an electronic marketplace for one or more financial products. In one embodiment, each transaction may comprise a request to transact, e.g. an order to buy or sell, one or more financial products. A request to transact may further comprise an request to cancel a previous transaction, a status inquiry or other transaction.

The system 200 includes a transaction receiver 210, e.g. an orderer as described above, which may be implemented as one or more logic components such as on an FPGA which may include a memory or reconfigurable component to store logic and processing component to execute the stored logic, coupled with the network 126, such as via the interconnection infrastructure 202, and operative to receive each of the plurality of financial transactions and, upon receipt, augment, or otherwise ascribe or associate with, the received financial transaction with sequence data, such as an ordering or sequence number, indicative of a relationship, temporal or otherwise based on business rules/logic, e.g. a deterministic relationship, between the received financial transaction, e.g. the time of receipt thereof, and any of the plurality of financial transactions, e.g. the times of receipt thereof, previously and/or subsequently received by the transaction receiver 210. The ascribed ordering may then implicitly define the relationship with those transactions received thereafter. In one embodiment, the ordering may be a time stamp or, alternatively, an incremented sequence number.

The system 200 also includes a plurality 206 of transaction processors 208, e.g. match engines, coupled with the transaction receiver 210, such as via the communications infrastructure 202, each of the plurality 206 of transaction processors 208 operative to receive each of the augmented financial transactions and process, e.g. apply the business logic/matching algorithm to, the received augmented financial transaction in accordance with the sequence data to determine the change in the current state of the electronic marketplace caused thereby. As was described above, the processing is irrespective of the sequence in which each of the augmented financial transactions are received from the orderer, which my be different from the relationship indicated by the sequence data and which may result in a different change in the state of the electronic marketplace.

In one embodiment of the system 200, the processing of received augmented financial transactions implements a central limit order book of a financial market for at least one financial instrument.

In one embodiment of the system 200, each of the plurality 206 transaction processors 208 operates asynchronously with respect to the others of the plurality 206 of transaction processors 208, but, if operating properly, process the augmented financial transactions the, same, i.e. according to the sequence data and the applicable business rules. It will be appreciated that transaction processors 208 of redundant set 206 may be added or removed at will In one embodiment of the system 200 wherein the relationship indicated by the sequence data of a particular augmented financial transaction with respect to others of the augmented financial transactions is different from a relationship indicated by the order of receipt by one or more of the plurality of transaction processor of the particular augmented financial transaction with respect to the others of the augmented financial transactions, such as due to underlying processing priorities, transmission and/or routing anomalies, and would result in a different state change in the electronic marketplace.

In one embodiment of the system 200, each of the financial transactions comprises a request to transact in one of the one or more financial products, the processing of each augmented financial transactions comprising identifying whether a previously processed augmented financial transaction remains incomplete and is counter thereto and, if so, indicating that a transaction there between may be completed, and if not, indicating that data indicative of the availability of the augmented financial transaction be stored in a database.

The system 200 further includes a result arbiter 212, e.g. a decider as described above, which may be implemented as one or more logic components such as on the same or a different FPGA as the orderer 210, coupled with each of the plurality 206 of transaction processors 208, such as via the communications infrastructure 202, and operative to receive therefrom at least one of the determined changes in the state of the electronic marketplace for each processed augmented financial transaction and, based thereon, determine a selected change in the current state of the electronic marketplace for the processed augmented financial transaction and apply the selected change in the current state of the electronic marketplace to update the state of the electronic marketplace, the current state of the electronic marketplace now reflective thereof.

In one embodiment of the system 200, the transaction receiver 210 and result arbiter 212 are implemented in a network switch coupled with the data link layer/network layer of the communications infrastructure.

In one embodiment of the system 200, the result arbiter 212 is operative to compare the received determined changes in the state of the electronic marketplace for each processed augmented financial transaction, and determine the selected change in the current state of the electronic market place to be the received determined change in the state of the electronic marketplace for each processed augmented financial transaction provided by, for example, the majority or a quorum of the plurality of transaction processors.

In one embodiment, the system 200, the result arbiter 212 may further determine that a transaction processor 208 of the plurality 206 of transaction processors 208 is faulty when the determined change in the state of the electronic marketplace for a processed augmented financial transaction received therefrom fails to agree with the he determined changes in the state of the electronic marketplace for a processed augmented financial transaction received from at least one other of the plurality 206 of transaction processors 208. The determination may be subject to a time delay threshold defining an amount of time which must elapse without having received a result before a fault is declared. As will be described, this threshold may be defined so as to prevent determination of a fault when a delayed result is expected, such as when a particular transaction processor 208 is known to be performing maintenance operations or is otherwise busy, offline or deactivated.

For example, in one embodiment of the system 200, each of the plurality 206 of transaction processors 208 is operative to periodically perform one or more other functions, such as maintenance, e.g. garbage collection, during which augmented financial transactions are not processed or processing is delayed. In this embodiment, each of the plurality 206 of transaction processor 208 may be further configured to not perform the one or more other functions contemporaneously with the performance of the on or more other functions by the remaining of the plurality 206 of transaction processors 208. Alternatively, more than one transaction processor 208 may be allowed to perform other operations assuming a sufficient number are remaining to meet a requisite level of fault tolerance.

In one embodiment of the system 200, the plurality of financial transactions may further include a plurality of administrative transactions, each of may or may not cause a change in the current state of the electronic marketplace. Such administrative transactions may include instructions to configure the transaction processors 208, such as to synchronize their operation or cause them to perform maintenance or other operations.

Figure 3:
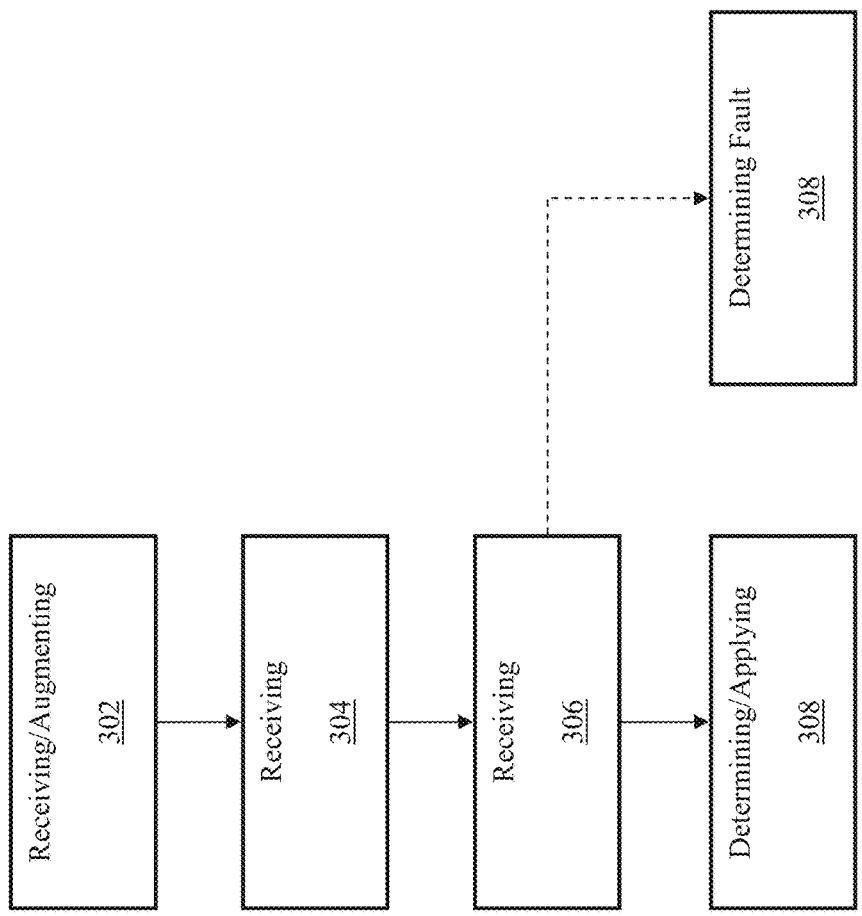
FIG. 3 depicts a flow chart showing operation of the system of FIG. 1 according to one embodiment.

FIG. 3 depicts a flow chart 300 showing operation of the system 200 of FIG. 2. In particular FIG. 3 shows a computer and/or FPGA implemented method for processing a plurality, e.g. a series or sequence, of financial transactions, such as orders to trade a financial product, received via a network, such as the network 126 of FIG. 1, from a plurality of market participants 204, the processing of each transaction operative to cause a change in a current state of an electronic marketplace for one or more financial products. In one embodiment, each transaction may comprise a request to transact, e.g. an order to buy or sell, one or more financial products. A request to transact may further comprise an request to cancel a previous transaction, a status inquiry or other transaction.

The operation of the system 200 includes receiving, by a transaction receiver 210 from the network 126, such as via the interconnection infrastructure 202, each of the plurality of financial transactions and, upon receipt, augmenting or otherwise ascribing or associating with, the received financial transaction with sequence data, such as an ordering or sequence number, indicative of a relationship, temporal or otherwise based on business rules/logic, e.g. a deterministic relationship, between the received financial transaction, e.g. the time of receipt thereof, and any of the plurality of financial transactions, e.g. the times of receipt thereof, previously and/or subsequently received by the transaction receiver 210 (Block 302). The ascribed ordering may then implicitly define the relationship with those transactions received thereafter. In one embodiment, the ordering may be a time stamp or, alternatively, an incremented sequence number.

The operation of the system 200 further includes receiving, by each of a plurality 206 of transaction processors 208, e.g. match engines, coupled with the transaction receiver 210, such as via the communications infrastructure 202, each of the augmented financial transactions and processing, e.g. apply the business logic/matching algorithm to, the received augmented financial transaction in accordance with the sequence data to determine the change in the current state of the electronic marketplace caused thereby (Block 304). As was described above, the processing is irrespective of the sequence in which each of the augmented financial transactions are received from the orderer, which my be different from the relationship indicated by the sequence data and which may result in a different change in the state of the electronic marketplace.

In one embodiment of the operation of the system 200, the processing of received augmented financial transactions implements a central limit order book of a financial market for at least one financial instrument.

In one embodiment of the operation of the system 200, each of the plurality 206 transaction processors 208 operates asynchronously with respect to the others of the plurality 206 of transaction processors 208, but, if operating properly, process the augmented financial transactions the, same, i.e. according to the sequence data and the applicable business rules. It will be appreciated that transaction processors 208 of redundant set 206 may be added or removed at will In one embodiment of the operation of the system 200 wherein the relationship indicated by the sequence data of a particular augmented financial transaction with respect to others of the augmented financial transactions is different from a relationship indicated by the order of receipt by one or more of the plurality of transaction processor of the particular augmented financial transaction with respect to the others of the augmented financial transactions, such as due to underlying processing priorities, transmission and/or routing anomalies, and would result in a different state change in the electronic marketplace.

In one embodiment of the operation of the system 200, each of the financial transactions comprises a request to transact in one of the one or more financial products, the processing of each augmented financial transactions comprising identifying whether a previously processed augmented financial transaction remains incomplete and is counter thereto and, if so, indicating that a transaction there between may be completed, and if not, indicating that data indicative of the availability of the augmented financial transaction be stored in a database.

The operation of the system 200 further includes receiving, by a result arbiter 212, e.g. a decider as described above, which may be implemented as logic component such as on the same or a different FPGA as the orderer 210, coupled with each of the plurality 206 of transaction processors 208, such as via the communications infrastructure 202, at least one of the determined changes in the state of the electronic marketplace for each processed augmented financial transaction (Block 306) and, based thereon, determining a selected change in the current state of the electronic marketplace for the processed augmented financial transaction and applying the selected change in the current state of the electronic marketplace to update the state of the electronic marketplace, the current state of the electronic marketplace now reflective thereof (Block 308).

In one embodiment of the operation of the system 200, the transaction receiver 210 and result arbiter 212 are implemented in a network switch coupled with the data link layer/network layer of the communications infrastructure.

In one embodiment of the operation of the system 200, the operation further includes comparing the received determined changes in the state of the electronic marketplace for each processed augmented financial transaction, and determining the selected change in the current state of the electronic market place to be the received determined change in the state of the electronic marketplace for each processed augmented financial transaction provided by, for example, the majority or a quorum of the plurality 206 of transaction processors 208.

In one embodiment, the operation of the system 200 further includes determining that a transaction processor 208 of the plurality 206 of transaction processors 208 is faulty when the determined change in the state of the electronic marketplace for a processed augmented financial transaction received therefrom fails to agree with the he determined changes in the state of the electronic marketplace for a processed augmented financial transaction received from at least one other of the plurality 206 of transaction processors 208 (Block 310). The determination may be subject to a time delay threshold defining an amount of time which must elapse without having received a result before a fault is declared. As will be descried, this threshold may be defined so as to prevent determination of a fault when a delayed result is expected, such as when a particular transaction processor 208 is known to be performing maintenance operations or is otherwise busy, offline or deactivated.

For example, in one embodiment of the operation of the system 200, each of the plurality 206 of transaction processors 208 is operative to periodically perform one or more other functions, such as maintenance, e.g. garbage collection, during which augmented financial transactions are not processed or processing is delayed. In this embodiment, each of the plurality 206 of transaction processor 208 may be further configured to not perform the one or more other functions contemporaneously with the performance of the on or more other functions by the remaining of the plurality 206 of transaction processors 208. Alternatively, more than one transaction processor 208 may be allowed to perform other operations assuming a sufficient number are remaining to meet a requisite level of fault tolerance.

In one embodiment of the operation of the system 200, the plurality of financial transactions may further include a plurality of administrative transactions, each of may or may not cause a change in the current state of the electronic marketplace. Such administrative transactions may include instructions to configure the transaction processors 208, such as to synchronize their operation or cause them to perform maintenance or other operations.

B. Direct Market Instrumentation

Figure 4:
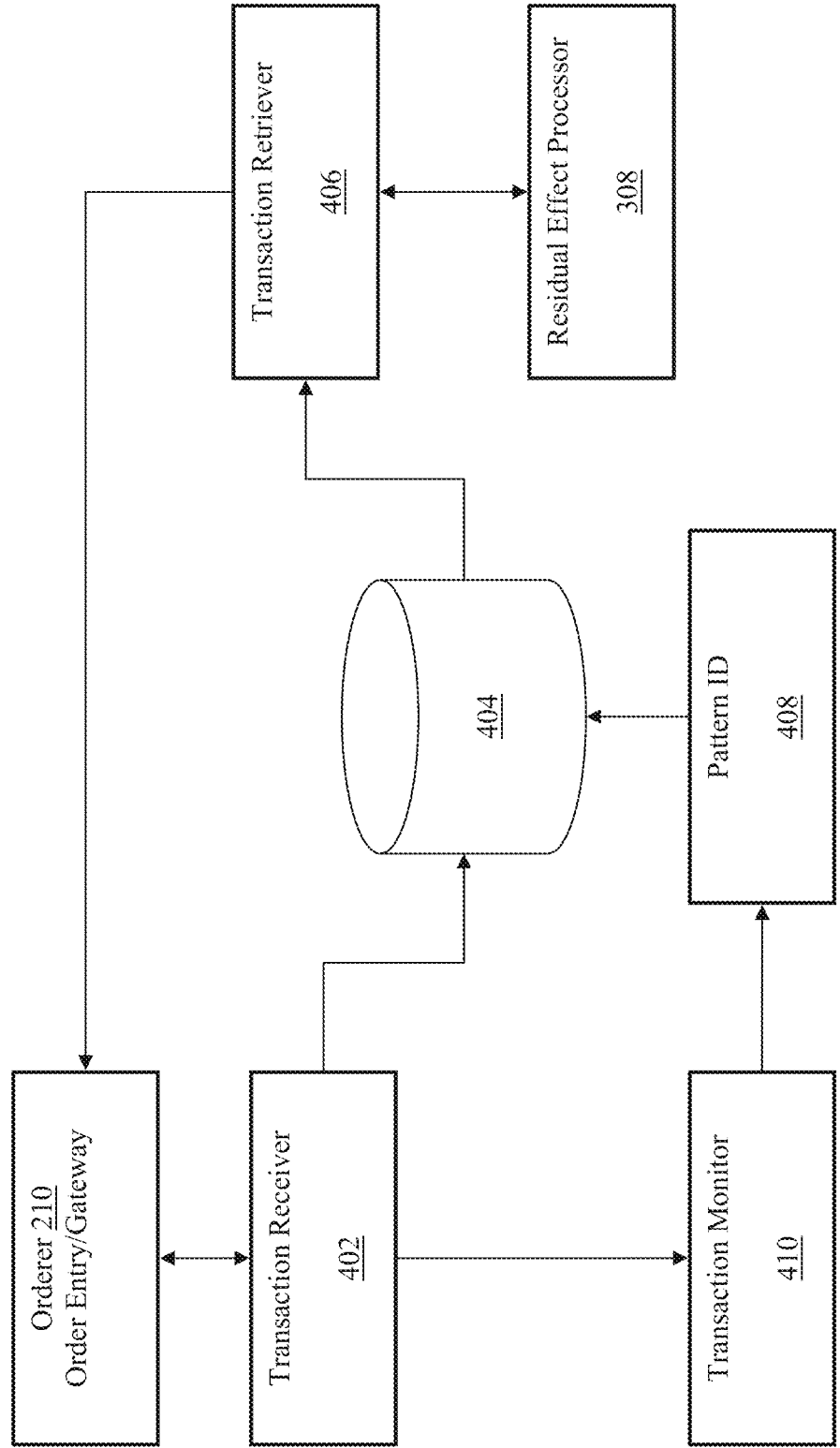
FIG. 4 depicts a block diagram of an exemplary system for reproducing a state of an electronic market place for use with the system of FIG. 1 according to one embodiment.

Referring now to FIG. 4, there is shown a block diagram depicting a system 400 for reproducing a state of an electronic marketplace for one or more financial products resulting from processing, by a financial transaction processing system 100, such as the electronic trading system 100 described herein, of a plurality of financial transactions received from a plurality of market participants, the processing of each of which causes a change in at least an intermediate state of the electronic marketplace. In one embodiment, the system 400 is implemented as part of the matching function 106 of the electronic trading system 100. It will be appreciated that the system 400 may be implemented as part of other functions of the electronic trading system 100, or otherwise coupled with the communications infrastructure 202, which as described above, interconnects the various components of the electronic trading system 100. In one embodiment, the system 400 is implemented as a reconfigurable logic device, e.g. FPGA, coupled with the orderer 210 and/or decider 212 described above and, in one implementation, is implemented on the same FPGA device.

The system 400 includes a transaction receiver 402, which may be implemented as one or more logic components of an FPGA, such as the same FPGA in which the orderer 210 and decider 212 are implemented as described above, or otherwise coupled therewith, such as via the network device backplane. Alternatively, the transaction receiver 402 may be implemented as logic, such as computer program logic, stored in a memory and executable by a processor coupled therewith to cause the processor to act as described. The transaction receiver 402 is coupled with a memory 404, which may be a component of the FPGA or a memory device separate therefrom, and may be implemented as a solid state, magnetic or optical memory device. The transaction receiver 402 is operative to receive each of the plurality of financial transactions and further operative to store data representative thereof in the memory 404.

The system 400 further includes a transaction retriever 406, which may be implemented as the same one or more logic components as the transaction receiver 402 or a different one or more logic components of an FPGA, such as the same FPGA in which the transaction receiver 402 is implemented, the orderer 210 and decider 212 are implemented as described above, or otherwise coupled therewith, such as via the network device backplane. Alternatively, the transaction retriever 406 may be implemented as logic, such as computer program logic, stored in a memory and executable by a processor coupled therewith to cause the processor to act as described. The transaction retriever 402 is coupled with the memory 404 and operative to receive an indication of a state of the electronic market place, such as a specification of a particular state or a state at a given moment in time, to be reproduced and retrieve a subset of the data stored in the memory 404 representative of the plurality of transactions the processing of which would result in the state of the electronic marketplace to be reproduced.

In one embodiment of the system 400, the transaction retriever 406 is further operative to determine a state of the electronic marketplace to be reproduced, retrieve from the memory 404 the stored data representative of the financial transactions necessary to reproduce the state of the electronic marketplace to be reproduced and simulate execution of the transactions represented thereby to generate a simulated electronic marketplace having the reproduced state.

In one embodiment of the system 400, the transaction retriever 406 is further operative to determine a state of the electronic marketplace of interest, such as based on increased market or price volatility, a rapid price spike or decline in for the traded financial product, a trade order or price change velocity increase/decrease or combinations thereof, and further evaluate the stored data to identify two or more subsets of financial transactions the execution of which would result in the state of the electronic marketplace of interest.

In one embodiment of the system 400, the system 400 further includes a pattern identifier 408 which may be implemented as a separate one or more logic components or integrated with the transaction receiver 402 and/or transaction retriever 406, or may be implemented as computer program logic stored in a memory and executable by a processor coupled therewith to cause the processor to perform as described herein. The Pattern identifier 408 is coupled with the transaction retriever 406 and memory 404 and, based on the state of the electronic marketplace, is operative to identify one or more patterns, e.g. indicators or indications, of two or more subsets of financial transactions, such as commonalities there among, e.g. same market participant, orders followed by a cancellation thereof in rapid succession, etc., which resulted in that market state and, for example, may be indicative of fraud, irrational or errant (fat finger) behavior. When a detrimental market event, i.e. a particular change in the state of the market place, is determined to have occurred, such as a rapid price increase or decline, extreme volatility or other event as defined by the operators of the electronic trading system 100, the pattern identifier 408 may analyze the stored transactional data to determine the pattern of transaction activity leading thereto and store data representative of that pattern in pattern memory or buffer to be used to compare against subsequently received transactions to proactively avoid the resultant detrimental effects on the market.

In one embodiment of the system 400, the system 300 further includes a transaction monitor 410 which may be implemented as a separate one or more logic components or integrated with the transaction receiver 402 and/or the transaction retriever 406, or may be implemented as computer program logic stored in a memory and executable by a processor coupled therewith to cause the processor to perform as described herein. The transaction monitor 410 is coupled with the pattern identifier 408 and the transaction receiver and operative to monitor the receipt of each of a future/subsequently received plurality of financial transactions and detect and/or generate an alert when at least a portion of one or more of the patterns occurs therein. In one embodiment, as transactions are received they, or data indicative thereof, are stored/accumulated in a memory or buffer, e.g. a pattern matching buffer (not shown), which is periodically, such as upon receipt of each transaction, compared with one or more stored transactional patterns and if a match is identified, the operators of the electronic trading system 100 are notified, such as via an alert. The pattern matching buffer may implement a sliding window wherein it only holds a fixed number of the most recent transactions wherein, as new transactions are received and stored, the oldest transactions in the buffer are discarded. The buffer may be sized to hold a meaningful number of transactions to detect and react to the particular activities of interest which may only become evident over the course of multiple transactions. In one embodiment, the pattern matching buffer may comprise the input to a content addressable memory ("CAM") wherein the pattern addresses a stored indication of the type of activity the pattern represents. This would permit rapid identification of, as well as response to, activity of interest. A filter may further be provided so that only transaction meeting particular criteria, such as being from a particular market participant and/or for a particular traded financial product, are stored in the buffer for pattern matching.

In one embodiment of the system 400, the transaction retriever 406 is further operative to allow the stored data representative of one or more of a subset of the financial transactions to be modified to modify the one or more financial transaction represented thereby and simulate execution of the subset of financial transactions, including the one or more modified financial transactions, to generate a simulated electronic marketplace having a state resulting therefrom which may be different then the state of the electronic marketplace which would result from execution of the unmodified subset of financial transactions.

In one embodiment of the system 400, the system 400 further includes a residual effect processor 412 which may be implemented as a separate one or more logic components or integrated with the transaction receiver 402 and/or transaction retriever 406, or may be implemented as computer program logic stored in a memory and executable by a processor coupled therewith to cause the processor to perform as described herein. The residual effect processor 412 is coupled with the transaction retriever 406 and operative, for a particular state of the electronic marketplace, determine the stored data representative of all of the financial transactions which contributed to achieving the particular state, or conversely, all of the transactions which did not contribute to the particular state. This data may then be used to identify only those transactions, out of all of the stored transactions which may be intertwined therewith, necessary to replicate a particular market state, reducing the number of transactions necessary to be simulated to reproduce that state.

It will be appreciated that reexecution, e.g. replay, of stored transactions may be accomplished by reexecuting those transactions through the match engines as though they had been received via the normal operation of the electronic trading system, such as by submitting each transaction through the orderer 210. This could then be used to further test the electronic trading system 100 for deterministic behavior by confirming that the result of the reexecution of transactions yields the same result as when those transactions were first executed. Alternatively, transactions may be reexecuted on separate, e.g. test, match engines or simulations or models thereof.

Figure 5:
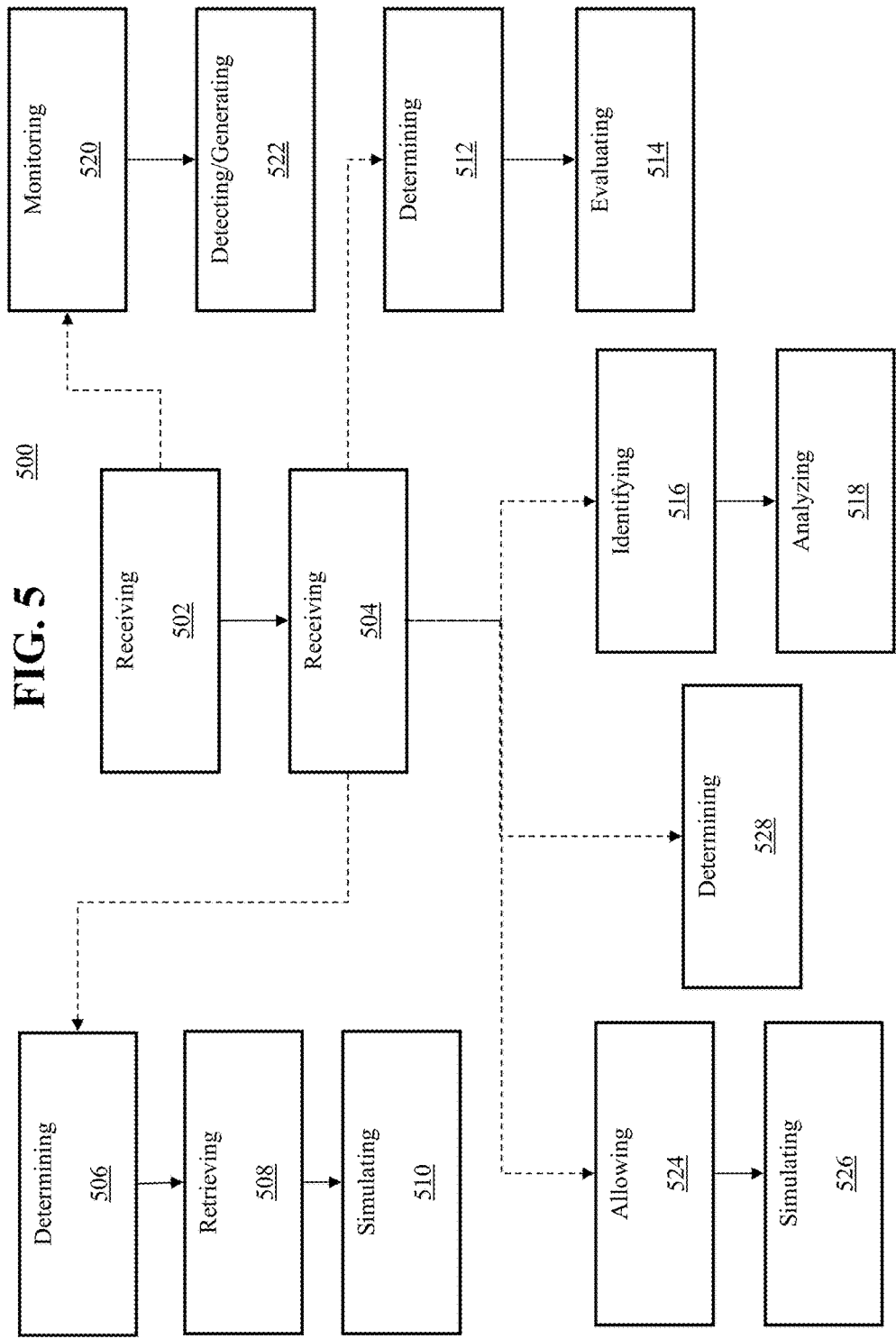
FIG. 5 depicts a flow chart showing operation of the system of FIG. 4 according to one embodiment.

FIG. 5 depicts a flow chart 500 showing operation of the system 400 of FIG. 4. In particular FIG. 5 shows a computer implemented method for reproducing a state of an electronic marketplace for one or more financial products resulting from processing, by a financial transaction processing system, of a plurality of financial transactions received from a plurality of market participants, the processing of each of which causes a change in at least an intermediate state of the electronic marketplace. The operation of the system 400 includes: receiving, by a processor, such as a logic component of a reconfigurable logic device, e.g. FPGA, coupled with a memory, each of the plurality of financial transactions and operative to store data representative thereof in the memory (Block 502); and receiving, by the processor, i.e. the same or different logic component, an indication of a state of the electronic market place, e.g. a specification of a particular state or a state at a given moment in time, to be reproduced and retrieving a subset of the data stored in the memory representative of the plurality of transactions the processing of which would result in the state of the electronic marketplace to be reproduced (Block 504).

In one embodiment of the operation of the system 400, the operation further includes determining a state of the electronic marketplace to be reproduced (Block 506), retrieving from the memory 404 the stored data representative of the financial transactions necessary to reproduce the state of the electronic marketplace to be reproduced (Block 508) and simulating execution of the transactions represented thereby to generate a simulated electronic marketplace having the reproduced state (Block 510).

In one embodiment of the operation of the system 400, the operation further includes determining a state of the electronic marketplace of interest, such as based on increased market or price volatility, a rapid price spike or decline in for the traded financial product, a trade order or price change velocity increase/decrease or combinations thereof, (Block 512) and further evaluating the stored data to identify two or more subsets of financial transactions the execution of which would result in the state of the electronic marketplace of interest (Block 514).

In one embodiment of the operation of the system 400, the operation further includes identifying one or more patterns, e.g. indicators or indications, of two or more subsets of financial transactions, such as commonalities there among, e.g. same market participant, orders followed by a cancellation thereof in rapid succession, etc., which resulted in that market state and, for example, may be indicative of fraud, irrational or errant (fat finger) behavior (Block 516). When a detrimental market event, i.e. a particular change in the state of the market place, is determined to have occurred, such as a rapid price increase or decline, extreme volatility or other event as defined by the operators of the electronic trading system 100, the operation of the system 400 may include analyzing the stored transactional data to determine the pattern of transaction activity leading thereto and store data representative of that pattern in pattern memory or buffer to be used to compare against subsequently received transactions to proactively avoid the resultant detrimental effects on the market (Block 518).

In one embodiment of the operation of the system 400, the operation may further include monitoring the receipt of each of a future/subsequently received plurality of financial transactions and (Block 520) detecting and/or generating an alert when at least a portion of one or more of the patterns occurs therein (Block 522). In one embodiment, as transactions are received they, or data indicative thereof, are stored/accumulated in a memory or buffer, e.g. a pattern matching buffer (not shown), which is periodically, such as upon receipt of each transaction, compared with one or more stored transactional patterns and if a match is identified, the operators of the electronic trading system 100 are notified, such as via an alert. The pattern matching buffer may implement a sliding window wherein it only holds a fixed number of the most recent transactions wherein, as new transactions are received and stored, the oldest transactions in the buffer are discarded. The buffer may be sized to hold a meaningful number of transactions to detect and react to the particular activities of interest which may only become evident over the course of multiple transactions. In one embodiment, the pattern matching buffer may comprise the input to a content addressable memory ("CAM") wherein the pattern addresses a stored indication of the type of activity the pattern represents. This would permit rapid identification of, as well as response to, activity of interest. A filter may further be provided so that only transaction meeting particular criteria, such as being from a particular market participant and/or for a particular traded financial product, are stored in the buffer for pattern matching.

In one embodiment of the operation of the system 400, the operation further includes allowing the stored data representative of one or more of a subset of the financial transactions to be modified to modify the one or more financial transaction represented thereby (Block 524) and simulating execution of the subset of financial transactions, including the one or more modified financial transactions, to generate a simulated electronic marketplace having a state resulting therefrom which may be different then the state of the electronic marketplace which would result from execution of the unmodified subset of financial transactions (Block 526).

In one embodiment of the operation of the system 400, the operation includes, for a particular state of the electronic marketplace, determining the stored data representative of all of the financial transactions which contributed to achieving the particular state, or conversely, all of the transactions which did not contribute to the particular state (Block 528). This data may then be used to identify only those transactions, out of all of the stored transactions which may be intertwined therewith, necessary to replicate a particular market state, reducing the number of transactions necessary to be simulated to reproduce that state.

C. Customized Market Data

As was described above, in one embodiment market data feeds can be customized, e.g. field order, custom additional fields, removal of unnecessary fields, custom data format/protocol, etc., to the preferences of the recipient thereof, such as a subscribing market participant, without prejudicing the latency of the data as compared with the transmission of the market data feed to other recipients, e.g. subscribers to a differently customized market data feed, non-subscribers receiving the generic/standard market data feed, etc. Customizations may include customized augmentation of the market data with additional "value added data" whereby optional data values, such as Greeks, describe above, or other analytics, etc., ordinarily computed/derived by a recipient upon receipt of market data, can be pre-computed/pre-derived and inserted into the market data prior to transmission to a subscribing recipient, alleviating the need for the recipient to implement such computations upon receipt. As the time of transmission of market data to all recipients is normalized as the data leaves the electronic trading system 100 on its way to all recipients, subscribing recipients benefit from not having to incur the delay associated with computing such values and, relative to other market data recipients, can begin processing the market data upon receipt. Other customizations may include custom reordering of the individual data fields of each market data message such that, for example, critical data fields of each message are received first by the recipient's incoming message processors and/or the message format is normalized to a format consistent with the format of other messages received by the recipient from other sources which may then simplify the processing thereof.

In one embodiment, customization of market data is implemented as part of the matching and/or market data functions 106, 112 of the electronic trading system 100. It will be appreciated that customization of market data may be implemented as part of other functions of the electronic trading system 100, or divided there among, or otherwise coupled with the communications infrastructure 202, which as described above, interconnects the various components of the electronic trading system 100. In one embodiment, customizations are applied, as described below, at the time the market data is generated to generate both the generic/standard market data messages and customized market data messages, which are then conveyed to the edge/egress point of the electronic trading system, e.g. the network gateway, to be forwarded or otherwise distributed to the market data recipients. Alternatively, computed data values and/or other value added data may be generated or otherwise derived substantially in real time with the generation of match event data or otherwise close thereto, such as by a component coupled with the decider 212, and conveyed, along with the generic market data messages, to the edge/egress point of the electronic trading system 100 where the customized market data messages are created based on the generic messages and the value added data and the forwarded/distributed to the respective market data recipients. Alternatively, computed data values and/or other value added data may be generated or otherwise derived substantially in real time with the generation of match event data or otherwise close thereto, such as by a component coupled with the decider 212, wherein all of the generated/derived values are added to the market data messages which are subsequently sent to an egress component, such as a network gateway, for transmission to the market participants 204. At the egress component prior to forwarding/distribution of the market data messages to the market data recipients, the market data messages may be customized, e.g. replicated and modified, via, for example, the subtraction of data values which are not to be sent to particular market participants, reordering of data fields and/or application of other customizations, e.g. based on their preference data as will be described. Furthermore, it will be appreciated that the functions described below relating to implementing preference-based discrimination among market data recipients, receiving and maintaining customization preferences, calculating and/or receiving compensation therefore, and otherwise enabling the provision of customized market data as a service, subscription or otherwise, may be implemented as part of the user and/or trading account management systems 102, 104 of the electronic trading system 100 or otherwise separately from the functions which implement the generation, customization and transmission of the market data messages.

Figure 6:
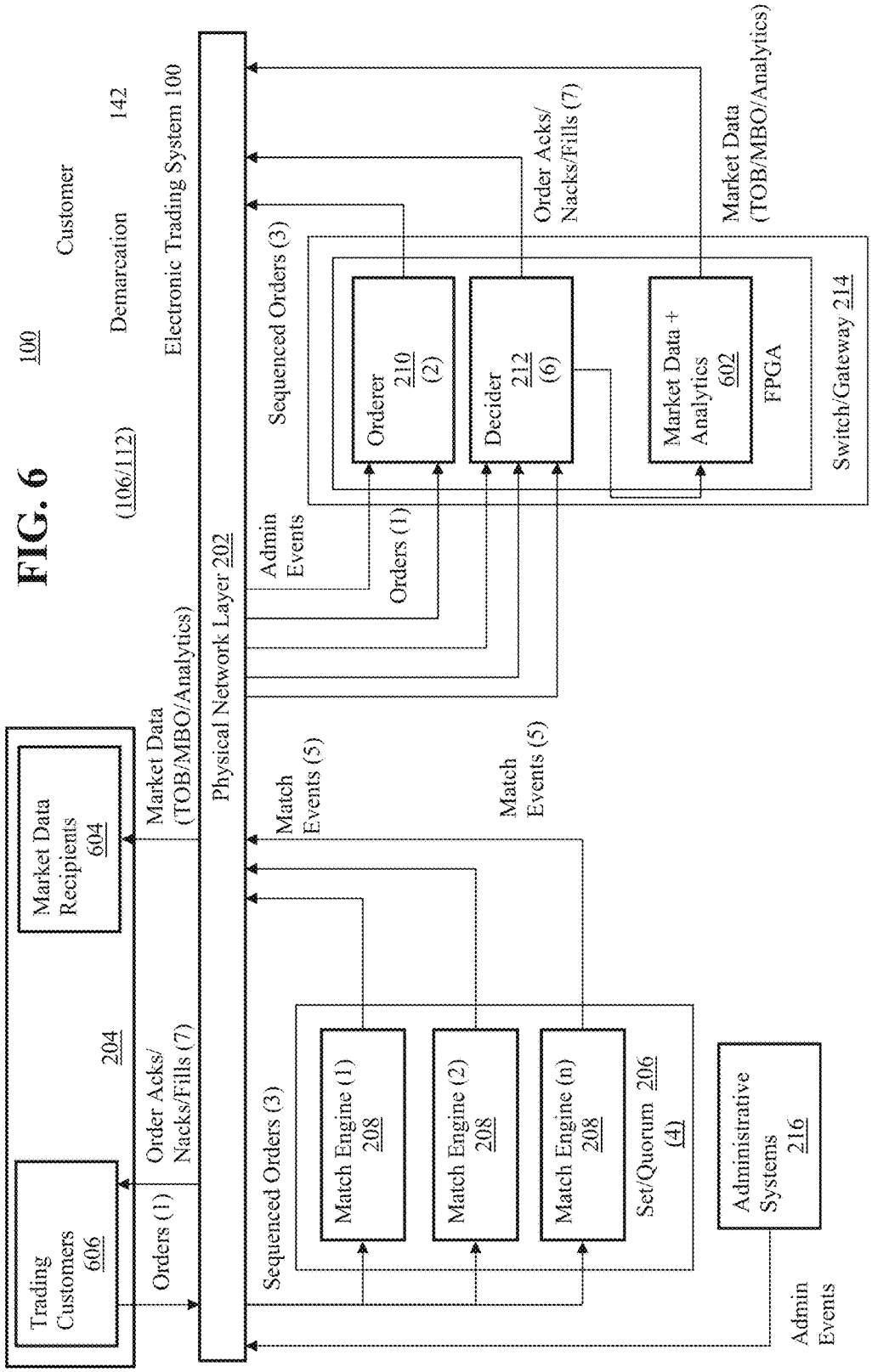
FIG. 6 depicts block diagram of a system for customized market data for use with the system of FIG. 1 according to one embodiment.

In one embodiment of the electronic trading system 100, as shown in FIG. 6, comprising the orderer 210/decider 212/redundant match engine 206 architecture described above, a market data/analytics generator and customization component 602 may be may be provided which, as will be described, receives match event data, described above, from the decider component 212 and generates both the generic/ standard, as well as the customized, market data/analytics messages. The generation of market data messages may include processing the match event data to compute, derive, parse, modify, convert and or transform that data to generate at least one message, which may include fields in which the data is contained, format the message in a protocol, such as the FIX/FAST protocol described above, generate a data packet, such as conforming to the Transport Control Protocol ("TCP") and/or Internet Protocol, User Datagram Protocol ("UDP") or other protocol, or combinations thereof. It will be appreciated that the market data/analytics generator and customization component 602 may include separate components for the generation of market data messages and the customization of those messages as will be described.

In one embodiment, at least a portion of the market data/analytics generator/customization component 602 may be implemented as one or more logic components of a reconfigurable logic device, e.g. an FPGA, and may implemented on the same, or a different reconfigurable logic device as the decider 212 and/or orderer 210. It will be appreciated that disclosed market data/analytics customization component 602 may be implemented in conjunction with a conventional match engine architecture as well so as to receive match event data therefrom. As described herein, market data is transmitted to market participants 204 which may include both traders/trading customers 604 and market data recipients/consumers 606, such as news or reporting entities, and/or market data resellers/aggregators, which may receive and then resell, such as after aggregating with data from other sources, e.g. other trading systems, electronic or otherwise, analysis, etc., or other consumers of market data.

Figure 7:
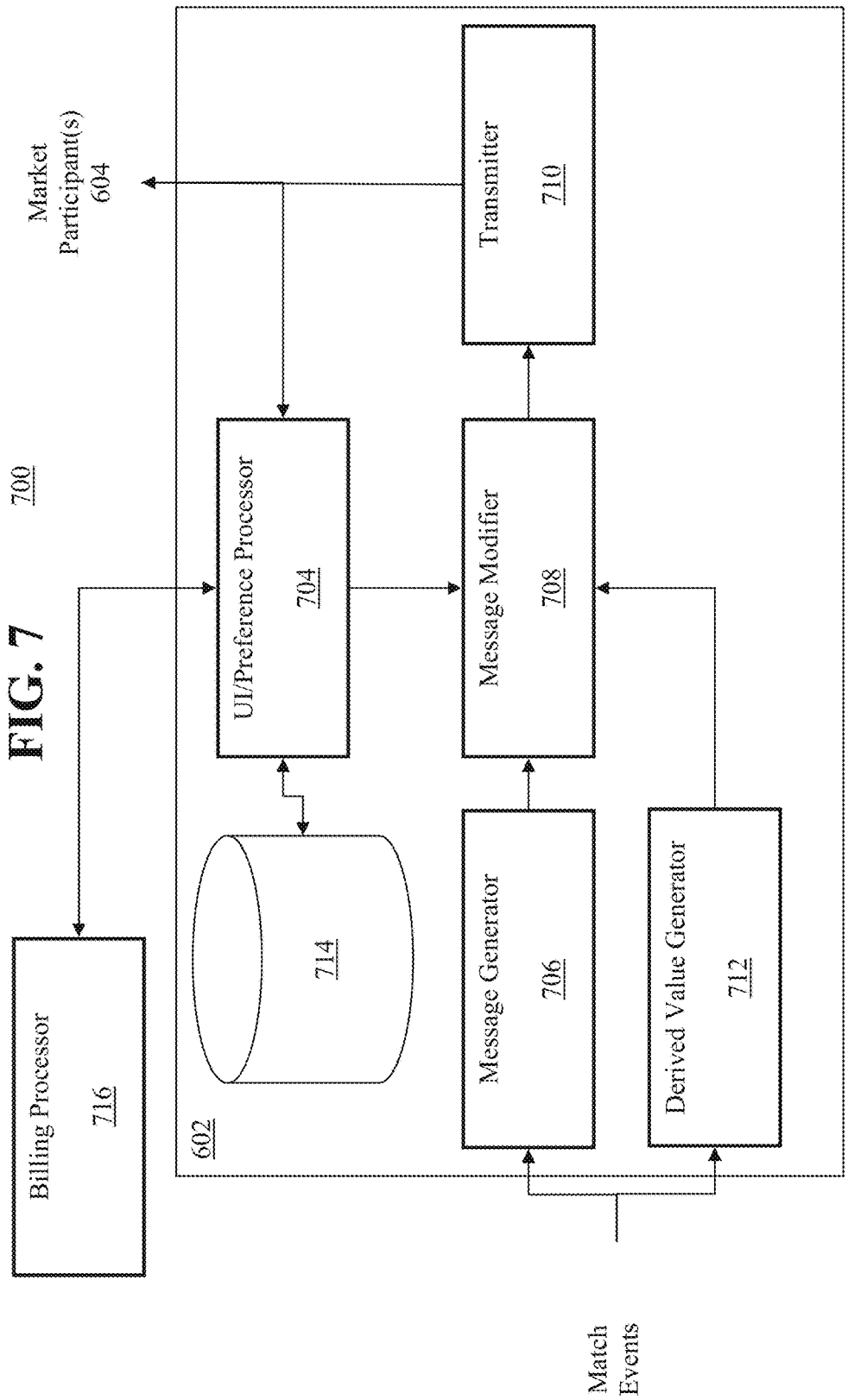
FIG. 7 depicts a more detailed block diagram of the market data/analytics generator and customization component of FIG. 6 according to one embodiment.

Referring now to FIG. 7 there is shown a more detailed block diagram of the market data/analytics customization component 602. In particular, FIG. 7 shows a system 700 for generating, transmitting and/or otherwise managing communication of a plurality of financial data messages to a plurality of market participants via a network, each of the plurality of financial data messages comprising, for example, data indicative of a change in state of an electronic marketplace for one or more financial products, e.g. market data, such as based on received orders and/or cancelation thereof, matched trades, price changes, etc. The plurality of financial data messages may include message types which carry data representative of, or otherwise represent the marketplace, or changes to the state thereof, in different ways such as market by order messages, market by price messages, top of book messages, analytics messages, or other representations or combinations thereof. It will be appreciated that the disclosed embodiments may allow a recipient to receive all, or otherwise choose among, the different available messages types/market representations. Financial data messages, or a series thereof, of a particular type may be referred to as a stream or market data stream, e.g. a market by order stream, a market by price stream, a top of book stream, etc. These market data streams may be independently generated, subscribed to and modified according to the disclosed embodiments. Alternatively, one or more of these data streams may be generated in a combined fashion, subscribed to and modified according to the disclosed embodiments. As used herein, the plurality of financial messages will refer all financial data messages generated as described wherein one or more subsets of the plurality of financial data messages may be of a particular type.

The system 700 includes a message preference processor 704 which may be implemented as one or more logic components of an FPGA, such as the same FPGA in which the orderer 210 and decider 212 are implemented as described above, or otherwise coupled therewith, such as via the network device backplane. Alternatively, the message preference processor 704 may be implemented as logic, such as computer program logic, stored in a memory and executable by a processor coupled therewith to cause the processor to act as described. As described above, message preference processor 704 may be implemented as part of the user/account management functions 102, 104 of the electronic trading system 100 or otherwise separate from the implementation of the generation and customization of the market data messages as described.

In one embodiment, the message preference processor 704 is operative to receive preference data from at least one of the plurality of market participants 204, e.g. those wishing to receive customized market data, and store the preference data in a memory 714 coupled therewith in association with data representative of the market participant 204 from which it was received, the preference data specifying one or more financial data message modifications. The one or more financial data message modifications may include modifying the message content, the message format, e.g. the arrangement of the content and/or protocol/structure, an encoding, or combination thereof, of the financial data message. For example, wherein each of the plurality of financial data messages comprises a plurality of data fields characterized by an arrangement, the one or more financial data message modifications may include modifying the arrangement of the data fields, e.g. such that desired fields are transmitted/arrive first, such that the arrangement is similar/normalized to data messages received from other sources, etc.

In one embodiment, the message preference processor further comprises a configuration user interface, not shown, such as an HTML based interface available via the world wide web using a browser program such as Internet Explorer, operative to allow the at least one market participant to provide, modify, delete or combinations thereof, their associated preference data. For example, a market participant who wishes to subscribe to a customized market data stream may access the web based user interface and create an account, or otherwise utilize their electronic trading system 100 credentials to access/create an account which then provides the ability to specify desired customizations. The interface may provide various options from which the market participant may choose. It will be appreciated that other methods by which a market participant may specify customization preferences may be utilized, such as sending a configuration data file specifying desired customization settings to the electronic trading system, such as via e-mail, FTP or other means. Alternatively, the electronic trading system 100 may provide a telephone based interface via which the market participant specifies their desired customizations, such as via an interactive voice response system or a live operator.

In one embodiment, the market participant may be limited to choosing from among a set of predefined combinations of available customizations, e.g. templates. Alternatively, the market participant may be permitted to freely customize all of the available customizable aspects of the market data messages. In one embodiment, a sufficient range of customizations is provided such that the modified financial data message requires no further modification upon receipt by the associated market participant. It will be appreciated that the degree of customization afforded the market participant may be associated with different fee amounts or subscription levels, e.g. greater customization is associated with a higher one-time or recurring subscription fee, depending upon the implementation. It will be appreciated that all market participants may be required to specify preference data even if their preference data specifies that they do not wish to receive customized market data messages.

In one embodiment, the system 700 further includes a billing processor 716 coupled with the message preference processor 704 and operative to charge a fee, such as a periodic or one time fee, to the at least one market participant which, as described, may vary depending upon the degree of customization or other factors.

The system 700 further includes a financial data message generator 706 which may be implemented as one or more logic components of an FPGA, such as the same FPGA in which the orderer 210 and decider 212 are implemented as described above, or otherwise coupled therewith, such as via the network device backplane. Alternatively, the financial data message generator 706 may be implemented as logic, such as computer program logic, stored in a memory and executable by a processor coupled therewith to cause the processor to act as described. In one embodiment, the financial data message generator 706 is coupled with the electronic marketplace, e.g. coupled with the match engine function 106, such as via the decider 212 as described above, and operative, based on a change of state therein, e.g. based on the receipt of match event data, described above, to generate a financial data message comprising content representative thereof. As described above, the financial data message may be in the FIX/FAST protocol. It will be appreciated that the format of the financial data message generated by the financial data message generator 706 may be referred to herein as a "generic" or "standard" format for these messages and may, in fact, comprise any format, such as a format deemed to be most acceptable to a majority of the market participants. As used herein, a customized market data message format merely refers to a format that is different from the generic/standard format, the differences having been specified by receiving market data recipient, constrained to those aspects of the message format which are allowed to be varied by the electronic trading system 100. As will be described, those market participants which do not provide preference data, e.g. non-subscribing market participants, receive market data messages in this generic/standard format. It will be appreciated, that in an alternative embodiment, all market participants may be required to provide preference data, even if their preference is to receive market data messages in the generic/standard format.

In one embodiment, the system 700 may further include a derived value generator 712, which may or may not be a part of the financial data message generator 706 or financial data message modifier 708 described below, coupled with the financial data message generator 706 and operative to derive, compute or otherwise calculate one or more derived, computed or calculated values, such as Greeks or other computed (analytical) value, based on the match events or otherwise based on the content of the generated financial data message, wherein the one or more financial data message modifications include augmentation of the generated financial data message to include at least one of the derived values within the content thereof.

The system 700 further includes a financial data message modifier 708 which may be implemented as one or more logic components of an FPGA, such as the same FPGA in which the orderer 210 and decider 212 are implemented as described above, or otherwise coupled therewith, such as via the network device backplane. Alternatively, the financial data message modifier 708 may be implemented as logic, such as computer program logic, stored in a memory and executable by a processor coupled therewith to cause the processor to act as described. In one embodiment, the financial data message modifier 708 is coupled with the preference data processor 704 and/or memory 714 in which the preference data is stored and the financial data message generator 706 and operative to receive the generated financial data message, in the generic/standard format, and generate, for each market participant 204 having preference data stored in association therewith in the memory, a modified financial data message in accordance with the associated preference data. In an embodiment where all market participants are required to store preference data, even if that preference data specifies no customization, the financial data message modified 708 is further operative to not modify the financial data message for those recipients. It will be appreciated that, in an alternative embodiment, the financial data message modifier 708 may operate in parallel with the financial data message generator to receive match event data directly and generate the customized market data messages, as described, directly, rather than modify the generic/standard messages, thereby reducing the latency in generating the customized messages as compared to the standard messages.

The system 700 further includes a financial data message transmitter 710 which may be implemented as one or more logic components of an FPGA, such as the same FPGA in which the orderer 210 and decider 212 are implemented as described above, or otherwise coupled therewith, such as via the network device backplane. Alternatively, the financial data message transmitter 710 may be implemented as logic, such as computer program logic, stored in a memory and executable by a processor coupled therewith to cause the processor to act as described. In one embodiment, the financial data message transmitter 710 is coupled with the financial data modifier 708 and, one embodiment, the financial data message generator 706, and operative to transmit each modified financial data message to the market participant 204 for which the modified data message was generated, and transmit the original, unmodified financial data message to the others of the plurality of market participants, i.e. who have not specified any preference data or who have otherwise specified that they prefer to receive the generic/standard messages. As was described above, the financial data message transmitter 710 further be coupled with, or may be implemented at, the edge of, e.g. the point of data egress from, the electronic trading system 100, such as within a gateway, switch or other network device which couples the electronic trading system 100 to an external network which will carry the market date messages.

In one embodiment, the financial data message transmitter 710 is further operative to transmit each modified financial data message to the market participant for which the modified data message was generated, substantially contemporaneously, i.e. within a maximum elapse of time thereof so as to be imperceptible to the market participants in receipt thereof, with the transmission of the financial data message, i.e. the unmodified generic/standard message, to the others of the plurality of market participants.

Figure 8:
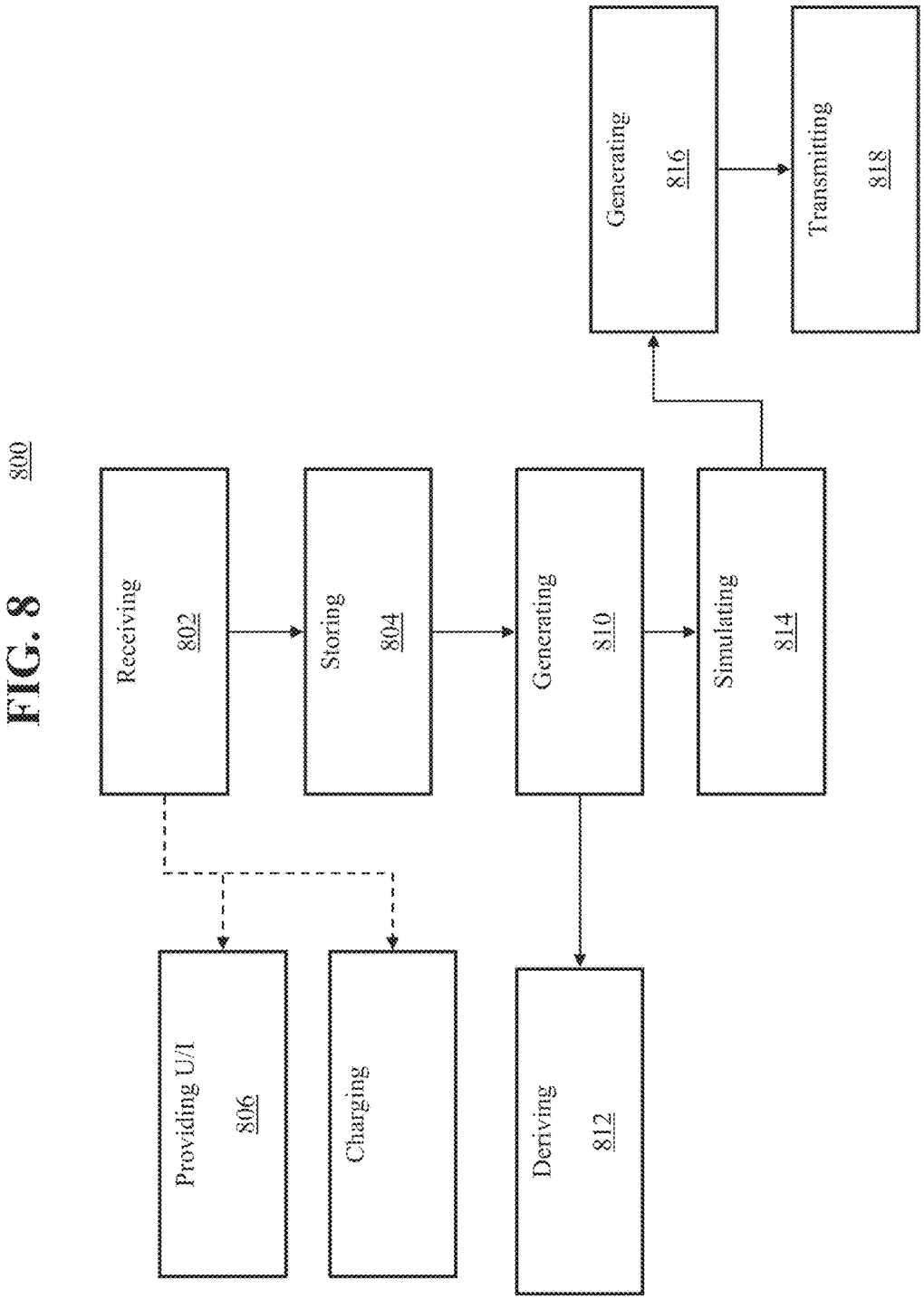
FIG. 8 depicts a flow chart showing operation of the system of FIGS. 6 and 7 according to one embodiment.

FIG. 8 depicts a flow chart 800 showing operation of the system 700 of FIG. 7. In particular FIG. 7 shows a method for generating, transmitting and/or otherwise managing communication of a plurality of financial data messages to a plurality of market participants via a network, each of the plurality of financial data messages comprising, for example, data indicative of a change in state of an electronic marketplace for one or more financial products, e.g. market data, such as based on received orders and/or cancelation thereof, matched trades, price changes, etc. The plurality of financial data messages may include message types which carry data representative of, or otherwise represent the marketplace, or changes to the state thereof, in different ways such as market by order messages, market by price messages, top of book messages, analytics messages, or other representations or combinations thereof. It will be appreciated that the disclosed embodiments may allow a recipient to receive all, or otherwise choose among, the different available messages types/market representations. Financial data messages, or a series thereof, of a particular type may be referred to as a stream or market data stream, e.g. a market by order stream, a market by price stream, a top of book stream, etc. These market data streams may be independently generated, subscribed to and modified according to the disclosed embodiments. Alternatively, one or more of these data streams may be generated in a combined fashion, subscribed to and modified according to the disclosed embodiments. As used herein, the plurality of financial messages will refer all financial data messages generated as described wherein one or more subsets of the plurality of financial data messages may be of a particular type.

The operation of the system 700 includes receiving preference data from at least one of the plurality of market participants 204, e.g. those wishing to receive customized market data (Block 802), and storing the preference data in a memory 714 coupled therewith in association with data representative of the market participant 204 from which it was received, the preference data specifying one or more financial data message modifications (Block 804). The one or more financial data message modifications may include modifying the message content, the message format, e.g. the arrangement of the content and/or protocol/structure, an encoding, or combination thereof, of the financial data message. For example, wherein each of the plurality of financial data messages comprises a plurality of data fields characterized by an arrangement, the one or more financial data message modifications may include modifying the arrangement of the data fields, e.g. such that desired fields are transmitted/arrive first, such that the arrangement is similar/normalized to data messages received from other sources, etc.

In one embodiment, the operation of the system 700 further includes providing a configuration user interface, not shown, such as an HTML based interface available via the world wide web using a browser program such as Internet Explorer, operative to allow the at least one market participant to provide, modify, delete or combinations thereof, their associated preference data (Block 806). For example, a market participant who wishes to subscribe to a customized market data stream may access the web based user interface and create an account, or otherwise utilize their electronic trading system 100 credentials to access/create an account which then provides the ability to specify desired customizations. The interface may provide various options from which the market participant may choose. It will be appreciated that other methods by which a market participant may specify customization preferences may be utilized, such as sending a configuration data file specifying desired customization settings to the electronic trading system, such as via e-mail, FTP or other means. Alternatively, the electronic trading system 100 may provide a telephone based interface via which the market participant specifies their desired customizations, such as via an interactive voice response system or a live operator.

In one embodiment, the market participant may be limited to choosing from among a set of predefined combinations of available customizations, e.g. templates. Alternatively, the market participant may be permitted to freely customize all of the available customizable aspects of the market data messages. In one embodiment, a sufficient range of customizations is provided such that the modified financial data message requires no further modification upon receipt by the associated market participant. It will be appreciated that the degree of customization afforded the market participant may be associated with different fee amounts or subscription levels, e.g. greater customization is associated with a higher one-time or recurring subscription fee, depending upon the implementation. It will be appreciated that all market participants may be required to specify preference data even if their preference data specifies that they do not wish to receive customized market data messages.

In one embodiment, the operation of the system 700 further includes charging a fee, such as a periodic or one time fee, to the at least one market participant which, as described, may vary depending upon the degree of customization or other factors.

The operation of the system 700 further includes generating, based on a change of state therein, e.g. based on the receipt of match event data, described above, a financial data message comprising content representative thereof (Block 810). As described above, the financial data message may be in the FIX/FAST protocol. It will be appreciated that the format of the financial data message generated by the financial data message generator 706 may be referred to herein as a "generic" or "standard" format for these messages and may, in fact, comprise any format, such as a format deemed to be most acceptable to a majority of the market participants. As used herein, a customized market data message format merely refers to a format that is different from the generic/standard format, the differences having been specified by receiving market data recipient, constrained to those aspects of the message format which are allowed to be varied by the electronic trading system 100. As will be described, those market participants which do not provide preference data, e.g. non-subscribing market participants, receive market data messages in this generic/standard format. It will be appreciated, that in an alternative embodiment, all market participants may be required to provide preference data, even if their preference is to receive market data messages in the generic/standard format.

In one embodiment, the operation of the system 700 may further include deriving, computing or otherwise calculating one or more derived, computed or calculated values, such as Greeks or other computed (analytical) value, based on the match events or otherwise based on the content of the generated financial data message, wherein the one or more financial data message modifications include augmentation of the generated financial data message to include at least one of the derived values within the content thereof (Block 812).

The operation of the system 700 further includes receiving the generated financial data message, in the generic/standard format (Block 814), and generating, for each market participant 204 having preference data stored in association therewith in the memory, a modified financial data message in accordance with the associated preference data (Block 816). In an embodiment where all market participants are required to store preference data, even if that preference data specifies no customization, the financial data message modified 708 is further operative to not modify the financial data message for those recipients. It will be appreciated that, in an alternative embodiment, the financial data message modifier 708 may operate in parallel with the financial data message generator to receive match event data directly and generate the customized market data messages, as described, directly, rather than modify the generic/standard messages, thereby reducing the latency in generating the customized messages as compared to the standard messages.

The operation of the system 700 further includes transmitting each modified financial data message to the market participant 204 for which the modified data message was generated, and transmitting the original, unmodified financial data message to the others of the plurality of market participants, i.e. who have not specified any preference data or who have otherwise specified that they prefer to receive the generic/standard messages (Block 818). As was described above, the financial data message transmitter 710 further be coupled with, or may be implemented at, the edge of, e.g. the point of data egress from, the electronic trading system 100, such as within a gateway, switch or other network device which couples the electronic trading system 100 to an external network which will carry the market date messages.

In one embodiment, the transmitting of each modified financial data message to the market participant for which the modified data message was generated, occurs substantially contemporaneously, i.e. within a maximum elapse of time thereof so as to be imperceptible to the market participants in receipt thereof, with the transmission of the financial data message, i.e. the unmodified generic/standard message, to the others of the plurality of market participants.

D. Market Data Prioritization

As was described above, with current electronic trading system architectures, improving performance may result in reaching or exceeding the capacity of existing infrastructure components, which as was described above, may cause or reveal underlying faults or flaws, such as disparity along communications paths causing jitter or race conditions which results in non-deterministic operation. In particular, with respect to acknowledgement messages sent to specific traders indicative of order receipt confirmation, match events or other trader specific/privy notifications, and corresponding market data feed messages sent to all market participants reflecting corresponding market state or changes thereto, these disparities may result in the acknowledgement message being transmitted to the particular market participant prior to the corresponding market data message being transmitted to all of the market participants, or vice versa, which may result inequitable/unfair access to information. Such unfair information access may then be exploited to gain unfair financial or other advantages.

Figure 9:
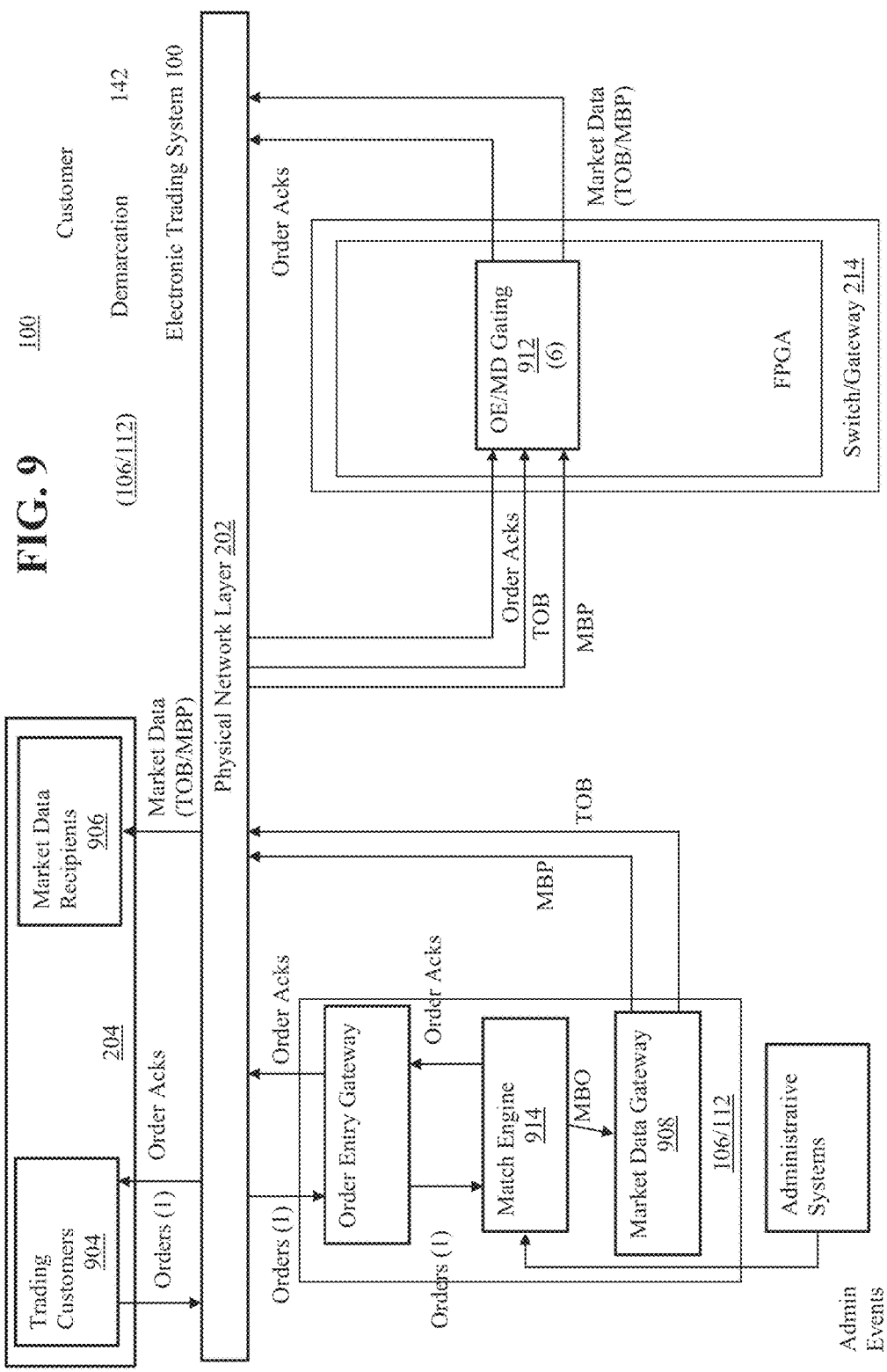
FIG. 9 depicts a block diagram of a system for managing communications of financial data messages for use with the system of FIG. 1 according to one embodiment.

Referring now to FIG. 9 there is shown a system 900, which may be a part of the electronic trading system 100, for managing, e.g. generating, regulating, and/or transmitting, communication of a plurality of financial data messages to a plurality of market participants 204 via a network, such as the network 126 described above or other network which interconnects the electronic trading system 100 with market data recipients, each of a first subset of the plurality of financial data messages comprising data, e.g. market data (market by order, market by price, top of book or other market data format or combinations thereof), indicative of a change in state of an electronic marketplace, e.g. an order book maintained by a match engine 914, for one or more financial products, such as futures, options or combinations thereof, etc., to be transmitted to all of the plurality of market participants, each of a second subset of the plurality of financial data messages comprising a response message corresponding to one of the financial data messages of the first subset to be transmitted to a particular market participant 204 of the plurality of market participants 204. As described herein, market data is transmitted to market participants 204 which may include both traders/trading customers 904 and market data recipients/consumers 906, such as news or reporting entities, and/or market data resellers/aggregators, which may receive and then resell, such as after aggregating with data from other sources, e.g. other trading systems, electronic or otherwise, analysis, etc., or other consumers of market data. Response messages, such as messages acknowledging receipt of an order ("ack"), indicating cancelation of an order ("nack" or cancel), confirming a trade has completed (confirm), or indicative of some other status, etc., are transmitted solely to those market participant which submitted the transaction underlying the response or which such information may be privy, who may also receive the corresponding market data message along with other market participants.

In one embodiment, the system 900 is implemented as part of the matching and market data functions 106, 112 of the electronic trading system 100. It will be appreciated that the system 900 may be implemented as part of other functions of the electronic trading system 100, or otherwise coupled with the communications infrastructure 202, which as described above, interconnects the various components of the electronic trading system 100. In one embodiment, the system 900 is implemented, at least in part, as a reconfigurable logic device, e.g. FPGA, coupled with a conventional match engine 914. Alternatively, the system 900 may be used with the redundant match engine architecture described above, e.g. the system 900 may be coupled with the orderer 210 and/or decider 212 described above and, in one implementation, is implemented on the same FPGA device.

The system 900 includes a response message generator 908 coupled, or otherwise integrated, with the electronic marketplace, e.g. the match engine 914, and operative to generate a response message indicative of a response by the electronic marketplace, e.g. the match engine 914, which may comprise "market by order" data ("MBO"), to a request for a financial transaction received from a particular of the plurality of market participants 204. The response message generator 908 may be implemented as one or more logic components of an FPGA or otherwise implemented as part of the system which implements the match engine 914. In an embodiment utilizing the redundant match engine architecture described above, the response message generator 908 may implemented in the same FPGA in which the orderer 210 and decider 212 are implemented as described above, or otherwise coupled therewith, such as via the network device backplane. Alternatively, the response message generator 908 may be implemented as logic, such as computer program logic, stored in a memory and executable by a processor coupled therewith to cause the processor to act as described.

The system 900 also includes a financial data message generator 910 coupled with the electronic marketplace, e.g. the match engine 914, and operative, based on a change in state therein caused by the received request, e.g. order, to generate a corresponding financial data message comprising content representative thereof, e.g. market data. The financial data message generator 910 may be implemented as one or more logic components of an FPGA or otherwise implemented as part of the system which implements the match engine 914. In an embodiment utilizing the redundant match engine architecture described above, the financial data message generator 910 may implemented in the same FPGA in which the orderer 210 and decider 212 are implemented as described above, or otherwise coupled therewith, such as via the network device backplane. Alternatively, the financial data message generator 910 may be implemented as logic, such as computer program logic, stored in a memory and executable by a processor coupled therewith to cause the processor to act as described.

The system 900 further includes a financial data message transmitter 912 coupled with the response message generator 908 and the financial data message generator 910, such as via the network infrastructure 202 of the electronic trading system 100, and operative to synchronize the transmission of the corresponding generated financial data and generated response messages, e.g. to not transmit the generated response message to the particular market participant 204 prior to transmitting the corresponding financial data message to all of the plurality of market participants 204. The financial data message transmitter 912 may be implemented as one or more logic components of an FPGA separate from, such as part of a network router or switch, or otherwise implemented as part of the system which implements the match engine 914. In an embodiment utilizing the redundant match engine architecture described above, the financial data message transmitter 912 may implemented in the same FPGA in which the orderer 210 and decider 212 are implemented as described above, or otherwise coupled therewith, such as via the network device backplane. Alternatively, the financial data message transmitter 912 may be implemented as logic, such as computer program logic, stored in a memory and executable by a processor coupled therewith to cause the processor to act as described.

Wherein the response message may be generated, or otherwise received by the financial data transmitter 912, prior to the corresponding financial data message, in one embodiment, the financial data message transmitter 912 may further include a memory or other storage device, not shown, such as a memory component of an FPGA, which is operative to store the generated response message until the corresponding financial data message is ready to transmit, when the response message is generated prior to, or otherwise overtakes the transmission of, the corresponding financial data message. The financial data message transmitter 912 may check this memory upon receipt of each financial data message and, once the corresponding financial data message is received, allow the stored response message to be transmitted.

Alternatively, or in addition thereto, wherein the financial data message may be generated, or otherwise received by the financial data transmitter 912, prior to the corresponding response message, the financial data message transmitter 912 may further include a memory, not shown, such as a memory component of an FPGA, operative to store data indicative of the prior transmission of the corresponding financial data message to allow transmission of the generated response message once generated, when the corresponding financial data message is generated prior to, or otherwise over takes the transmission of, the generated response message. For example, a log of transmitted financial data messages may be maintained and checked upon receipt of each response message. If the corresponding financial data message has been transmitted, as evidenced by the log, the response message is transmitted. Otherwise, the response message is stored as described above to await receipt of the corresponding financial data message.

In one embodiment, to enable the financial data transmitter 912 to determine correspondence between response messages and financial data messages, the response message generator 908 and financial data message generator 910 may be further operative to augment the generated response message and generated financial data message with an identifier relating the generated response message with the generated financial data message. The identifier may comprise any unique code, such as an order number, time stamp, etc. which uniquely relates the response message with the corresponding financial data message. Further, in one embodiment, the financial data message transmitter 912 may be further operative to remove the identifier from the generated response message and generated financial data message prior to the transmission thereof, e.g. once the association there between has been used to ensure the response message is not transmitted prior to the corresponding financial data message, for example, to assure anonymity of the particular market participant to whom the response data is to be transmitted.

Figure 10:
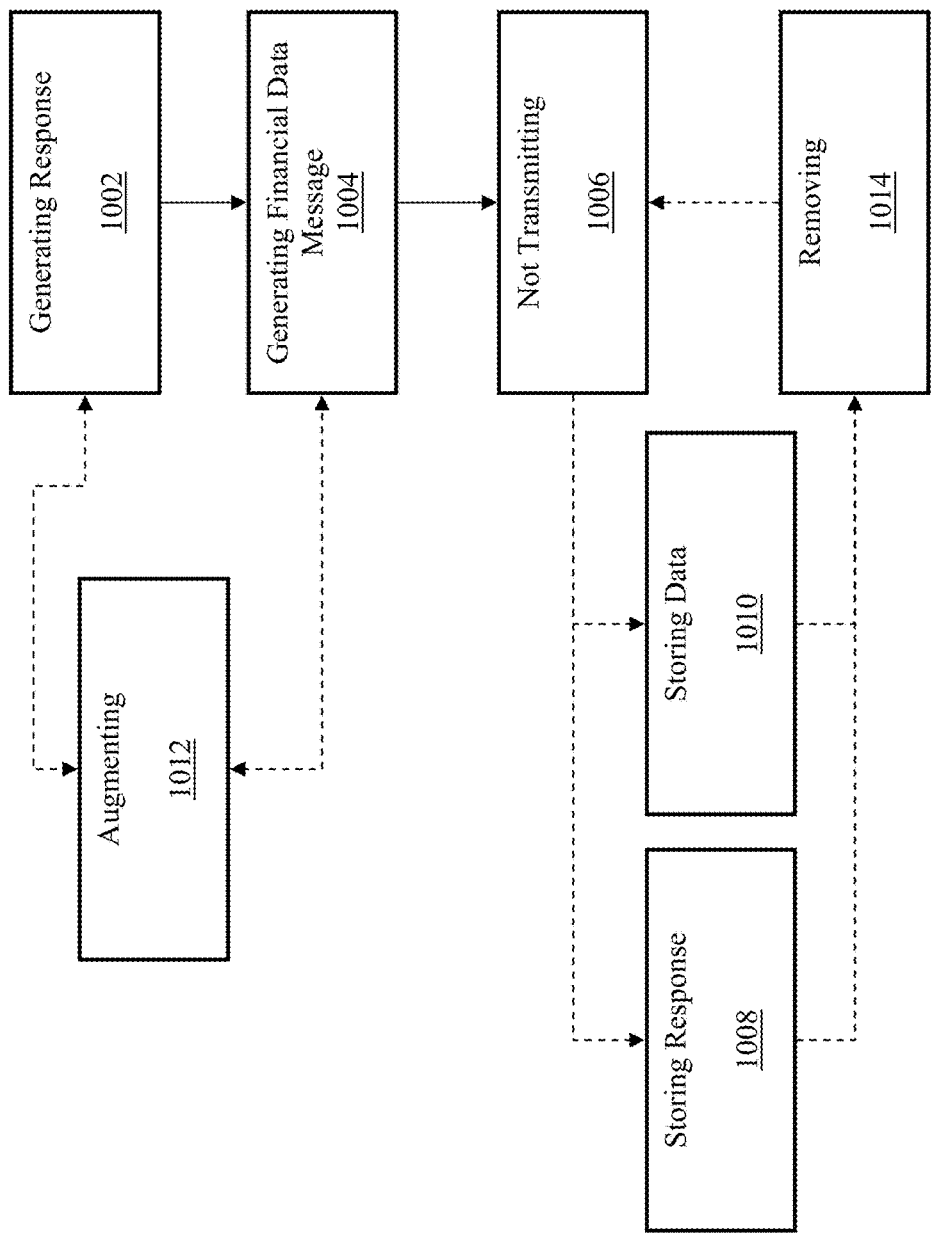
FIG. 10 depicts a flow chart showing operation of the system of FIG. 9 according to one embodiment.

FIG. 10 depicts a flow chart 1000 showing operation of the system 900 of FIG. 9. In particular FIG. 10 shows a method, which may be implemented by the electronic trading system 100, for managing, e.g. generating, regulating, and/or transmitting, communication of a plurality of financial data messages to a plurality of market participants 204 via a network, such as the network 126 described above or other network which interconnects the electronic trading system 100 with market data recipients, each of a first subset of the plurality of financial data messages comprising data, e.g. market data (market by order, market by price, top of book or other market data format or combinations thereof), indicative of a change in state of an electronic marketplace, e.g. an order book maintained by a match engine 914, for one or more financial products, such as futures, options or combinations thereof, etc., to be transmitted to all of the plurality of market participants, each of a second subset of the plurality of financial data messages comprising a response message corresponding to one of the financial data messages of the first subset to be transmitted to a particular market participant 204 of the plurality of market participants 204. As described herein, market data is transmitted to market participants 204 which may include both traders/trading customers 904 and market data recipients/consumers 906, such as news or reporting entities, and/or market data resellers/aggregators, which may receive and then resell, such as after aggregating with data from other sources, e.g. other trading systems, electronic or otherwise, analysis, etc., or other consumers of market data. Response messages, such as messages acknowledging receipt of an order ("ack"), indicating cancelation of an order ("nack" or cancel), confirming a trade has completed (confirm), or indicative of some other status, etc., are transmitted solely to those market participant which submitted the transaction underlying the response or which such information may be privy, who may also receive the corresponding market data message along with other market participants.

In one embodiment, the operation of the system 900 is implemented as part of the matching and market data functions 106, 112 of the electronic trading system 100. It will be appreciated that the operation of the system 900 may be implemented as part of other functions of the electronic trading system 100, or otherwise coupled with the communications infrastructure 202, which as described above, interconnects the various components of the electronic trading system 100. In one embodiment, the operation of the system 900 is implemented, at least in part, as a reconfigurable logic device, e.g. FPGA, coupled with a conventional match engine 914. Alternatively, the operation of the system 900 may be used with the redundant match engine architecture described above, e.g. the system 900 may be coupled with the orderer 210 and/or decider 212 described above and, in one implementation, is implemented on the same FPGA device.

The operation of the system 900 includes: generating a response message indicative of a response by the electronic marketplace, e.g. the match engine 914, to a request for a financial transaction received from a particular of the plurality of market participants 204 (Block 1002); and, based on a change in state therein caused by the received request, e.g. order, generating a corresponding financial data message comprising content representative thereof, e.g. market data (Block 1004).

The operation of the system 900 further includes synchronizing the transmission of the corresponding generated financial data and generated response messages, e.g. not transmitting the generated response message to the particular market participant 204 prior to transmitting the corresponding financial data message to all of the plurality of market participants 204 (Block 1006).

Wherein the response message may be generated, or otherwise received, prior to the corresponding financial data message, in one embodiment, the operation of the system 900 may further include storing the generated response message until the corresponding financial data message is ready to transmit, when the response message is generated prior to, or otherwise overtakes the transmission of, the corresponding financial data message (Block 1008). The stored responses may be checked upon receipt of each financial data message and, once the corresponding financial data message is received, the stored response message is allowed to be transmitted.

Alternatively, or in addition thereto, wherein the financial data message may be generated, or otherwise received, prior to the corresponding response message, the operation of the system 900 may further include storing data indicative of the prior transmission of the corresponding financial data message to allow transmission of the generated response message once generated, when the corresponding financial data message is generated prior to, or otherwise over takes the transmission of, the generated response message (Block 1010). For example, a log of transmitted financial data messages may be maintained and checked upon receipt of each response message. If the corresponding financial data message has been transmitted, as evidenced by the log, the response message is transmitted. Otherwise, the response message is stored as described above to await receipt of the corresponding financial data message.

In one embodiment, to enable a determination of the correspondence between response messages and financial data messages, the operation of the system 900 may further include augmenting the generated response message and generated financial data message with an identifier relating the generated response message with the generated financial data message (Block 1012). The identifier may comprise any unique code, such as an order number, time stamp, etc. which uniquely relates the response message with the corresponding financial data message. Further, in one embodiment, the operation of the system 900 may further include removing the identifier from the generated response message and generated financial data message prior to the transmission thereof, e.g. once the association there between has been used to ensure the response message is not transmitted prior to the corresponding financial data message, for example, to assure anonymity of the particular market participant to whom the response data is to be transmitted (Block 1014).

E. Implied Match Identification

Figure 11:
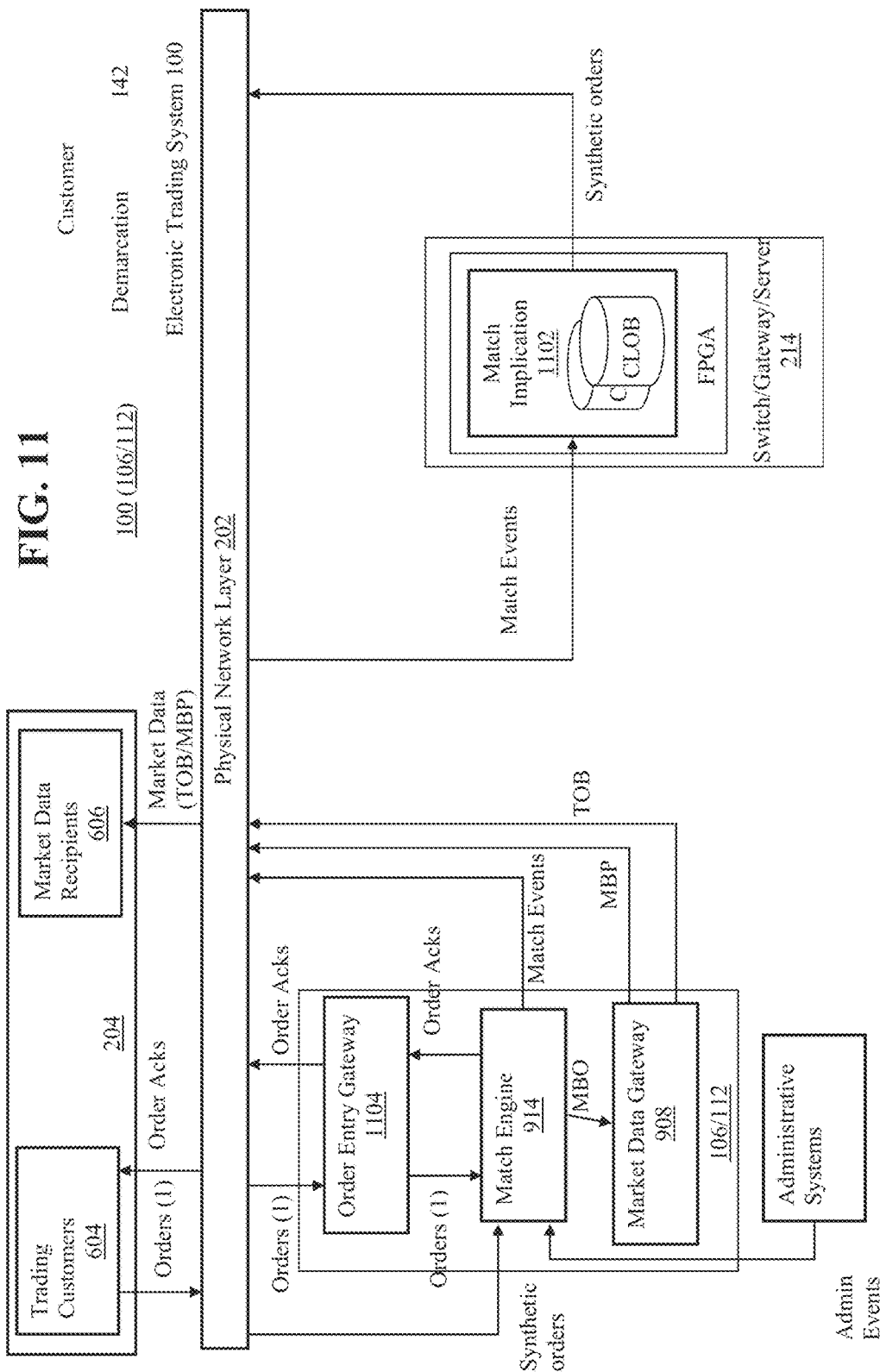
FIG. 11 depicts a block diagram of a system for improving the efficiency of the electronic trading system of FIG. 1 according to one embodiment.
Figure 12:
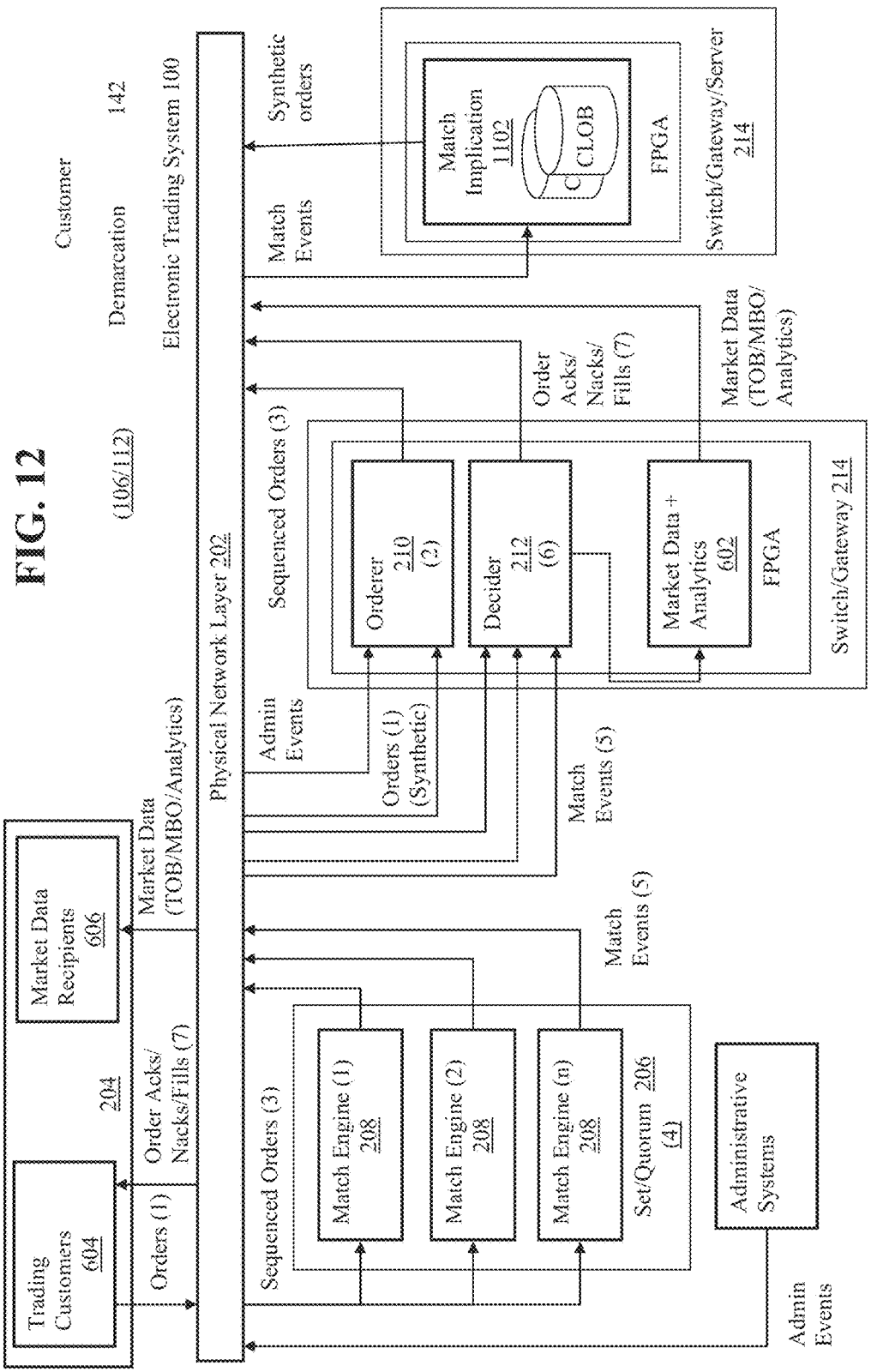
FIG. 12 depicts a block diagram of a system for improving the efficiency of the electronic trading system of FIG. 1 according to another embodiment.

As described above, identification of implied matches and opportunities may improve market liquidity. In one embodiment, the implication process may be moved outside the match engine function 106, which, as shown in FIGS. 11 and 12, may be a conventional match engine or a redundant match engine architecture as described above. For example, the implication process may be co-located with the Decider 212 of one or more Order/Decider coupled redundant match engines 208, described above, such as on the same FPGA or within the same switch, gateway 214 or other server or network device, so as to be privy to the match events generated thereby indicative of whether incoming orders are matched or not. In one implementation, a system 1102 for generating implied matches is provided which listens to all match events, described in detail above, and, using a set of self-maintained "shadow order books", attempts to identify, calculate or derive implied matches. If an implied match is identified, the system 1102 generates one or more synthetic orders into the necessary markets and injects them into the stream of incoming orders, such as by sending them to the relevant Orderers 210 or order entry gateway 1104 of a conventional match engine 106 (or directly thereto). These synthetic orders are then processed like any other orders resulting in the necessary implied matches. As the system 1102 may be privy to the match event data from multiple markets, e.g. multiple order books, and in one embodiment all markets/order books, it can identify a wider array of implied intra- and inter-market matches thereby improving liquidity. These synthetic orders can be injected ahead of any real orders that may be inbound to complete the implied transaction ahead thereof. The ability to identify implied matches across a wider variety of markets further enables the electronic trading system 100 to offer a wider variety of combination financial instruments, e.g. more complex combinations, even where the market therefore may be characterized by lower liquidity, such as due to the lower demand for such a complex product. In particular, the disclosed system may improve liquidity via the identification of implied matches in the relevant component financial instrument markets alleviating the need for liquidity in the specific market for the financial instrument.

Figure 13:
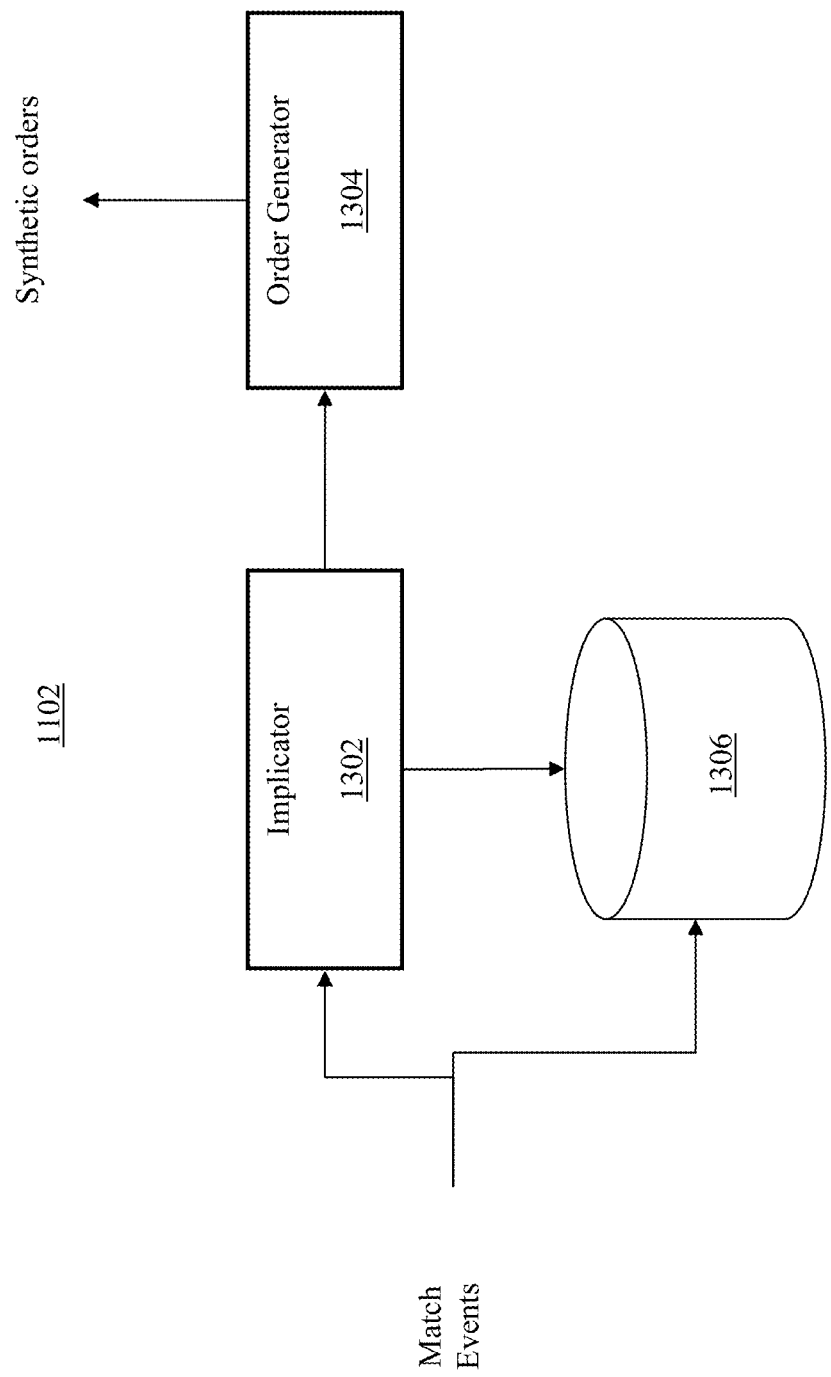
FIG. 13 depicts a more detailed block diagram of an implicator for use with the system shown in FIGS. 11 and 12 according to one embodiment.

Referring now to FIG. 13 there is shown a block diagram of a system 1102, according to one embodiment, for improving efficiency of an electronic trading system 100 comprising a plurality of match engines coupled therewith, which as shown in FIG. 11, may be a conventional match engine 106 which receives orders via an order entry gateway 1104, or, as shown in FIG. 12, may be a redundant match engine set 206 receiving orders via an orderer 210 as described above, or may be a match engine or match function having an alternative architecture. As used herein, a "match engine" 106 refers to either a conventional match engine or a redundant set of match engines as described. Each of the plurality of match engines, i.e. conventional or redundant sets, implement at least one market, or order book representative thereof, for an associated financial instrument, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/ instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied. In one embodiment, the system 1102 is implemented as a reconfigurable logic device, e.g. FPGA, and coupled with the match engines. For example, in one implementation, the system 1102 may be coupled with the orderer 210 and/or decider 212 described above and, may further be implemented on the same FPGA device.

The system 1102 includes an implicator 1302, which may be implemented as one or more logic components of an FPGA, such as the same FPGA in which the orderer 210 and decider 212 are implemented as described above, or otherwise coupled therewith or with a conventional match engine as described, such as via the network device backplane. Alternatively, the implicator 1302 may be implemented as logic, such as computer program logic, stored in a memory and executable by a processor coupled therewith to cause the processor to act as described.

The implicator 1302 is coupled with each of the plurality of match engines and operative to receive match event data therefrom indicative of whether each match engine was able to match an incoming order for at least one transaction for the associated financial instrument associated with that match engine with at least one previously received but unsatisfied order for a transaction counter thereto for the associated financial instrument, in at least partial satisfaction of one or both of the incoming order or the at least one other previously received order.

Furthermore, the implicator 1302 is operative, when the match event data indicates that the incoming order has not been fully satisfied, e.g. not matched at all or only partially filled, to attempt to identify a set of previously received but unsatisfied orders wherein, for any residual of each particular of the at least one component of the associated financial instrument of the incoming order, the set includes a previously received but unsatisfied order for a counter transaction for another financial instrument, which may be associated with another match engine, comprising at least the particular component, e.g. based on the transaction as distributively applied to each component, to at least partially satisfy/fill one or both of the residual of the particular component of the associated financial instrument of the incoming order or the component of the determined previously received order. The implicator 1302 is further operative to attempt to identify, e.g. recursively, and include in the set, for any component of the financial instrument of any previously received but unsatisfied orders included in the set and not at least partially satisfied by any of the components of the associated financial instrument of the incoming order, another previously received but unsatisfied order for a counter transaction for a financial instrument including at least the component of the financial instrument of the previously received but unsatisfied order, such that the incoming order together with the set of previously received but unsatisfied orders, if the transactions for the financial instruments thereof were completed there between, includes no fully unsatisfied orders.

In one embodiment, the system 1102 may further maintain a set of order book data structures, i.e. shadow order books, duplicative of the order books maintained by the plurality of match engines, and updated based on the received match event data to indicate, at least, those previously received order which are currently wholly or partially unsatisfied. The shadow order books may be maintained in a memory 1306, which may be a component of an FPGA device or other type of memory or storage, coupled with the implicator 1302. The implicator 1302 may then utilize the shadow order books to facilitate identification of the set of previously received but unsatisfied orders, data indicative of which is stored therein.

In one embodiment, the implicator 1302 is operative to attempt to identify the set of previously received but unsatisfied orders based on an implied matching algorithm. Exemplary matching algorithms may be found in U.S. Patent Application Publication Nos. 2011/0055067 A1, 2011/0066536 A1, 2011/0066568 A1, 2011/0087579 A1, 2011/0313905 A1, or 2013/0110694 A1, all of which are incorporated by reference herein in their entirety.

In one embodiment, upon the identification by the implicator 1302 of more than one set, overlapping or non-overlapping, of previously received but unsatisfied orders, the implicator 1302 may be further operative to select one of the more than one set of previously received but unsatisfied orders for further generation of synthetic orders. For example, the implicator 1302 may be further operative to select the one of the more than one set of previously received but unsatisfied orders containing the least, or alternatively, the most, number of previously received but unsatisfied orders.

The system 1102 also includes an order generator 1304, which may be implemented as one or more logic components of an FPGA, such as the same FPGA in which the orderer 210 and decider 212 are implemented as described above, or otherwise coupled therewith. Alternatively, the order generator 1304 may be implemented as logic, such as computer program logic, stored in a memory and executable by a processor coupled therewith to cause the processor to act as described. The order generator 1304 is coupled with the implicator 1302 and operative to, when the incoming order together with the identified set of previously received but unsatisfied orders, if the components of the financial instruments thereof were completed there between, include no fully unsatisfied orders, the incoming order being referred to as a "trigger", "promoter", "bridging" or "catalyst" order, generate, for each financial instrument of the incoming order and the set of previously received but unsatisfied orders, a set of unique synthetic, e.g. implied, counter orders, each for a transaction of another of the financial instruments of the incoming order and the set of previously received but unsatisfied orders comprising at least one component in common.

In one embodiment, the order generator 1304 is further operative to submit each synthetic order to the match engine associated with the financial instrument thereof. As described above, the match engine would then process the synthetic order as it would any other incoming order. However, as it has already been determined that a suitable counter order exists in the order book of that match engine, a match should be determined. With all of the synthetic orders being matched, the incoming order could then be matched as described.

In one embodiment wherein the match event data is further communicated to a plurality of market participants 204, e.g. as market data, the system 1102 may be operative to attempt to identify the set of previously received but unsatisfied orders, generate the set of synthetic orders and submit each synthetic order to the match engine associated with the financial instrument thereof, prior to receipt by the associated match engine of an order generated by any one of the plurality of market participants 204 response to the receipt of the match event data. This ensures that the implied match can be determined and then traded before any of the set of previously received but unsatisfied orders can be matched and traded by other means, undermining the implied match.

In one embodiment, the order generator 1304 is further operative to, when the incoming order together with the identified set of previously received but unsatisfied orders, if the transactions for the components of the financial instruments thereof were completed there between, includes at least one fully unsatisfied order, i.e. an implied match cannot be identified, cause the unsatisfied portion, which may be the entire quantity, of the incoming order to be rested on the order book, i.e. treated as a previously received but unsatisfied order to await another subsequently received incoming order counter thereto for the associated financial instrument, in at least partial satisfaction of one or both of the subsequently received incoming order or the unsatisfied portion of the incoming order.

Figure 14:
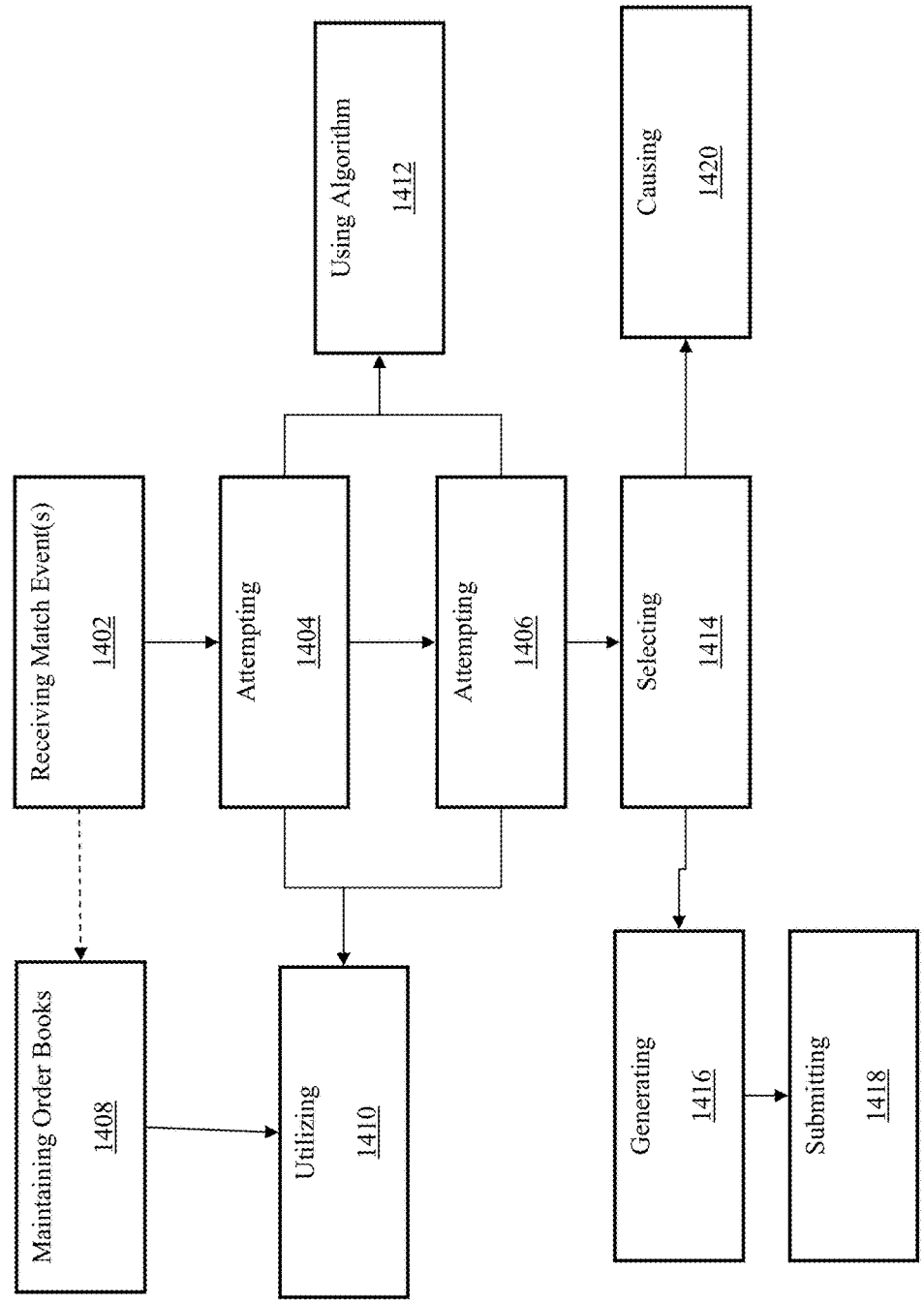
FIG. 14 depicts a flow chart showing operation of the system of FIGS. 11 and 12 according to one embodiment.

FIG. 14 depicts a flow chart 1400 showing operation of the system 1102 of FIG. 13. In particular FIG. 14 shows a method, according to one embodiment, for improving efficiency of an electronic trading system 100 comprising a plurality of match engines coupled therewith, which as shown in FIG. 11, may be a conventional match engine 106 which receives orders via an order entry gateway 1104, or, as shown in FIG. 12, may be a redundant match engine set 206 receiving orders via an orderer 210 as described above, or may be a match engine or match function having an alternative architecture. As used herein, a "match engine" 106 refers to either a conventional match engine or a redundant set of match engines as described. Each of the plurality of match engines, i.e. conventional or redundant sets, implement at least one market, or order book representative thereof, for an associated financial instrument, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied.

The operation of the system 1102 includes receiving match event data therefrom indicative of whether each match engine was able to match an incoming order for at least one transaction for the associated financial instrument associated with that match engine with at least one previously received but unsatisfied order for a transaction counter thereto for the associated financial instrument, in at least partial satisfaction of one or both of the incoming order or the at least one other previously received order (Block 1402).

Furthermore, when the match event data indicates that the incoming order has not been fully satisfied, e.g. not matched at all or only partially filled, the operation of the system 1102 includes attempting to identify a set of previously received but unsatisfied orders wherein, for any residual of each particular of the at least one component of the associated financial instrument of the incoming order, the set includes a previously received but unsatisfied order for a counter transaction for another financial instrument, which may be associated with another match engine, comprising at least the particular component, e.g. based on the transaction as distributively applied to each component, to at least partially satisfy/fill one or both of the residual of the particular component of the associated financial instrument of the incoming order or the component of the determined previously received order (Block 1404). The operation of the system 1102 further includes attempting to identify, e.g. recursively, and include in the set, for any component of the financial instrument of any previously received but unsatisfied orders included in the set and not at least partially satisfied by any of the components of the associated financial instrument of the incoming order, another previously received but unsatisfied order for a counter transaction for a financial instrument including at least the component of the financial instrument of the previously received but unsatisfied order, such that the incoming order together with the set of previously received but unsatisfied orders, if the transactions for the financial instruments thereof were completed there between, includes no fully unsatisfied orders (Block 1406).

In one embodiment, the operation of the system 1102 may further include maintaining a set of order book data structures, i.e. shadow order books, duplicative of the order books maintained by the plurality of match engines, and updated based on the received match event data to indicate, at least, those previously received order which are currently wholly or partially unsatisfied (Block 1408). The shadow order books may be maintained in a memory 1306, which may be a component of an FPGA device or other type of memory or storage, coupled with the implicator 1302. The operation of the system 1102 may then include utilizing the shadow order books to facilitate identification of the set of previously received but unsatisfied orders, data indicative of which is stored therein (Block 1410).

In one embodiment, the operation of the system 1102 further includes attempting to identify the set of previously received but unsatisfied orders based on an implied matching algorithm (Block 1412). Exemplary matching algorithms may be found in U.S. Patent Application Publication Nos. 2011/0055067 A1, 2011/0066536 A1, 2011/0066568 A1, 2011/0087579 A1, 2011/0313905 A1, or 2013/0110694 A1, all of which are incorporated by reference herein in their entirety.

In one embodiment, upon the identification of more than one set, overlapping or non-overlapping, of previously received but unsatisfied orders, the operation of the system 1102 may further include selecting one of the more than one set of previously received but unsatisfied orders for further generation of synthetic orders (Block 1414), such as selecting the one of the more than one set of previously received but unsatisfied orders containing the least, or alternatively, the most, number of previously received but unsatisfied orders.

The operation of the system 1102 further includes, when the incoming order together with the identified set of previously received but unsatisfied orders, if the components of the financial instruments thereof were completed there between, include no fully unsatisfied orders, the incoming order being referred to as a "trigger", "promoter", "bridging" or "catalyst" order, generating, for each financial instrument of the incoming order and the set of previously received but unsatisfied orders, a set of unique synthetic, e.g. implied, counter orders, each for a transaction of another of the financial instruments of the incoming order and the set of previously received but unsatisfied orders comprising at least one component in common (Block 1416).

In one embodiment, the operation of the system 1102 further includes submitting each synthetic order to the match engine associated with the financial instrument thereof (Block 1418). As described above, the match engine would then process the synthetic order as it would any other incoming order. However, as it has already been determined that a suitable counter order exists in the order book of that match engine, a match should be determined. With all of the synthetic orders being matched, the incoming order could then be matched as described.

In one embodiment wherein the match event data is further communicated to a plurality of market participants 204, e.g. as market data, the operation of the system 1102 may further include attempting to identify the set of previously received but unsatisfied orders, generate the set of synthetic orders and submit each synthetic order to the match engine associated with the financial instrument thereof, prior to receipt by the associated match engine of an order generated by any one of the plurality of market participants 204 response to the receipt of the match event data. This ensures that the implied match can be determined and then traded before any of the set of previously received but unsatisfied orders can be matched and traded by other means, undermining the implied match.

In one embodiment, the operation of the system 1102 further includes, when the incoming order together with the identified set of previously received but unsatisfied orders, if the transactions for the components of the financial instruments thereof were completed there between, includes at least one fully unsatisfied order, i.e. an implied match cannot be identified, causing the unsatisfied portion, which may be the entire quantity, of the incoming order to be rested on the order book, i.e. treated as a previously received but unsatisfied order to await another subsequently received incoming order counter thereto for the associated financial instrument, in at least partial satisfaction of one or both of the subsequently received incoming order or the unsatisfied portion of the incoming order (Block 1420).

F. Implied Opportunity Identification

Further, as was described above, the process by which implied matches are identified may be separated from the process by which implied opportunities are identified. In particular, once it has been determined that an incoming order has not been fully satisfied (both by attempting to identify an outright order match and an implied match), the incoming order, with its original or residual quantity, will be placed on the order book to rest and to be advertised to the market participants as being available to trade. As was described above, to further improve liquidity by creating additional opportunities for this order to be traded, a system 1502 for identifying implied opportunities may then determine what, if any, one or more orders in related markets, if received, would allow the incoming order to trade. To facilitate this process, the system 1502, as will be described below, may maintain its own shadow set of order books and may further derive, calculate, or otherwise compute more than one implied opportunity, each of which may, alone or in concert with other resting outright orders, allow the incoming order to trade and wherein when any one of these one or more implied opportunities is traded against, the remaining implied opportunities are canceled. Further, should orders be placed against more than one of these implied opportunities, arbitration mechanisms may be provided to determine which will prevail. Alternatively, the system 1502 may determine that more than one implied opportunity is needed, alone or in concert with presently resting orders. As implied opportunities are synthetic and may only be tradeable if all of the related orders are tradeable, mechanisms may be necessary, for example, to ensure that all of the implied opportunities are substantially simultaneously traded together or not at all. Alternatively, the implied opportunity may be permitted to trade under the assumption that the remaining opportunities will also be traded eventually, thereby allowing all of the related orders to be traded, wherein the Exchange, or another entity, such as a Market Maker, may adopt the synthetic counter position and the risk that all of the implied opportunities will not be traded.

The identified implied opportunities are then added to the market data so as to solicit the desired orders. That is, synthetic market data events, e.g. synthetic solicitations, are generated to advertise the availability of the implied opportunity in order to solicit the desired order(s). In one embodiment, synthetic orders identical to those needed are injected into the incoming order stream of the relevant markets. As the implied match function would have already determined that suitable counter orders do not exist in those markets, these synthetic orders will not be matched and instead will be rested on the respective order books and advertised to the market participants via the standard market data feed. Should a market participant choose to trade against one of these synthetic orders, the implied matching functionality described above, may see such orders to create an implied match and execute trades among all of the relevant orders.

As described above, implied opportunity identification may be an adjunct to implied match identification. Separating implied opportunity from implied match allows streamlining of both functions so that the processing can be performed quickly. In particular, identification of implied matches involves reviewing the order books of products which share at least one common component instrument to discern if the requisite orders are resting therein. In contrast, the identification of implied opportunities requires knowledge of the available order books for products sharing at least one common component instrument but review of those order books may be unnecessary assuming an implied match was not previously identified. In one embodiment, while the functions of implied match identification and implied opportunity identification may be separated, they may still be coupled with each other so as, for example, allow the implied match processor to identify those orders that it was unable to identify during its process to the implied opportunity generator. Furthermore, identification of implied matches typically requires analysis of a greater number of generations of combination instruments as the component instruments typically further comprise component instruments of their own, as compared to identification of implied opportunities where such opportunities are typically readily identified via identification of common singular component instruments. Further, while identification of implied matches is done as part of/in concert with the matching process, a process which must be performed sequentially, quickly and deterministically, the identification of implied opportunities is effectively merely producing information to be broadcast to the market participants and can be performed in parallel with the matching process or otherwise separately therefrom. Separation further permits the electronic trading system to offer either identification of implied matches or implied opportunities but not both if necessary. For example, due to high volumes, it may be desirable to turn down the frequency of implied opportunity identification, however, turning off implied match identification may change the liquidity pool and alter the market, so it should remain on during the life of a trading session.

Figure 15:
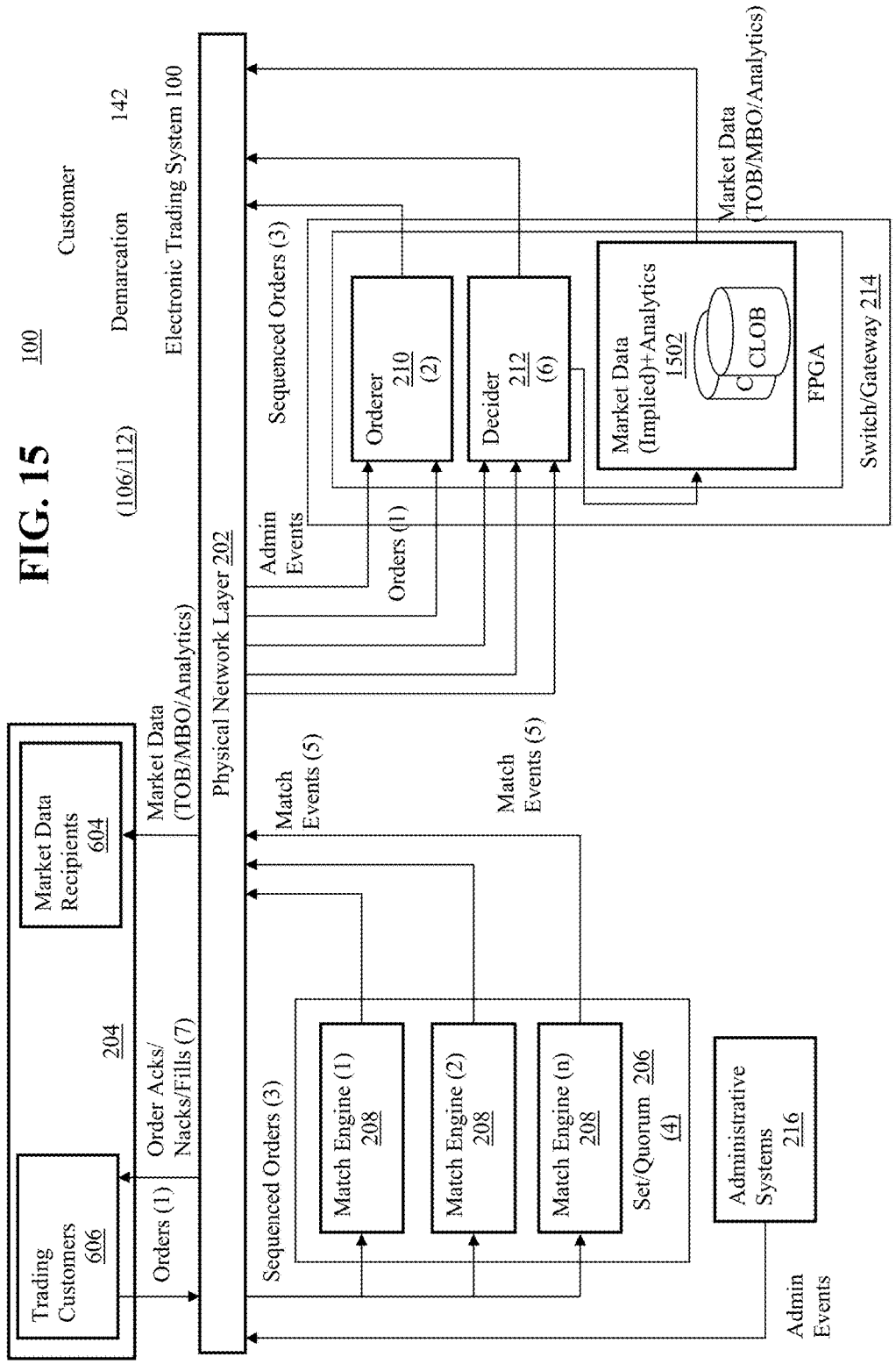
FIG. 15 depicts a block diagram of a system for improving market liquidity for use with the system of FIG. 1 according to one embodiment.

As described above, identification of implied matches and opportunities may improve market liquidity. In one embodiment, the process of identifying implied opportunities may be moved outside the match engine function 106, which, as shown in FIG. 15, may be a redundant match engine architecture as described above. It will be appreciated that the disclosed embodiments may also be implemented in conjunction with a conventional match engine architecture or other match engine architecture. For example, the implication process may be co-located with the Decider 212 of one or more Order/Decider coupled redundant match engines 208, described above, such as on the same FPGA or within the same switch, gateway 214 or other network device, so as to be privy to the match events generated thereby indicative of whether incoming orders are matched or not. In one embodiment, the system 1502 for identifying implied opportunities may be implemented in conjunction with the system 1102 for identifying implied matches such that identification of implied opportunities occurs only if both an outright and implied match cannot be found. In an alternative embodiment, identification of implied opportunities may occur in parallel with identification of implied matches to improve efficiency, however, any identified implied opportunities may be suppressed when an implied match is identified.

In one implementation, a system 1502 for generating implied matches is provided which listens to all match events, described in detail above, and, using a set of self-maintained "shadow order books", attempts to identify, calculate or derive implied opportunities. If an implied opportunity is identified, the system 1102 may generate one or more synthetic orders into the necessary markets and inject them into the stream of incoming orders, such as by sending them to the relevant Orderers 210 or order entry gateway 1104 of a conventional match engine 106. These synthetic orders are then processed like any other orders resulting in the necessary implied orders being rested on the respective order books and advertised via the market data feed to the market participants to solicit the desired orders for an implied match. As the system 1502 may be privy to the match event data from multiple markets, e.g. multiple order books, and in one embodiment all markets/order books, it can identify a wider array of implied intra- and inter-market opportunities thereby improving liquidity. It will be appreciated that the synthetic orders may be injected directly into the market data feed in order to advertise their availability to the market participants and solicit the desired orders therefrom. The ability to identify implied opportunities across a wider variety of markets further enables the electronic trading system 100 to offer a wider variety of combination financial instruments, e.g. more complex combinations, even where the market therefore may be characterized by lower liquidity, such as due to the lower demand for such a complex product. In particular, the disclosed system may improve liquidity via the identification of implied opportunities in the relevant component financial instrument markets alleviating the need for liquidity in the specific market for the financial instrument.

Figure 16:
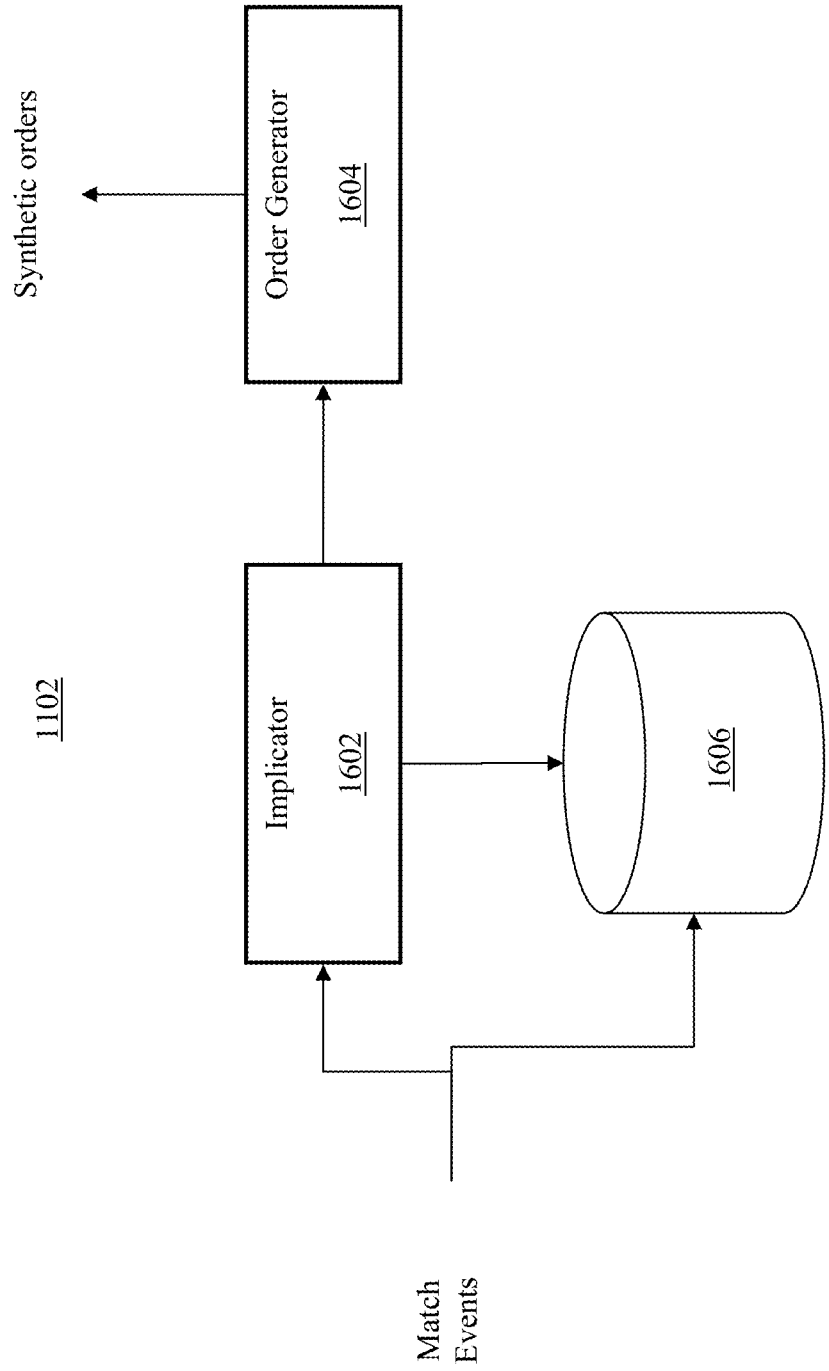
FIG. 16 depicts a block diagram of a system for improving the efficiency of the electronic trading system for use with the system of FIG. 15 according to one embodiment.

Referring now to FIG. 16 there is shown a block diagram of a system 1502, according to one embodiment, for improving efficiency of an electronic trading system 100 comprising a plurality of match engines coupled therewith, which as shown in FIG. 15, may be a redundant match engine set 206 receiving orders via an orderer 210 as described above, or may be a conventional match engine or match function having an alternative architecture. As used herein, a "match engine" 106 refers to either a conventional match engine or a redundant set of match engines as described. Each of the plurality of match engines, i.e. conventional or redundant sets, implement at least one market, or order book representative thereof, for an associated financial instrument, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied. In one embodiment, the system 1502 is implemented as a reconfigurable logic device, e.g. FPGA, and coupled with the match engines. For example, in one implementation, the system 1102 may be coupled with the orderer 210 and/or decider 212 described above and, may further be implemented on the same FPGA device.

The system 1502 includes an implicator 1602, which may be implemented as one or more logic components of an FPGA, such as the same FPGA in which the orderer 210 and decider 212 are implemented as described above, or otherwise coupled therewith or with a conventional match engine as described, such as via the network device backplane. Alternatively, the implicator 1602 may be implemented as logic, such as computer program logic, stored in a memory and executable by a processor coupled therewith to cause the processor to act as described. It will be appreciated that the implicator 1602 utilized for implied opportunity identification may be the same implicator 1302 used to identify implied matches, or may be implemented separate therefrom.

The implicator 1602 is coupled with each of the plurality of match engines and operative to receive match event data therefrom indicative of whether each match engine was able to match an incoming order for at least one transaction for the associated financial instrument associated with that match engine with at least one previously received but unsatisfied order for a transaction counter thereto for the associated financial instrument, in at least partial satisfaction of one or both of the incoming order or the at least one other previously received order.

Furthermore, the implicator 1602 is operative, when the match event data indicates that the incoming order has not been fully satisfied, e.g. not matched at all or only partially filled, to attempt to identify a set of previously received but unsatisfied orders wherein, for any residual of each particular of the at least one component of the associated financial instrument of the incoming order, the set includes a previously received but unsatisfied order for a counter transaction for another financial instrument, which may be associated with another match engine, comprising at least the particular component, e.g. based on the transaction as distributively applied to each component, to at least partially satisfy/fill one or both of the residual of the particular component of the associated financial instrument of the incoming order or the component of the determined previously received order. The implicator 1602 is further operative to attempt to identify, e.g. recursively, and include in the set, for any component of the financial instrument of any previously received but unsatisfied orders included in the set and not at least partially satisfied by any of the components of the associated financial instrument of the incoming order, another previously received but unsatisfied order for a counter transaction for a financial instrument including at least the component of the financial instrument of the previously received but unsatisfied order, such that the incoming order together with the set of previously received but unsatisfied orders, if the transactions for the financial instruments thereof were completed there between, includes no fully unsatisfied orders.

In one embodiment, the system 1502 may further maintain a set of order book data structures, i.e. shadow order books, duplicative of the order books maintained by the plurality of match engines, and updated based on the received match event data to indicate, at least, those previously received order which are currently wholly or partially unsatisfied. The shadow order books may be maintained in a memory 1606, which may be a component of an FPGA device or other type of memory or storage, coupled with the implicator 1602. The implicator 1602 may then utilize the shadow order books to facilitate identification of the set of previously received but unsatisfied orders, data indicative of which is stored therein.

In one embodiment, the implicator 1602 is operative to attempt to identify the set of previously received but unsatisfied orders based on an implied opportunity identification algorithm. Exemplary matching algorithms may be found in U.S. Patent Application Publication Nos. 2011/0055067 A1, 2011/0066536 A1, 2011/0066568 A1, 2011/0087579 A1, 2011/0313905 A1, or 2013/0110694 A1, all of which are incorporated by reference herein in their entirety.

In one embodiment, upon the identification by the implicator 1602 of more than one set, overlapping or non-overlapping, of previously received but unsatisfied orders, the implicator 1602 may be further operative to select one of the more than one set of previously received but unsatisfied orders for further generation of synthetic solicitations. For example, the implicator 1602 may be further operative to select the one of the more than one set of previously received but unsatisfied orders containing the least, or alternatively, the most, number of previously received but unsatisfied orders.

The system 1502 also includes an order generator 1604 coupled with the implicator 1602 and operative to, when the incoming order together with the identified set of previously received but unsatisfied orders, which may include no orders, if the components thereof were completed there between, include at least one fully unsatisfied order having at least one fully unsatisfied component thereof, for each of the at least one fully unsatisfied order for a financial instrument having more than one component, generate, for each at least one fully unsatisfied component, a synthetic solicitation, e.g. an implied opportunity, for a counter transaction for a financial instrument comprising a component identical to the at least one fully unsatisfied component and communicate the synthetic solicitation, via, for example, the market data feed, to a plurality of market participants and for any two or more of the at least one fully unsatisfied orders for financial instruments each having only one component, attempt to identify a financial instrument comprising a combination of those components, and for each identified financial instrument, generate a synthetic solicitation, e.g. an implied opportunity, for a counter transaction therefore and communicate, such as via the market data feed, the synthetic solicitation to the plurality of market participants, wherein the price of the synthetic solicitation may computed based on the components and other orders resting in the order book therefore.

In one embodiment, the synthetic solicitations are communicated to the market participants 204 substantially simultaneously with a communications, e.g. immediately subsequent thereafter, indicating that the incoming order has not been fully satisfied to the market participant of the plurality of market participants which sent the incoming order.

In one embodiment, the order generator 1604 is operative to submit each synthetic solicitation as an order to the associated match engine to cause the associated match engine to generate match event data, e.g. indicative of the order not being matched and thereby rested on the order book maintained thereby, based thereon, the match event data then being communicated to a plurality of market participants 204 to solicit an order counter to the synthetic order. Alternatively, the synthetic solicitation may be directly injected into the market data stream for communication to the market participants 204.

In one embodiment, the order generator 1304 is further operative to, when the incoming order together with the identified set of previously received but unsatisfied orders, if the transactions for the components of the financial instruments thereof were completed there between, includes at least one fully unsatisfied order, i.e. an implied match cannot be identified, cause the unsatisfied portion, which may be the entire quantity, of the incoming order to be rested on the order book, i.e. treated as a previously received but unsatisfied order to await another subsequently received incoming order counter thereto for the associated financial instrument, in at least partial satisfaction of one or both of the subsequently received incoming order or the unsatisfied portion of the incoming order.

Figure 17:
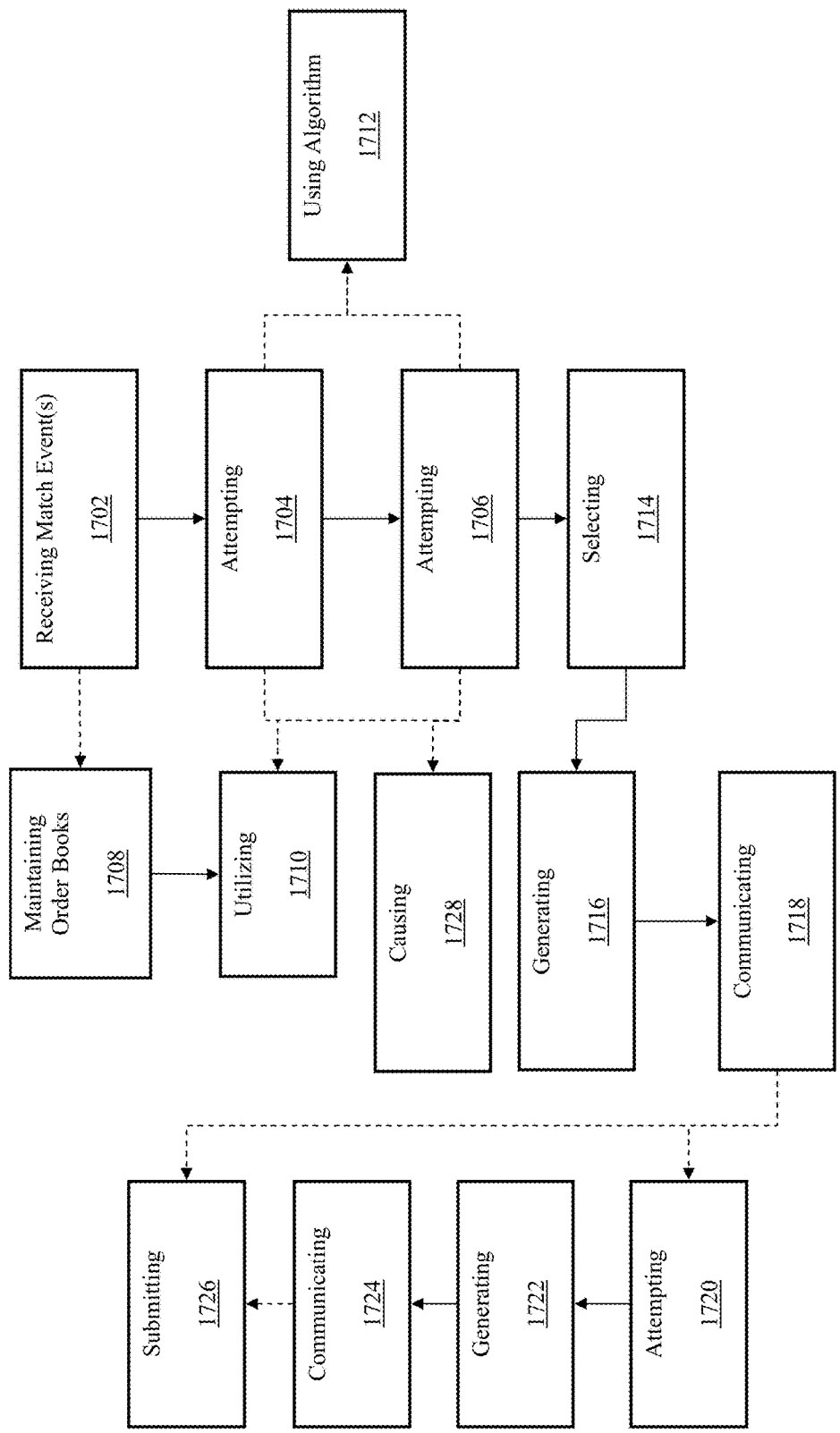
FIG. 17 depicts a flow chart showing operation of the system of FIGS. 15 and 16 according to one embodiment.

FIG. 17 depicts a flow chart 1700 showing operation of the system 1502 of FIG. 16. In particular FIG. 17 shows a method, according to one embodiment, for improving efficiency of an electronic trading system 100 comprising a plurality of match engines coupled therewith, which as shown in FIG. 15, may be a redundant match engine set 206 receiving orders via an orderer 210 as described above, or may be a conventional match engine or match function having an alternative architecture. As used herein, a "match engine" 106 refers to either a conventional match engine or a redundant set of match engines as described. Each of the plurality of match engines, i.e. conventional or redundant sets, implement at least one market, or order book representative thereof, for an associated financial instrument, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied.

The operation of the system 1502 includes receiving match event data therefrom indicative of whether each match engine was able to match an incoming order for at least one transaction for the associated financial instrument associated with that match engine with at least one previously received but unsatisfied order for a transaction counter thereto for the associated financial instrument, in at least partial satisfaction of one or both of the incoming order or the at least one other previously received order (Block 1702).

Furthermore, when the match event data indicates that the incoming order has not been fully satisfied, e.g. not matched at all or only partially filled, the operation of the system 1502 includes attempting to identify a set of previously received but unsatisfied orders wherein, for any residual of each particular of the at least one component of the associated financial instrument of the incoming order, the set includes a previously received but unsatisfied order for a counter transaction for another financial instrument, which may be associated with another match engine, comprising at least the particular component, e.g. based on the transaction as distributively applied to each component, to at least partially satisfy/fill one or both of the residual of the particular component of the associated financial instrument of the incoming order or the component of the determined previously received order (Block 1704). The operation of the system 1502 further includes attempting to identify, e.g. recursively, and include in the set, for any component of the financial instrument of any previously received but unsatisfied orders included in the set and not at least partially satisfied by any of the components of the associated financial instrument of the incoming order, another previously received but unsatisfied order for a counter transaction for a financial instrument including at least the component of the financial instrument of the previously received but unsatisfied order, such that the incoming order together with the set of previously received but unsatisfied orders, if the transactions for the financial instruments thereof were completed there between, includes no fully unsatisfied orders (Block 1706).

In one embodiment, the operation of the system 1502 may further include maintaining a set of order book data structures, i.e. shadow order books, duplicative of the order books maintained by the plurality of match engines, and updated based on the received match event data to indicate, at least, those previously received order which are currently wholly or partially unsatisfied (Block 1708). The shadow order books may be maintained in a memory 1606, which may be a component of an FPGA device or other type of memory or storage, coupled with the implicator 1604. The operation of the system 1502 may then include utilizing the shadow order books to facilitate identification of the set of previously received but unsatisfied orders, data indicative of which is stored therein (Block 1710).

In one embodiment, the operation of the system 1502 further includes attempting to identify the set of previously received but unsatisfied orders based on an implied matching algorithm (Block 1712). Exemplary matching algorithms may be found in U.S. Patent Application Publication Nos. 2011/0055067 A1, 2011/0066536 A1, 2011/0066568 A1, 2011/0087579 A1, 2011/0313905 A1, or 2013/0110694 A1, all of which are incorporated by reference herein in their entirety.

In one embodiment, upon the identification of more than one set, overlapping or non-overlapping, of previously received but unsatisfied orders, the operation of the system 1502 may further include selecting one of the more than one set of previously received but unsatisfied orders for further generation of synthetic solicitations (Block 1714), such as selecting the one of the more than one set of previously received but unsatisfied orders containing the least, or alternatively, the most, number of previously received but unsatisfied orders.

The operation of the system 1502 also includes, when the incoming order together with the identified set of previously received but unsatisfied orders, which may include no orders, if the components thereof were completed there between, include at least one fully unsatisfied order having at least one fully unsatisfied component thereof, for each of the at least one fully unsatisfied order for a financial instrument having more than one component, generating, for each at least one fully unsatisfied component, a synthetic solicitation, e.g. an implied opportunity, for a counter transaction for a financial instrument comprising a component identical to the at least one fully unsatisfied component (Block 1716) and communicating the synthetic solicitation, via, for example, the market data feed, to a plurality of market participants (Block 1718) and for any two or more of the at least one fully unsatisfied orders for financial instruments each having only one component, attempting to identify a financial instrument comprising a combination of those components (Block 1720), and for each identified financial instrument, generating a synthetic solicitation, e.g. an implied opportunity, for a counter transaction therefore (Block 1722) and communicating (Block 1724), such as via the market data feed, the synthetic solicitation to the plurality of market participants, wherein the price of the synthetic solicitation may computed based on the components and other orders resting in the order book therefore.

In one embodiment, the synthetic solicitations are communicated to the market participants 204 substantially simultaneously, e.g. immediately subsequent thereto, with a communications indicating that the incoming order has not been fully satisfied to the market participant of the plurality of market participants which sent the incoming order.

In one embodiment, the operation of the system 1502 further includes submitting each synthetic solicitation as an order to the associated match engine (Block 1726) to cause the associated match engine to generate match event data, e.g. indicative of the order not being matched and thereby rested on the order book maintained thereby, based thereon, the match event data then being communicated to a plurality of market participants 204 to solicit an order counter to the synthetic order. Alternatively, the synthetic solicitation may be directly injected into the market data stream for communication to the market participants 204.

In one embodiment, the operation of the system 1502 further includes, when the incoming order together with the identified set of previously received but unsatisfied orders, if the transactions for the components of the financial instruments thereof were completed there between, includes at least one fully unsatisfied order, i.e. an implied match cannot be identified, causing the unsatisfied portion, which may be the entire quantity, of the incoming order to be rested on the order book, i.e. treated as a previously received but unsatisfied order to await another subsequently received incoming order counter thereto for the associated financial instrument, in at least partial satisfaction of one or both of the subsequently received incoming order or the unsatisfied portion of the incoming order (Block 1728).

G. In-Band Pre-Trade Credit Controls

As was described above, the ability to see all incoming transactions and match events for a given set of markets, such as by the Orderer and Decider components of the Orderer/Decider architecture described above, allows for improved market protection mechanisms, such as improved credit controls based on pre-trade transactions, e.g. incoming orders, prior to being received by a match engine, referred to as "in band." Credit controls generally evaluate trader activity, e.g. trade orders, against specified activity limits, e.g. credit limits, to control the amount of risk, which may be defined as the predicted maximum dollar amount/value that may be lost over a defined period of time based on a particular confidence level, that a market participant, or group thereof, may undertake. Risk, as opposed to the mere magnitude of the transaction, is generally a derived value which contemplates the transaction in combination with other factors, such as other transactions from the same or different traders, which may dampen or magnify the risk of the particular transaction, or for which the risk thereof may be dampened or magnified by the particular transactions. One methodology for measuring risk is referred to as percentage of value at risk (VaR) which is a statistical technique to measure and quantity a level of financial risk over a period time based on market velocity and direction, i.e. the rate and direction of price changes in the market. Credit controls may be applied to individual traders and/or organizations of traders, such as all of the traders working for a particular broker.

Applying credit controls requires determining the risk incurred with each transaction undertaken by the market participant which generally involves making one or more assumptions as to future events and applying those assumptions to the current transaction. As such transactions may be related to other transactions undertaken by that market participant as well as other factors, the quantification of the risk of any one transaction may be performed in numerous different ways based on different assumptions, each possibly yielding a different result, e.g. different accuracy and/or confidence levels, and is generally computationally intensive. Accordingly, credit controls have generally been applied after transactions have been processed, e.g. after the matching process, so as not to impede transaction throughput. As opposed to evaluating credit limits and applying credit controls based on post-trade results, referred to as "out of band," the disclosed embodiments enable proactive operations to apply credit controls eliminating the need, for example, to retroactively "unwind" completed, and likely complex multi-party, transactions which exceeded a trader's credit limit or otherwise impart excessive risk on the market.

As described above, the disclosed embodiments generally implement a high speed credit evaluator to maintain credit limits, such as for each product, for each individual account, for each individual side of a trade, or combinations thereof. The disclosed embodiments may further accept limit updates/modifications from external sources on a periodic, non-real time basis, disseminate position and limit data on a scheduled or ad-hoc basis, and enforce positional limits, as calculated based on quantity, in real-time for all incoming orders to the match engine. In particular, the disclosed embodiments, having access to all incoming orders, may evaluate not only a specific trader activity, but all other trader's activity as well so as to be able to determine how a particular transaction will affect a particular trader's credit position, e.g. present level of risk as compared to their limit, as well as the effect on all of the other traders' credit positions. As opposed to credit control mechanisms implemented by the market participants themselves, which are only privy to the transaction of those market participants, the disclosed embodiments can evaluate the effects of transactions not only on the party but also on the counter party thereto, as well as other market participants engaged in related transactions.

Furthermore, the disclosed embodiments enable consideration of incoming transactions in conjunction with resting orders and/or open positions (completed orders) in the submitting market participant's and/or other market participants' portfolios, consideration of the probability that the incoming order will be fully or partially satisfied/filled such as by looking at the current market depth, other incoming orders for the same product or counter party activity, as well as consideration of risk to the entire market based on size of the incoming order.

When it is determined that a given transaction causes an increase in risk above the defined credit limit, the transaction may be blocked. It will be appreciated that transactions which do not increase risk above a particular threshold, are risk neutral or reduce risk, may be permitted even when the particular market participant's credit limit has been exceeded. In one embodiment, a risk exceeding transaction may only be partially filled according to a modified allocation algorithm designed to reduce the risk of the transaction thereby. In one embodiment, multiple credit limit thresholds may be defined whereby a lower limit is specified to cause preemptive actions to occur, such as a warning message and/or may trigger more intensive scrutiny of subsequent transactions, such as via the application of more accurate, but also possibly more computationally intensive, risk computation algorithms. In one embodiment, patterns of risky activity may be identified based on pre-defined or dynamically defined activity patterns. Furthermore, the disclosed embodiments, may implement proactive mechanisms to reduce risk such as by computing and soliciting risk reducing transactions from the market participants in a similar manner as implied opportunities.

Figure 18:
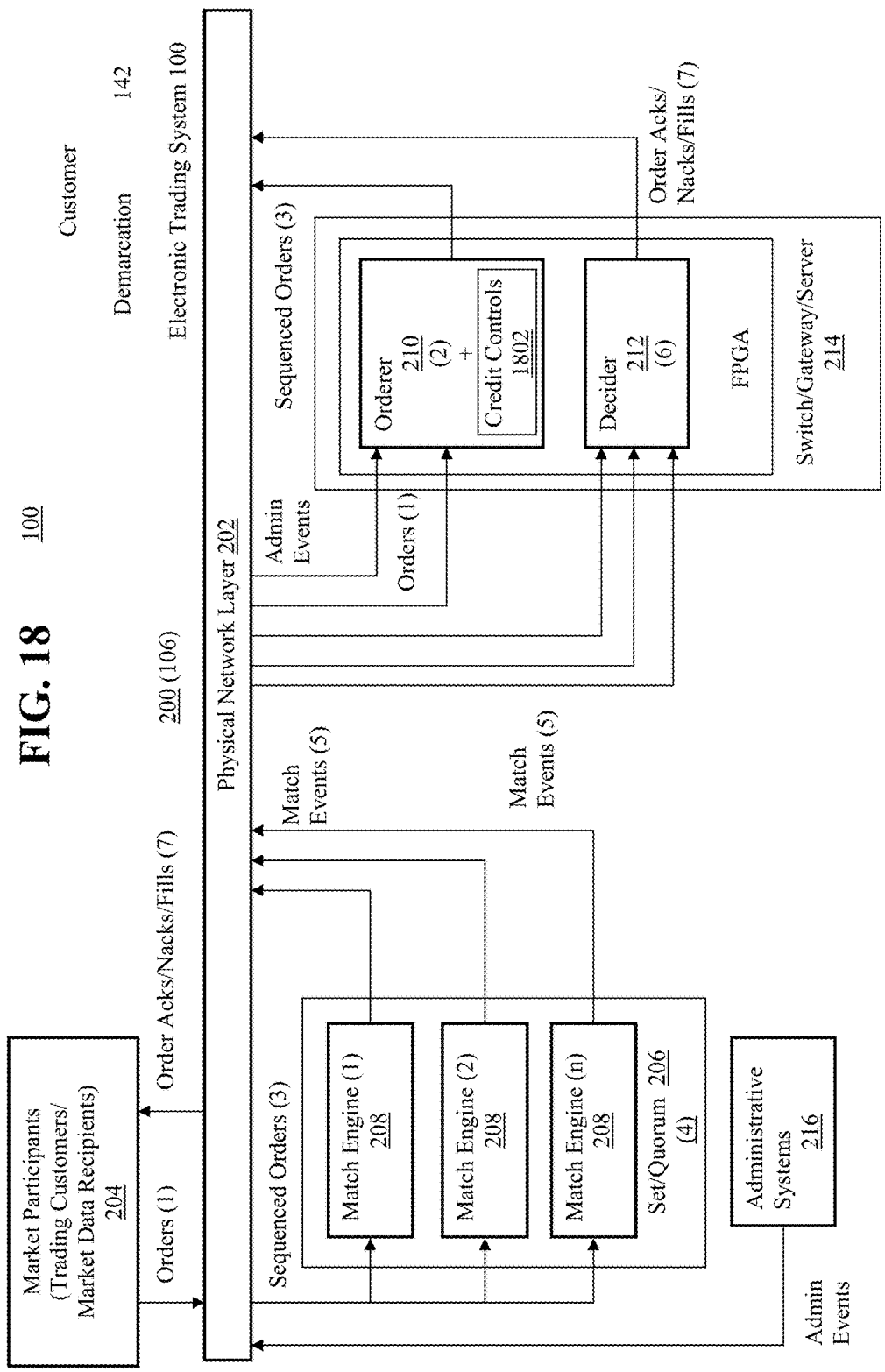
FIG. 18 depicts a block diagram of a system for protecting a market implemented by the system of FIG. 1 according to one embodiment.
Figure 19:
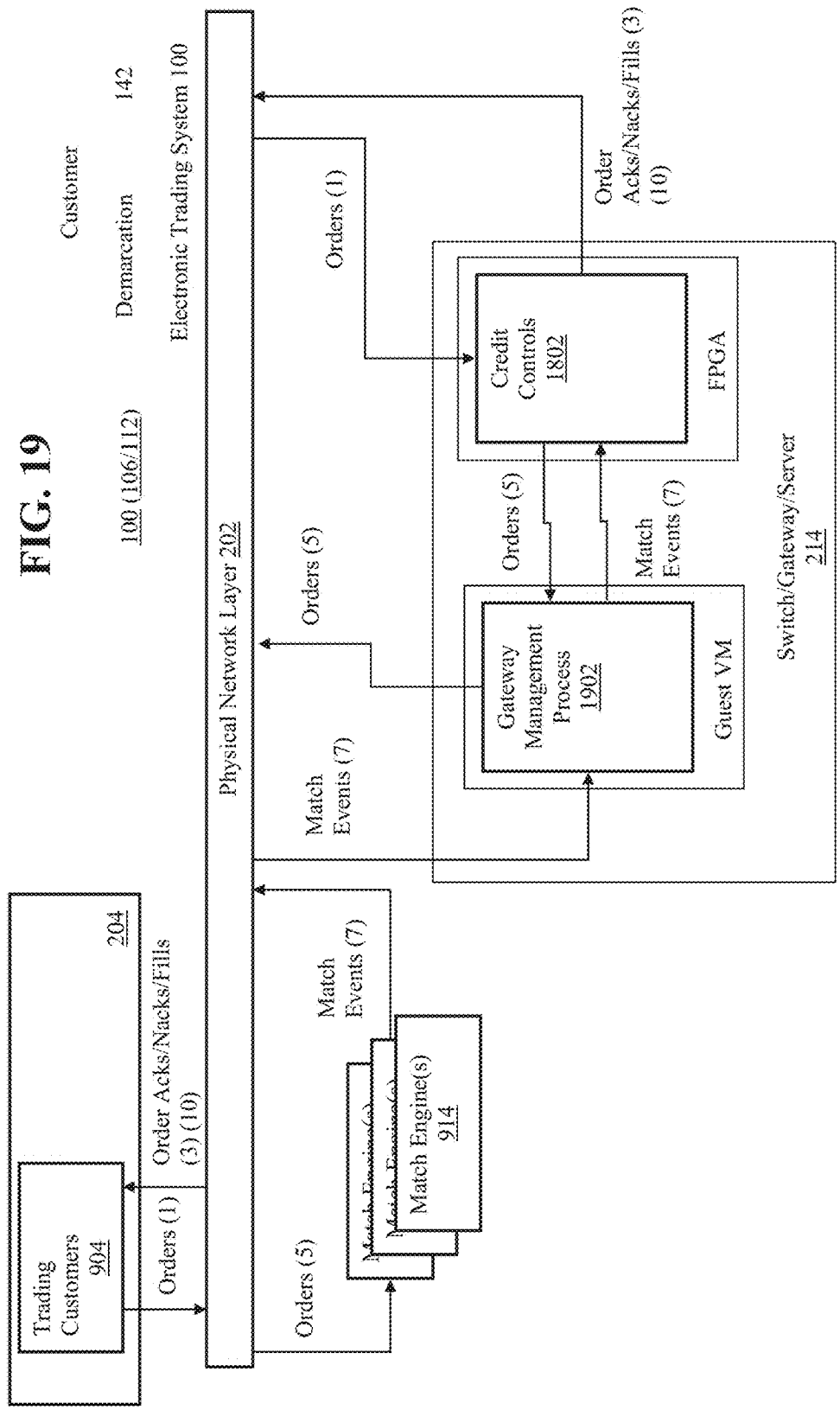
FIG. 19 depicts a block diagram of a system for protecting a market implemented by the system of FIG. 1 according to another embodiment.
Figure 20:
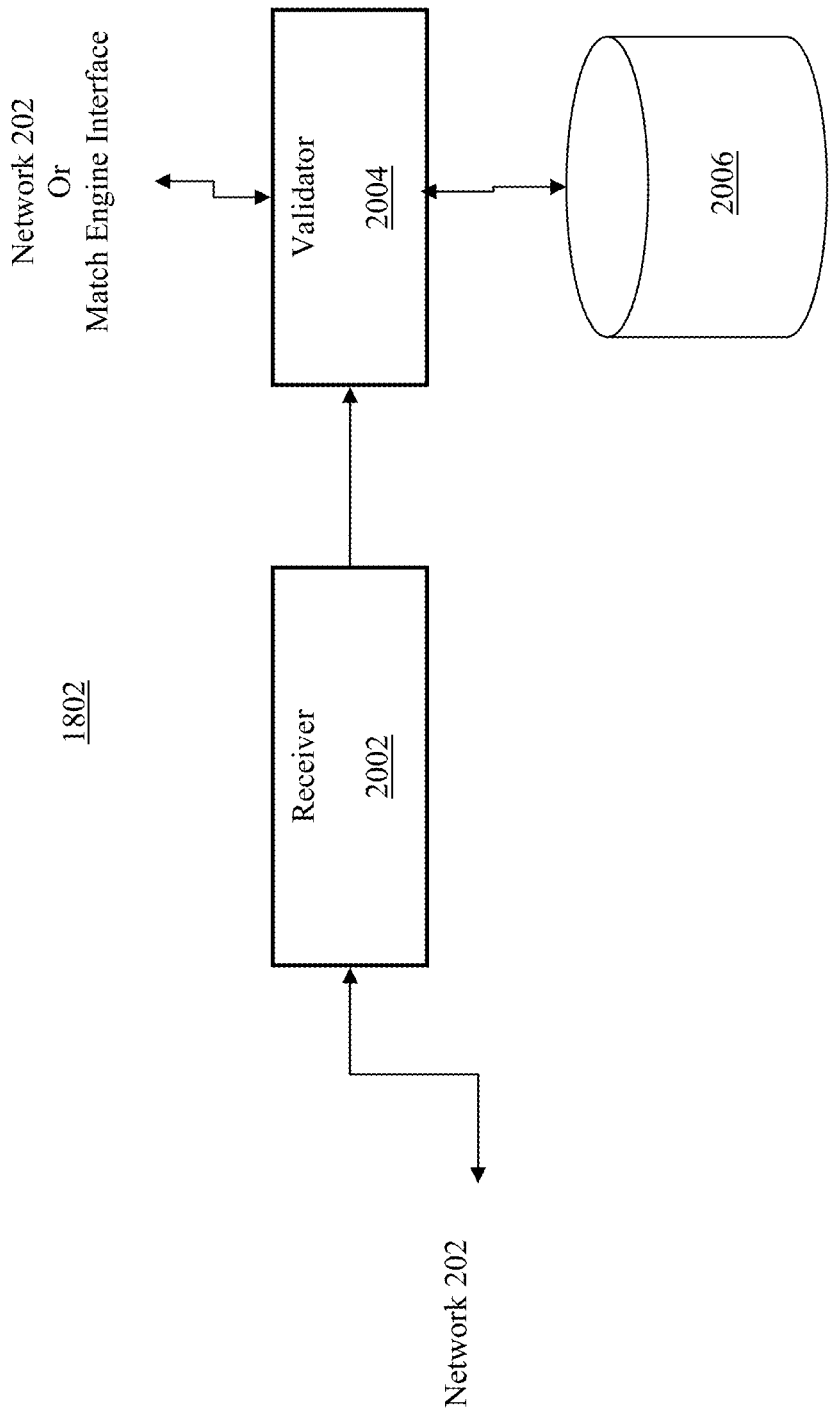
FIG. 20 depicts a more detailed block diagram of a system for protecting a market implemented by the system of FIG. 1 for use with the system of FIGS. 18 and 19 according to one embodiment.

Referring now to FIG. 20 there is shown a block diagram of a system 1802, according to one embodiment, for protecting a market implemented by an electronic trading system 100 comprising a plurality of match engines coupled therewith, which as shown in FIG. 19, may be a conventional match engine 106 which receives orders via an order entry gateway 1902, or, as shown in FIG. 18, may be a redundant match engine set 206 receiving orders via an orderer 210 as described above, or may be a match engine or match function having an alternative architecture. As used herein, a "match engine" 106 refers to either a conventional match engine or a redundant set of match engines as described. Each of the plurality of match engines, i.e. conventional or redundant sets, implement at least one market, or order book representative thereof, for an associated financial instrument, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied. In one embodiment, the system 1802 is implemented as a reconfigurable logic device, e.g. FPGA, and coupled with the match engines. For example, in one implementation, the system 1802 may be coupled with the orderer 210 and/or decider 212 described above and, may further be implemented on the same FPGA device.

As shown in FIGS. 18 and 19, the system 1802 is logically and/or physically located between the transaction ingress point 142 of the electronic trading system 100 and the order entry processing functionality, i.e. the order entry gateway or orderer, so that all transactions flow through and can be evaluated as described. For example, incoming orders validated by the system 1802 are forwarded to the match engine 106 via the orderer or order entry gateway 1902. Match events, described above, reflecting the particulars of the result of the matching process are communicated back from the match engine 106 and through the system 1802 so that such events can be factored into the evaluation of subsequent transactions as will be described. The system 1802 may be coupled with the orderer or order entry gateway 1902 via an interface such as PCIe interface or via the physical network later 202, or via other communications medium or combination thereof.

The system 1802 includes a transaction receiver 2002 coupled with a network 202 and operative to receive an incoming order from an associated market participant 204 of the plurality of market participants 204. The transaction receiver 2002 may be implemented as one or more logic components of an FPGA, such as the same FPGA in which the orderer 210 and decider 212 are implemented as described above, or otherwise coupled therewith, such as via the network device backplane. Alternatively, the transaction receiver 2002 may be implemented as logic, such as computer program logic, stored in a memory and executable by a processor coupled therewith to cause the processor to act as described.

The system 1802 further includes a transaction validator 2004, which may be implemented as one or more logic components of an FPGA, such as the same FPGA in which the orderer 210 and decider 212 are implemented as described above, or otherwise coupled therewith, such as via the network device backplane. Alternatively, the transaction validator 2004 may be implemented as logic, such as computer program logic, stored in a memory and executable by a processor coupled therewith to cause the processor to act as described. The transaction validator 2004 is coupled with the transaction receiver 2002 and the match engine 106 and, prior to forwarding the incoming order to the match engine 106, such as via the orderer or order entry gateway 1902, operative to, based on the incoming order, one or more previously received but unsatisfied orders, e.g. of the associated market participant or other market participants, and/or one or more previously received satisfied orders of the associated market participant or other market participants, for at least one financial instrument wherein one or more of the components thereof remain incomplete, derive a risk of loss, e.g. of the market participant and/or the market, of the incoming order if the incoming order were to be at least partially satisfied by at least one other previously received but unsatisfied, e.g. not matched or partially filled, order and, based thereon, determine whether the incoming order is valid and further to cause the valid incoming order to be forwarded to the match engine 106 and cause the transaction receiver 2002 to at least communicate notification of the invalid incoming order back to the associated market participant 204, an administrator of the trading system 100 or a combination thereof.

In one embodiment, the derived risk of loss may comprises a potential loss in value over a predefined period of time at a predefined confidence level. For example, the potential loss in value may include one of the potential loss in value of the incoming order, of one or more previously received satisfied orders of the associated market participant for at least one financial instrument wherein one or more of the component instrument/transactions thereof remain incomplete, of the market, or a combination thereof.

In one embodiment, the transaction validator 2004 is further operative to derive the risk of loss based on a probability that the incoming order will be satisfied by one or more subsequently received orders. In one embodiment, the derived risk of loss may be independent of, or otherwise different from, the magnitude of a quantity or price of the incoming order. It will be appreciated that the incoming order may cause the derived risk of loss to increase, decrease or remain the same.

In one embodiment, the transaction validator 2004 is operative to determine whether the incoming order is valid by comparing the derived risk of loss to a threshold, wherein the incoming order is determined to be valid when the derived risk of loss does not exceed, or otherwise deviates from, the threshold. For example, the threshold may be a credit limit specified for the particular market participant. In one embodiment, the system 1802 further includes a memory 2006, which may be a memory component of an FPGA or other storage device, and may be a part of the account data function 104 of the electronic trading system 100. The memory 2006 may store the credit limits for one or more of the market participants. As the system 1802 receives match event data resulting from the processing of validated transactions by the match engine 106, the stored credit limits may be updated or otherwise annotated to reflect the impact of the match engine processing, e.g. whether the transaction was matched (fully or partially) or rested, etc., on the particular credit limit for application to the evaluation of subsequent transactions. As was described above, mechanisms may be provided, such as user interface, by which credit limit updates, e.g. to increase or reduce the limit, may be received and applied. In one embodiment, the transaction validator 2004 may be further operative to compare the derived risk of loss to one or more other thresholds, which may also be stored in the memory 2007 and may be greater to or less than the validity threshold, which may be referred to as high or low water marks, wherein an administrator of the trading system is notified, or other action is taken, when the derived risk of loss exceeds, or otherwise deviates from, the other threshold.

In one embodiment, the transaction validator 2004 is further operative to derive the risk of loss further based on one or more other incoming orders received from the same and/or any of the plurality of market participants. The incoming order and the one or more other incoming orders may be representative of a behavioral pattern indicative of risk, e.g. risk increasing or risk decreasing behavior.

In one embodiment, the transaction validator 2004 may be further operative, when the incoming order is determined to be invalid, prevent the order from being forwarded to the match engine 106. Alternatively, or in addition thereto, the transaction validator 2004 may be further operative, when the incoming order is determined to be invalid, cause the incoming order to be only partially satisfied thereby reducing the derived risk of loss. Alternatively, or in addition thereto, the transaction validator 2004 may be further operative, when the incoming order is determined to be invalid, compute an order which, if satisfied, would cause a reduction in the derived risk of loss, and transmit a request for the computed order to the plurality of market participants 204. Alternatively, or in addition thereto, where allowing the order would increase the risk of loss to within a threshold value, the transaction validator 2004 may further compute and advertise, e.g. solicit from the market participants, an order calculated to reduce the derived risk.

Figure 21:
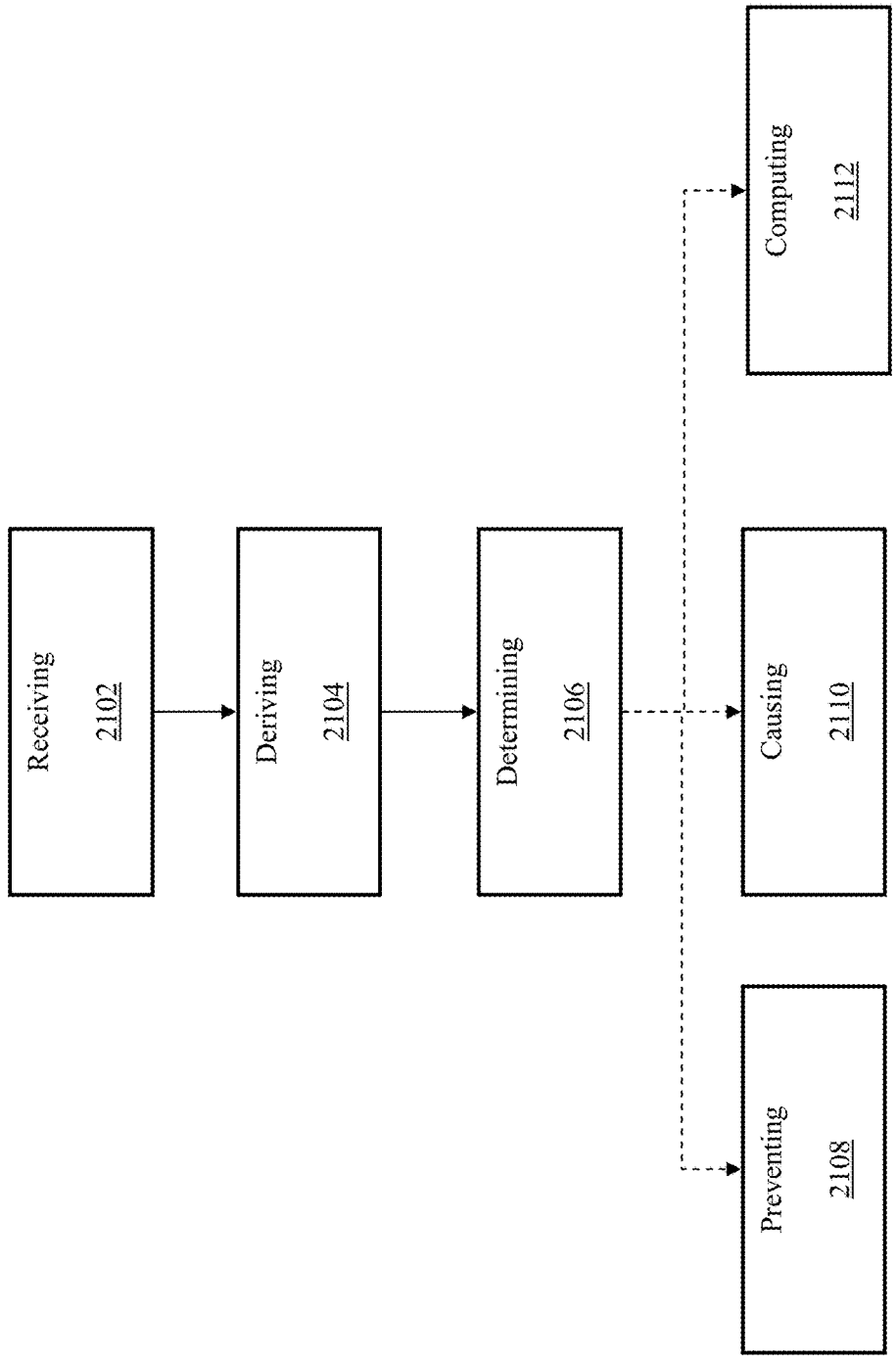
FIG. 21 depicts a flow chart showing operation of the system of FIGS. 18, 19 and 20 according to one embodiment.

FIG. 21 depicts a flow chart 2100 showing operation of the system 1802 of FIG. 20. In particular FIG. 21 shows a method for protecting a market implemented by an electronic trading system 100 comprising a plurality of match engines coupled therewith, which as shown in FIG. 19 may be a conventional match engine 106 which receives orders via an order entry gateway 1902, or, as shown in FIG. 18, may be a redundant match engine set 206 receiving orders via an orderer 210 as described above, or may be a match engine or match function having an alternative architecture. As used herein, a "match engine" 106 refers to either a conventional match engine or a redundant set of match engines as described. Each of the plurality of match engines, i.e. conventional or redundant sets, implement at least one market, or order book representative thereof, for an associated financial instrument, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/ conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied. In one embodiment, the system 1802 is implemented as a reconfigurable logic device, e.g. FPGA, and coupled with the match engines. For example, in one implementation, the system 1802 may be coupled with the orderer 210 and/or decider 212 described above and, may further be implemented on the same FPGA device.

The operation of the system 1802 includes receiving an incoming order from an associated market participant 204 of the plurality of market participants 204 (Block 2102).

The operation of the system 1802 further includes, prior to forwarding the incoming order to the match engine 106, deriving, based on the incoming order, one or more previously received but unsatisfied orders, e.g. of the associated market participant or other market participants, and/or one or more previously received satisfied orders of the associated market participant or other market participants, for at least one financial instrument wherein one or more of the components thereof remain incomplete, a risk of loss, e.g. of the market participant and/or the market, of the incoming order if the incoming order were to be at least partially satisfied by at least one other previously received but unsatisfied, e.g. not matched or partially filled, order and, based thereon, determine whether the incoming order is valid and further to cause the valid incoming order to be forwarded to the match engine 106 and cause the transaction receiver 2002 to at least communicate notification of the invalid incoming order back to the associated market participant 204, an administrator of the trading system 100 or a combination thereof (Block 2104).

In one embodiment, the derived risk of loss may comprises a potential loss in value over a predefined period of time at a predefined confidence level. For example, the potential loss in value may include one of the potential loss in value of the incoming order, of one or more previously received satisfied orders of the associated market participant for at least one financial instrument wherein one or more of the component instrument/transactions thereof remain incomplete, of the market, or a combination thereof.

In one embodiment, the risk of loss may be derived based on a probability that the incoming order will be satisfied by one or more subsequently received orders. In one embodiment, the derived risk of loss may be independent of, or otherwise different from, the magnitude of a quantity or price of the incoming order. It will be appreciated that the incoming order may cause the derived risk of loss to increase, decrease or remain the same.

In one embodiment, the operation of the system 1802 further includes determining whether the incoming order is valid by comparing the derived risk of loss to a threshold, wherein the incoming order is determined to be valid when the derived risk of loss does not exceed, or otherwise deviates from, the threshold (Block 2106). For example, the threshold may be a credit limit specified for the particular market participant. In one embodiment, the operation of the system 1802 may further include storing credit limits for one or more of the market participants, such as in a memory 2006, which may be a memory component of an FPGA or other storage device, and may be a part of the account data function 104 of the electronic trading system 100. As was described above, mechanisms may be provided, such as user interface, by which credit limit updates, e.g. to increase or reduce the limit, may be received and applied. In one embodiment, the operation of the system 1802 may further include comparing the derived risk of loss to one or more other thresholds, which may also be stored in the memory 2007 and may be greater to or less than the validity threshold, which may be referred to as high or low water marks, wherein an administrator of the trading system is notified, or other action is taken, when the derived risk of loss exceeds, or otherwise deviates from, the other threshold.

In one embodiment, the risk of loss may be derived further based on one or more other incoming orders received from the same and/or any of the plurality of market participants. The incoming order and the one or more other incoming orders may be representative of a behavioral pattern indicative of risk, e.g. risk increasing or risk decreasing behavior.

In one embodiment, the operation of the system 1802 may further include, when the incoming order is determined to be invalid, preventing the order from being forwarded to the match engine 106 (Block 2108). Alternatively, or in addition thereto, the operation of the system 1802 may further include, when the incoming order is determined to be invalid, causing the incoming order to be only partially satisfied thereby reducing the derived risk of loss (Block 2110). Alternatively, or in addition thereto, the operation of the system 1802 may further include, when the incoming order is determined to be invalid, computing an order which, if satisfied, would cause a reduction in the derived risk of loss, and transmit a request for the computed order to the plurality of market participants 204 (Block 2112). Alternatively, or in addition thereto, where allowing the order would increase the risk of loss to within a threshold value, the operation of the system 1802 may further include computing and advertising, e.g. soliciting from the market participants, an order calculated to reduce the derived risk.

H. Unattached Order Books

As was described above, in one embodiment of the disclosed electronic trading system architecture, multiple generic match engines 106, or redundant match engine sets 206/208, as described above, are provided which are capable of processing a transaction for any of the markets provided by the electronic trading system. All of the order books may be maintained in a centrally accessible memory architecture. As incoming orders are received, they may be allocated or otherwise disseminated to one of the generic match engines (or match engine sets). To determine which match engine (or set) to send the transaction for processing, the system may determine the outright and all related order books to the given transaction. If the identified order books have not yet been allocated to a match engine (or set thereof), an available match engine (or set) is selected, the identified order books, and in one embodiment the match policy/algorithm to be applied, are allocated and the incoming transaction is routed thereto. If the identified order books are already allocated to one of the match engines (or sets), the incoming order is routed to that match engine (or set). During transaction processing, the match engine (or set) accesses and updates the order books as needed to perform the matching and implication functions as described. When the match engine (or set) has completed processing of all transactions, before another transaction is routed thereto, it relinquishes its allocation of the identified order books, and is then available for a new transaction for a new set of identified order books.

This enables, for example, computation of implied matches and/or opportunities via access to all of the interdependent order books necessary so as to be able to identify suitable markets and actual or hypothetical resting orders therein which permit a given transaction to be completed. The central storage an allocation of order books, effectively on demand, to any of a set of generic match engines overcomes the limited data storage capacity and/or bandwidth of existing match engines, improving liquidity and the variety of product offerings, as well as transaction throughput and fault tolerance.

In one embodiment, the allocation of identified order books may further include allocation of a defined matching policy/algorithm to be applied by the match engine (or set). This allows different matching algorithms to be used by each match engine.

As will be described, allocation of the identified order books may be implemented by actually transferring the data representative thereof to a memory associated with the selected match engine and then transferring the updated order books back to the central memory upon deallocation. Alternatively, access to the central memory and, further, to the identified order books, may be allocated such as by providing the memory address locations of identified order books in the central memory to the selected match engine (or set), such as via provision of a sparse matrix or other data structure which comprises the identification of the requisite memory locations. Updates to the order books in the central memory may then be accomplished via remote direct memory access ("RDMA") or other back channel network based memory access. It will be appreciated other storage resource sharing mechanisms may be utilized, such as non-uniform memory architecture (NUMA) compliant mechanisms, structured or unstructured databases, such as tag clouds, etc.

The disclosed embodiment, thereby, provide for fungible generic match engines which can handle independent/unrelated markets in parallel. In one embodiment, the number of generic match engines (or sets thereof) may be set so as to statistically minimize transaction latency among transactions to independent/unrelated markets. Order books may be only tied to a given match engine (or set) for the duration of the order processing of transactions therein. By altering the degree of interdependencies computed to identify related order books, parallelism among transaction processing and/or liquidity/trading opportunities can be balanced.

Figure 22:
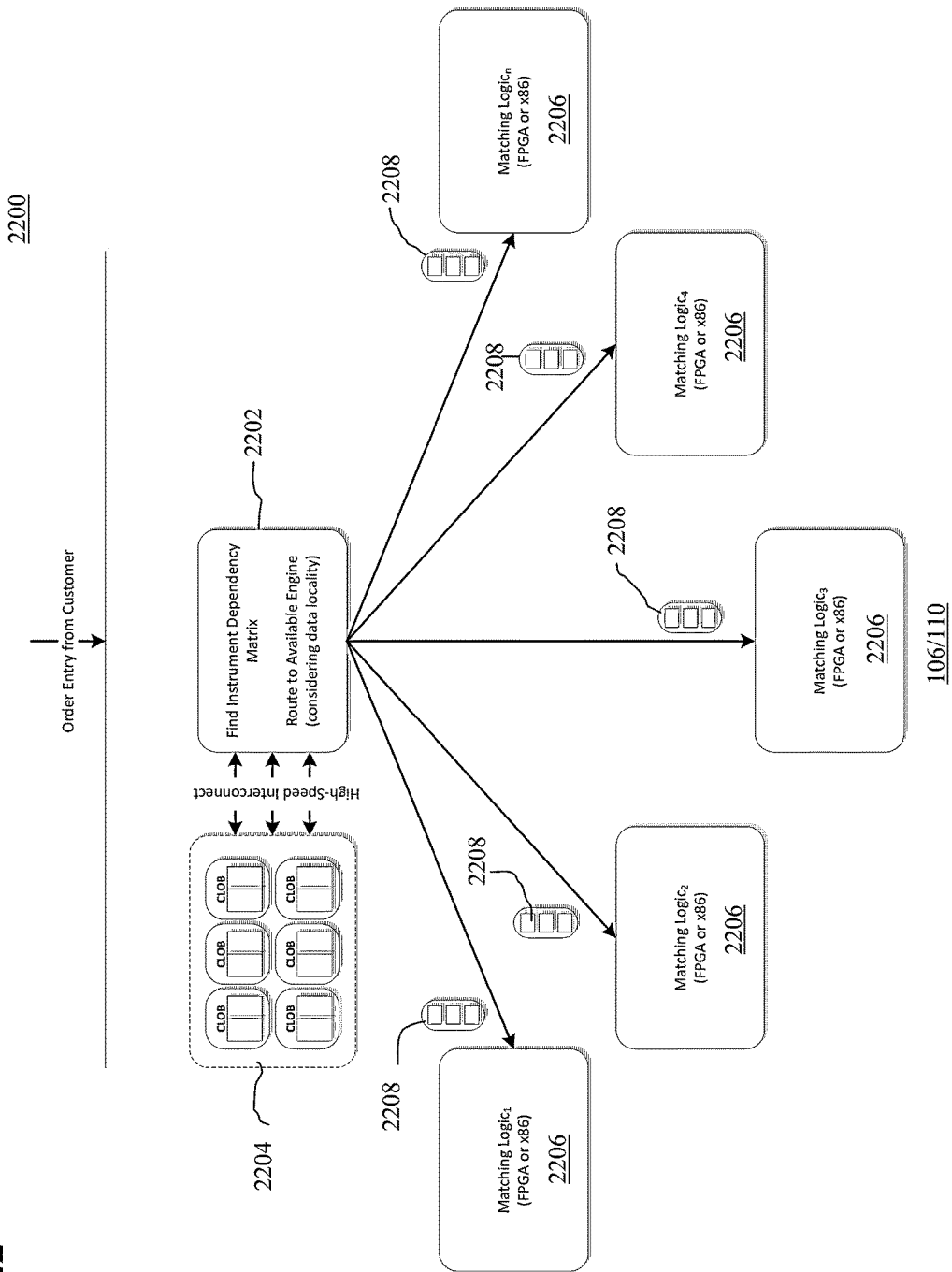
FIG. 22 depicts a block diagram of a system for improving the efficiency of an electronic trading system as shown in FIG. 1 according to one embodiment.

Referring now to FIG. 22 there is shown a block diagram of a system 2200, which may also be referred to as an architecture, according to one embodiment, for improving efficiency of an electronic trading system 100 for a plurality of financial instruments, each of the plurality of financial instruments, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/instruments thereof, as was described above. As described above, the electronic trading system 100 may include a plurality of generic match engines 2206 coupled therewith, each of which may be a conventional match engine 106 which receives orders via an order entry gateway (not shown), or, as described above, may be a redundant match engine set 206 receiving orders via an orderer 210 as described above, or may be a match engine or match function having an alternative architecture. As used herein, a "match engine" 106 refers to either a conventional match engine or a redundant set of match engines as described. As will be described, each of the plurality of match engines, i.e. conventional or redundant sets, implements at least one market, or order book representative thereof, for an associated financial instrument, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied.

Figure 23:
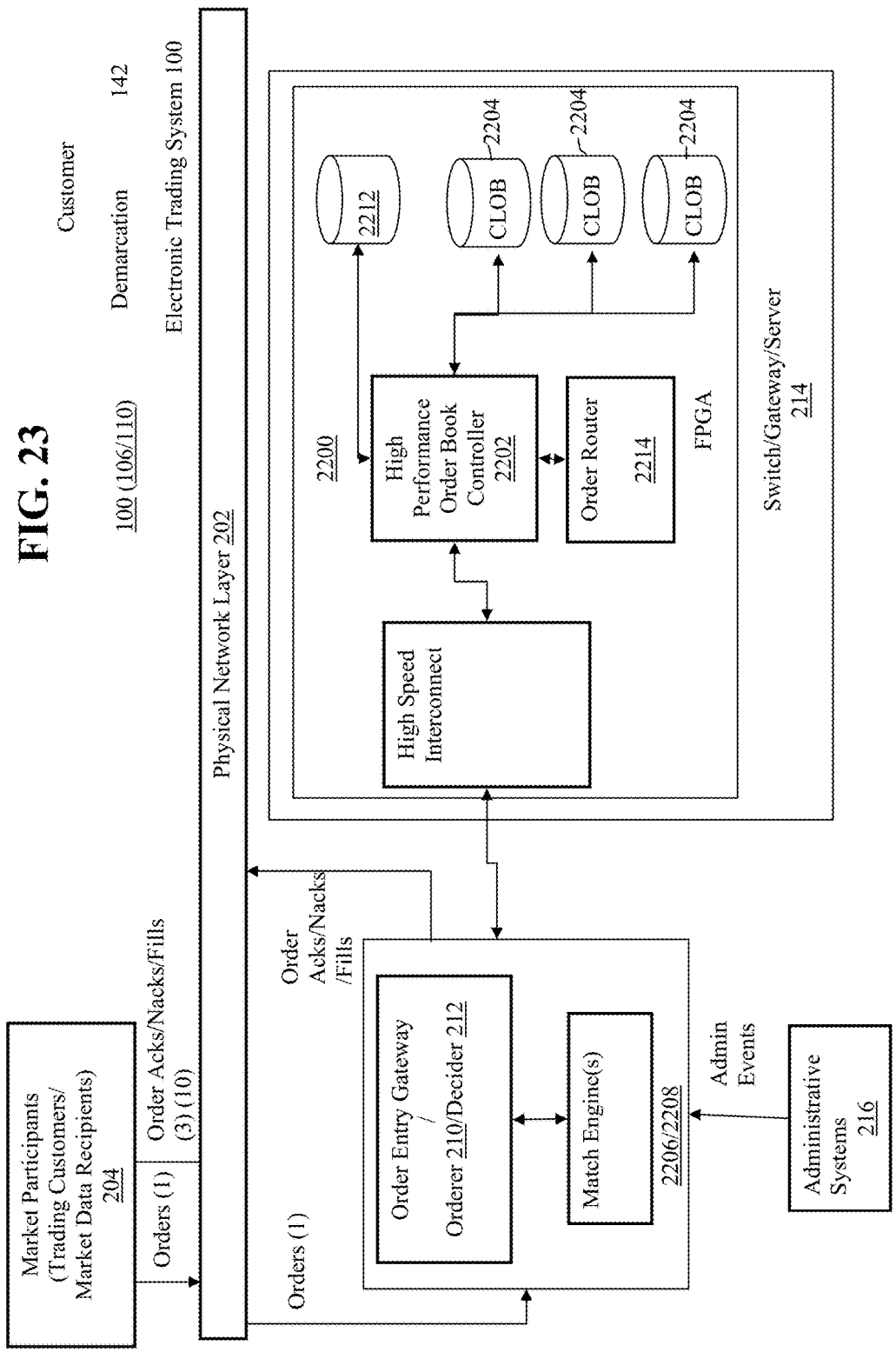
FIG. 23 depicts a more detailed block diagram of a system for improving the efficiency of an electronic trading system as shown in FIG. 1 according to one embodiment.

As shown in FIG. 23, in one embodiment, the system 2200 is implemented as a reconfigurable logic device, e.g. FPGA, and coupled with the match engines 2206. For example, in one implementation, the system 2200 may be coupled with the orderer 210 and/or decider 212 described above and, may further be implemented on the same FPGA device. In one embodiment, the system 2200 is implemented as part of the matching function 106 of the electronic trading system 100. It will be appreciated that the system 2200 may be implemented as part of other functions of the electronic trading system 100, or otherwise coupled with the communications infrastructure 202, which as described above, interconnects the various components of the electronic trading system 100. In one embodiment, the system 2202 is implemented as a reconfigurable logic device, e.g. FPGA, coupled with the orderer 210 and/or decider 212 described above and, in one implementation, is implemented on the same FPGA device.

The system 2200 includes a memory 2204, e.g. an order book memory, operative to store data representative of a set of previously received but unsatisfied orders, e.g. which may be grouped into order books, such as by product for which the order is for, each order being for a transaction, which may specify side (buy/sell), price and/or quantity, for at least one of the plurality of financial instruments. The memory 2204 may be implemented as a memory component of a reconfigurable logic device, e.g. an FPGA, as described above, or alternatively implemented using another type of memory or storage device, such as the memory 2504 or storage device 2506 described below with respect to FIG. 25.

The system 2200, as described above, further includes, or is otherwise coupled with, a plurality of match engines 2206 coupled with the memory 2204, each of the plurality of match engines may be generic, fungible or otherwise non-order/non-match-algorithm specific, and further operative to implement, as described above, at least one market, e.g. order book, for an associated a financial instrument, such as a futures or options contract, or other single contract or strategy/combination of contracts, of the plurality of financial instruments. Each match engine 2206 being further operative to attempt to match, e.g. according to a match algorithm/policy, an incoming order provided or otherwise routed or directed thereto for a transaction, which may have been received from a market participant 204 or other source, which as described above may specify side (buy/sell), price and/or quantity, for the associated financial instrument with at least one other of the set of previously received but unsatisfied, e.g. unmatched or only partially filled, orders, the at least one other previously received but unsatisfied order being for a transaction counter thereto for a financial instrument of the plurality of financial instruments having at least one component in common with the financial instrument of the incoming order, to at least partially satisfy, e.g. fill, one or both of the incoming order or the at least one other previously received order. Each match engine 2206 is then further operative to update or otherwise, e.g. to add the incoming order and/or update the stored counter order, the stored data, e.g. the order book, in the memory 2204, as will be described, representative of the set of previously received but unsatisfied orders based thereon.

In one embodiment, the set of previously received but unsatisfied orders further may further include, or otherwise may be subdivided into one more financial instrument subsets, each financial instrument subset, e.g. order book, comprising those previously received orders of the set which are for a transaction for the same financial instrument of the plurality of financial instruments, wherein the order book allocator 2202 is further operative to determine the subset of the set of previously received but unsatisfied orders by identifying those financial instrument subsets associated with financial instruments having at least one component thereof, e.g. are interdependent, in common with each other and the financial instrument of the incoming order. In this way all interdependent order books may be allocated to the particular selected match engine 2206 which, as will be described above and further below, may facilitate implication. For example, in one embodiment, each of the plurality of match engines 2206 may be further operative to attempt to identify an implied match for the incoming order among the orders of the allocated subset for financial instruments, described below, which are not identical to the financial instrument of the incoming order.

In one embodiment, each of the plurality of match engines 2206 may be operative to update the stored data in the memory 2204 using a back channel protocol. Alternatively, each of the plurality of match engines 2206 may be operative to update the stored data in the memory 2204 using a remote direct memory access ("RDMA") protocol.

In one embodiment, the plurality of match engines 2206 includes sufficient match engines 2206 such that a match engine 2206 is always available to have routed thereto an incoming order associated with an unallocated subset of the set of previously received but unsatisfied orders.

The system 2200 further includes an order book allocator 2202, which may also be referred to as an order router and/or balancer and which may be implemented as one or more logic components of an FPGA, such as the same FPGA in which the orderer 210 and decider 212 are implemented as described above, or otherwise coupled therewith, such as via the network device backplane. Alternatively, the order book allocator 2202 may be implemented as logic, such as computer program logic, stored in a memory and executable by a processor coupled therewith to cause the processor to act as described. The order book allocator 2202 is coupled with the memory 2204 and the plurality of match engines 2206 and operative to, upon receipt of an incoming order from a market participant 204 for a transaction for a financial instrument, determine a subset of the set of previously received but unsatisfied orders each having at least one component of the associated financial instrument in common with the financial instrument of the incoming order, and determine if access to the subset has been previously allocated, e.g. accorded, provided or otherwise granted, to one of the plurality of match engines 2206, which may imply that the incoming order is related to a prior order which is still undergoing the match process, and, where access to the subset has been previously allocated to one of the plurality of match engines 2206, route, or otherwise provide, the incoming order thereto for a match attempt thereby, and wherein access to the subset has not been allocated to one of the match engines 2206, select one of the plurality of match engines 2206, allocate access to the subset to the selected match engine 2206 and route the incoming order to the selected match engine 2206 for a match attempt thereby. In one embodiment, the allocation of the subset may include transferring at least a copy of the subset to a memory 2208, e.g. a cache or other local memory, associated with the selected match engine 2206.

In one embodiment, the order book allocator 2202 is operative to facilitate access to the subset by providing the data representative thereof to the particular match engine 2206 for use thereby and retrieving the data representative of the subset from the match engine 2206 subsequent to the updating thereby.

In one embodiment, the order book allocator 2202 is further operative to deallocate access to the subset when the selected match engine 2206 has completed the attempt to match all incoming orders routed thereto prior to another incoming order being routed thereto.

In one embodiment, the order book allocator 2202 may further maintain a data structure or database 2212, which may be a sparse matrix or array, which stores data representative of which financial instruments of the plurality of financial instruments have at least one component thereof in common with another of the financial instruments of the plurality of financial instruments, which financial instruments, and thereby which order books, are interdependent. This data structure 2212 may further store the locations in the memory 2204 in which each of the set of previously received but unsatisfied orders is stored, which as described above, may be subdivided, logically and/or physically, by order book.

In one embodiment, the order book allocator 2202 is operative to select one of the plurality of match engines 2206 based on an availability thereof, e.g. based on a selection algorithm, such as round robin, least recently used, load balancing, etc.

In one embodiment, the allocation of access to the subset further comprises provision of a match algorithm or policy associated with the subset for the selected match engine 2206 to use when an incoming order may be matched with more than one previously received but unsatisfied order. This allows different order books to utilize different match algorithms/policies independent of the match engine 226 to which they are allocated. The match algorithm may be a pro-rata algorithm, a first in first out ("FIFO") algorithm, a Price Explicit Time algorithm, an Order Level Pro Rata algorithm, an Order Level Priority Pro Rata algorithm, a Preference Price Explicit Time algorithm, a Preference Order Level Pro Rata algorithm, a Preference Order Level Priority Pro Rata algorithm, a Threshold Pro-Rata algorithm, a Priority Threshold Pro-Rata algorithm, a Preference Threshold Pro-Rata algorithm, a Priority Preference Threshold Pro-Rata algorithm, a Split Price-Time Pro-Rata algorithm, or combinations thereof.

In one embodiment, the memory 2204 further comprises a plurality of memory portions 2208, e.g. cache or local memories, as described above, each associated with one of the plurality of match engines 2206 and capable of storing at least the data representative of the subset of the set of previously received but unsatisfied orders. The order book allocator 2202 may then be further operative to detect, e.g. via snooping or snarling, an update to the stored data in one of the plurality of memory portions 2208 by the match engine 2206 associated therewith and cause the update to be available to the others of the plurality of match engines 2206, e.g. write back.

In one embodiment, the system 2200 further includes an implicator (not shown), such as the implicator 1102 as was described above, coupled with the memory 2204, the plurality of match engines 2206 and the order book allocator 2202, and operative to, as described above, when a match engine 2206 is unable to match the incoming order with at least one previously received but unsatisfied order for a counter transaction for the particular financial instrument of the incoming order, identify at least one previously received but unsatisfied order for a counter transaction for a financial instrument having at least one component in common with the particular financial instrument of the incoming order, and generate a synthetic, e.g. implied, order therefore and submit the synthetic order to the electronic trading system 100 or otherwise directly to the associated match engine 2206.

In one embodiment, the system 2200 further includes an order router 2214 coupled with the plurality of match engines 2206 and the order book allocator 2202 and operative to route an incoming order to one of the plurality of match engines 2206 based on available processing capacity of each of the plurality of match engines 2206, e.g. subject to a load balancing algorithm or other allocation algorithm, the one of the plurality of match engines 2206 being the same engine to which a prior incoming order for a transaction for the same financial instrument as the incoming order was routed, or a combination thereof.

Figure 24:
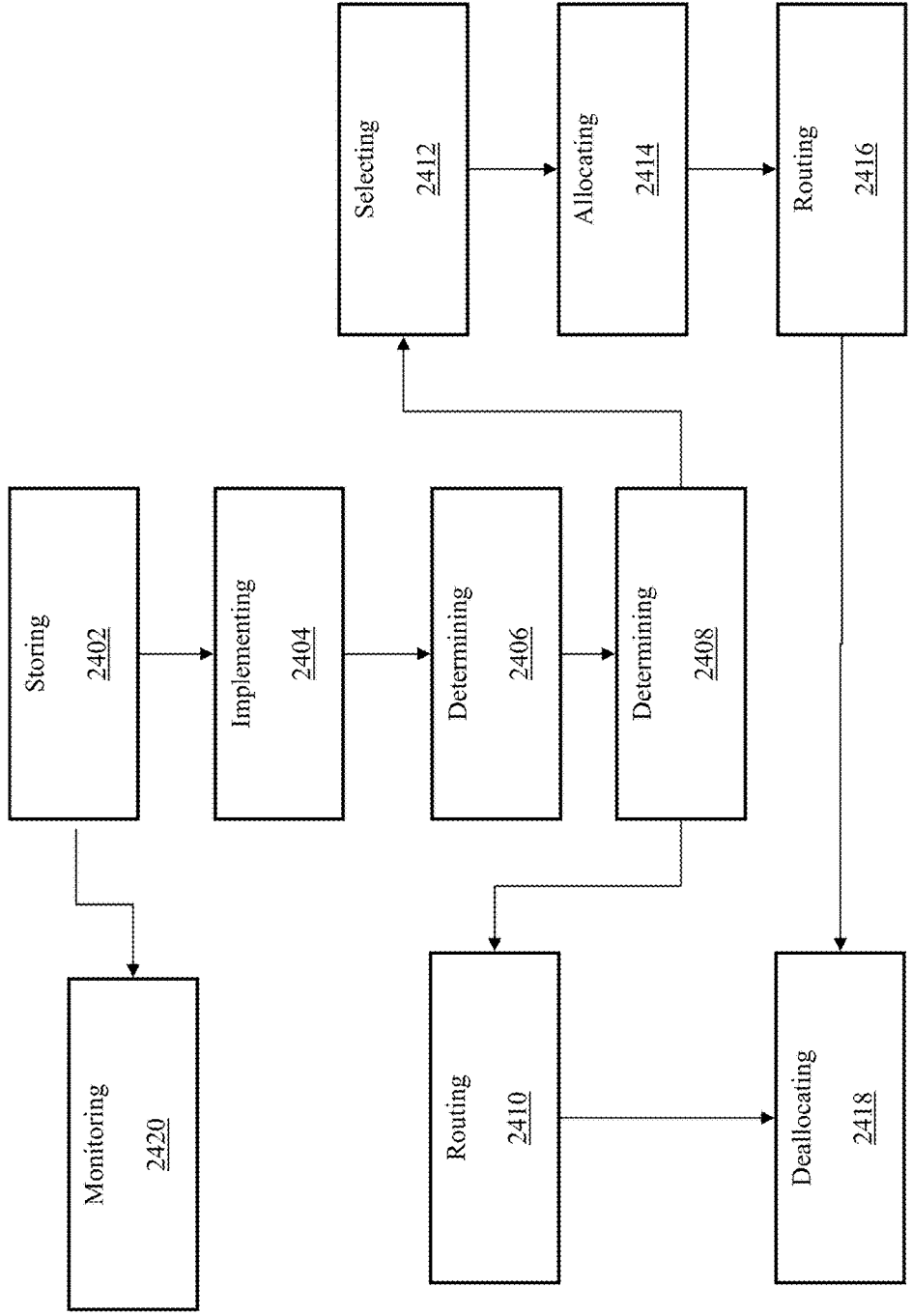
FIG. 24 depicts a flow chart showing operation of the system of FIGS. 22 and 23 according to one embodiment

FIG. 24 depicts a flow chart 2400 showing operation of the system 2200 of FIGS. 22 and 23. In particular FIG. 24 shows a computer implemented method for improving efficiency of an electronic trading system 100 for a plurality of financial instruments, each of the plurality of financial instruments, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/instruments thereof, as was described above. As described above, the electronic trading system 100 may include a plurality of generic match engines 2206 coupled therewith, each of which may be a conventional match engine 106 which receives orders via an order entry gateway (not shown), or, as described above, may be a redundant match engine set 206 receiving orders via an orderer 210 as described above, or may be a match engine or match function having an alternative architecture. As used herein, a "match engine" 106 refers to either a conventional match engine or a redundant set of match engines as described. As will be described, each of the plurality of match engines, i.e. conventional or redundant sets, implements at least one market, or order book representative thereof, for an associated financial instrument, e.g. futures, options contracts, a single contract therefore or a strategy/combination of contracts, such as a spread, wherein each associated financial instrument comprises at lease one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied.

The operation of the system 2200 includes storing, such as in a memory 2204, e.g. an order book memory, data representative of a set of previously received but unsatisfied orders, e.g. which may be grouped into order books, such as by product for which the order is for, each order being for a transaction, which may specify side (buy/sell), price and/or quantity, for at least one of the plurality of financial instruments (Block 2402).

The operation of the system 2200, as described above, further includes implementing a plurality of match engines 2206, each of the plurality of match engines may be generic, fungible or otherwise non-order/non-match-algorithm specific, and further operative to implement, as described above, at least one market, e.g. order book, for an associated a financial instrument, such as a futures or options contract, or other single contract or strategy/combination of contracts, of the plurality of financial instruments (Block 2404). Each match engine 2206 being further operative to attempt to match, e.g. according to a match algorithm/policy, an incoming order provided or otherwise routed or directed thereto for a transaction, which may have been received from a market participant 204 or other source, which as described above may specify side (buy/sell), price and/or quantity, for the associated financial instrument with at least one other of the set of previously received but unsatisfied, e.g. unmatched or only partially filled, orders, the at least one other previously received but unsatisfied order being for a transaction counter thereto for a financial instrument of the plurality of financial instruments having at least one component in common with the financial instrument of the incoming order, to at least partially satisfy, e.g. fill, one or both of the incoming order or the at least one other previously received order. Each match engine 2206 is then further operative to update or otherwise, e.g. to add the incoming order and/or update the stored counter order, the stored data, e.g. the order book, in the memory 2204, as will be described, representative of the set of previously received but unsatisfied orders based thereon.

In one embodiment, the set of previously received but unsatisfied orders further may further include, or otherwise may be subdivided into one more financial instrument subsets, each financial instrument subset, e.g. order book, comprising those previously received orders of the set which are for a transaction for the same financial instrument of the plurality of financial instruments, wherein the order book allocator 2202 is further operative to determine the subset of the set of previously received but unsatisfied orders by identifying those financial instrument subsets associated with financial instruments having at least one component thereof, e.g. are interdependent, in common with each other and the financial instrument of the incoming order. In this way all interdependent order books may be allocated to the particular selected match engine 2206 which, as will be described above and further below, may facilitate implication. For example, in one embodiment, each of the plurality of match engines 2206 may be further operative to attempt to identify an implied match for the incoming order among the orders of the allocated subset for financial instruments, described below, which are not identical to the financial instrument of the incoming order.

In one embodiment, each of the plurality of match engines 2206 may be operative to update the stored data in the memory 2204 using a back channel protocol. Alternatively, each of the plurality of match engines 2206 may be operative to update the stored data in the memory 2204 using a remote direct memory access ("RDMA") protocol.

In one embodiment, the plurality of match engines 2206 includes sufficient match engines 2206 such that a match engine 2206 is always available to have routed thereto an incoming order associated with an unallocated subset of the set of previously received but unsatisfied orders.

The operation of the system 2200 further includes determining a subset of the set of previously received but unsatisfied orders each having at least one component of the associated financial instrument in common with the financial instrument of the incoming order (Block 2406), and determining if access to the subset has been previously allocated, e.g. accorded, provided or otherwise granted, to one of the plurality of match engines 2206 (Block 2408), which may imply that the incoming order is related to a prior order which is still undergoing the match process, and, where access to the subset has been previously allocated to one of the plurality of match engines 2206, routing, or otherwise providing, the incoming order thereto for a match attempt thereby (Block 2410), and wherein access to the subset has not been allocated to one of the match engines 2206, selecting one of the plurality of match engines 2206 (Block 2412), allocating access to the subset to the selected match engine 2206 (Block 2414) and routing the incoming order to the selected match engine 2206 for a match attempt thereby (Block 2416). In one embodiment, the allocation of the subset may include transferring at least a copy of the subset to a memory 2208, e.g. a cache or other local memory, associated with the selected match engine 2206.

In one embodiment, facilitation of access to the subset may be implemented by providing the data representative thereof to the particular match engine 2206 for use thereby and retrieving the data representative of the subset from the match engine 2206 subsequent to the updating thereby.

In one embodiment, the operation of the system 2200 further includes deallocating access to the subset when the selected match engine 2206 has completed the attempt to match all incoming orders routed thereto prior to another incoming order being routed thereto (Block 2418).

In one embodiment, the operation of the system 2200 may further include maintaining a data structure or database 2212, which may be a sparse matrix or array, which stores data representative of which financial instruments of the plurality of financial instruments have at least one component thereof in common with another of the financial instruments of the plurality of financial instruments, which financial instruments, and thereby which order books, are interdependent (Block 2420). This data structure 2212 may further store the locations in the memory 2204 in which each of the set of previously received but unsatisfied orders is stored, which as described above, may be subdivided, logically and/or physically, by order book.

In one embodiment, the selection of one of the plurality of match engines 2206 may be based on an availability thereof, e.g. based on a selection algorithm, such as round robin, least recently used, load balancing, etc.

In one embodiment, the allocation of access to the subset further comprises provision of a match algorithm or policy associated with the subset for the selected match engine 2206 to use when an incoming order may be matched with more than one previously received but unsatisfied order. This allows different order books to utilize different match algorithms/policies independent of the match engine 226 to which they are allocated. The match algorithm may be a pro-rata algorithm, a first in first out ("FIFO") algorithm, a Price Explicit Time algorithm, an Order Level Pro Rata algorithm, an Order Level Priority Pro Rata algorithm, a Preference Price Explicit Time algorithm, a Preference Order Level Pro Rata algorithm, a Preference Order Level Priority Pro Rata algorithm, a Threshold Pro-Rata algorithm, a Priority Threshold Pro-Rata algorithm, a Preference Threshold Pro-Rata algorithm, a Priority Preference Threshold Pro-Rata algorithm, a Split Price-Time Pro-Rata algorithm, or combinations thereof.

One skilled in the art will appreciate that one or more functions/modules described herein may be implemented using, among other things, a logic component such as a reconfigurable logic component, e.g. an FPGA, which may include a logical processing portion coupled with a memory portion, or as a tangible computer-readable medium comprising computer-executable instructions (e.g., executable software code) executable by a processor coupled therewith to implement the function(s). Alternatively, functions/modules may be implemented as software code, firmware code, hardware, and/or a combination of the aforementioned. For example the functions/modules may be embodied as part of an electronic trading system 100 for financial instruments.

Figure 25:
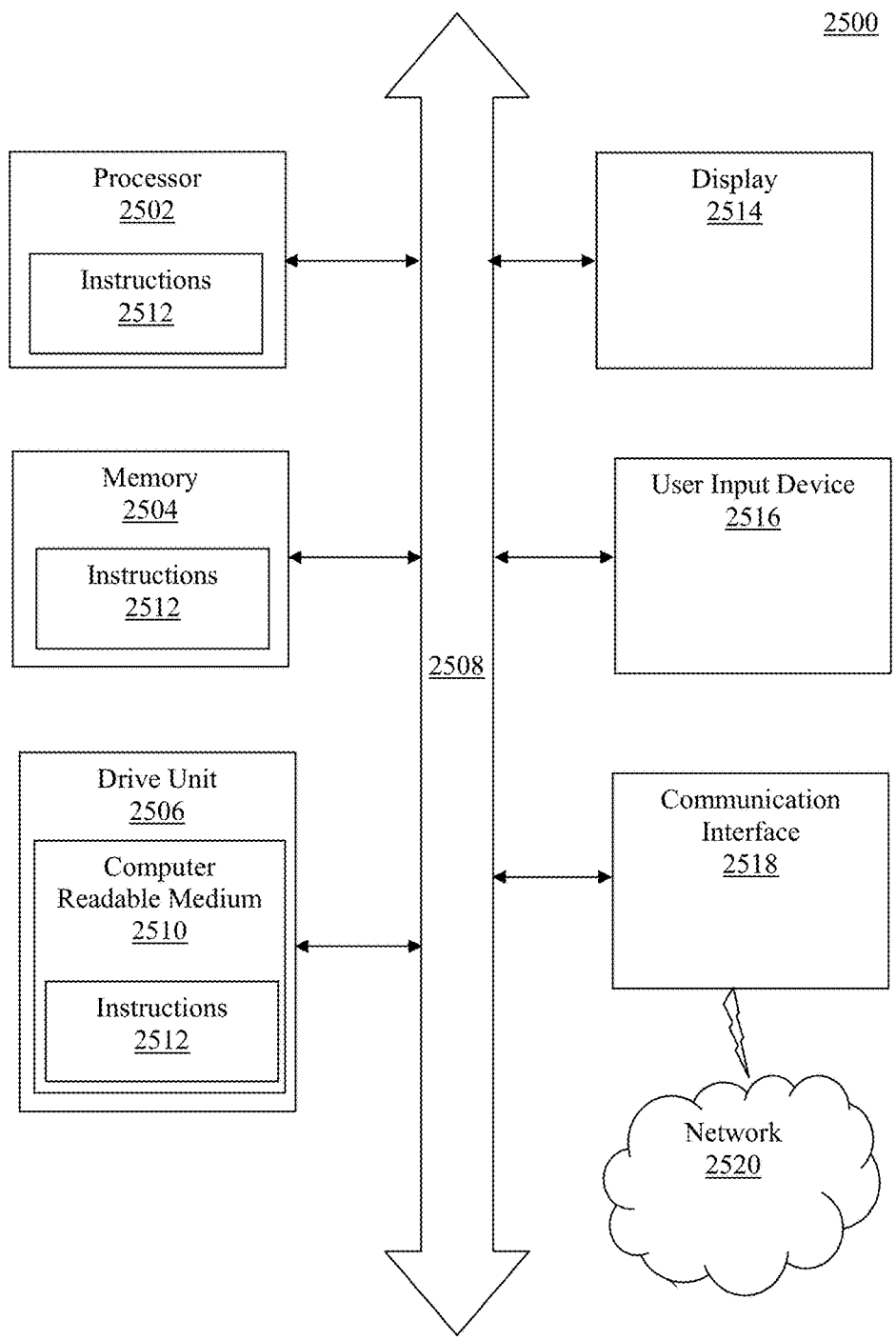
FIG. 25 shows an illustrative embodiment of a general computer system for use with the system of FIGS. 1-24.

Referring to FIG. 25, an illustrative embodiment of a general computer system 2500 is shown. The computer system 2500 can include a set of instructions that can be executed to cause the computer system 2500 to perform any one or more of the methods or computer based functions disclosed herein. The computer system 2500 may operate as a standalone device or may be connected, e.g., using a network, to other computer systems or peripheral devices. Any of the components of the electronic trading system 100 discussed above may be a computer system 2500 or a component in the computer system 2500. The computer system 2500 may implement a match engine, margin processing, payment or clearing function on behalf of an exchange, such as the Chicago Mercantile Exchange, of which the disclosed embodiments are a component thereof.

In a networked deployment, the computer system 2500 may operate in the capacity of a server or as a client user computer in a client-server user network environment, as a peer computer system in a peer-to-peer (or distributed) network environment, or as a network device such as a switch, gateway or router. The computer system 2500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 2500 can be implemented using electronic devices that provide voice, video or data communication. Further, while a single computer system 2500 is illustrated, the term "system" shall also be taken to include any collection of systems or sub-systems that individually or jointly execute a set, or multiple sets, of instructions to perform one or more computer functions.

As illustrated in FIG. 25, the computer system 2500 may include a processor 2502, e.g., a central processing unit (CPU), a graphics processing unit (GPU), or both. The processor 2502 may be a component in a variety of systems. For example, the processor 2502 may be part of a standard personal computer or a workstation. The processor 2502 may be one or more general processors, digital signal processors, application specific integrated circuits, field programmable gate arrays, servers, networks, digital circuits, analog circuits, combinations thereof, or other now known or later developed devices for analyzing and processing data. The processor 2502 may implement a software program, such as code generated manually (i.e., programmed).

The computer system 2500 may include a memory 2504 that can communicate via a bus 2508. The memory 2504 may be a main memory, a static memory, or a dynamic memory. The memory 2504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 2504 may be a memory component of a reconfigurable logic device, e.g. an FPGA. In one embodiment, the memory 2504 includes a cache or random access memory for the processor 2502. In alternative embodiments, the memory 2504 is separate from the processor 2502, such as a cache memory of a processor, the system memory, or other memory. The memory 2504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 2504 is operable to store instructions executable by the processor 2502. The functions, acts or tasks illustrated in the figures or described herein may be performed by the programmed processor 2502 executing the instructions 2512 stored in the memory 2504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 2500 may further include a display unit 2514, such as a liquid crystal display (LCD), an organic light emitting diode (OLED), a flat panel display, a solid state display, a cathode ray tube (CRT), a projector, a printer or other now known or later developed display device for outputting determined information. The display 2514 may act as an interface for the user to see the functioning of the processor 2502, or specifically as an interface with the software stored in the memory 2504 or in the drive unit 2506.

Additionally, the computer system 2500 may include an input device 2516 configured to allow a user to interact with any of the components of system 2500. The input device 2516 may be a number pad, a keyboard, or a cursor control device, such as a mouse, or a joystick, touch screen display, remote control or any other device operative to interact with the system 2500.

In a particular embodiment, as depicted in FIG. 25, the computer system 2500 may also include a disk or optical drive unit 2506. The disk drive unit 2506 may include a computer-readable medium 2510 in which one or more sets of instructions 2512, e.g. software, can be embedded. Further, the instructions 2512 may embody one or more of the methods or logic as described herein. In a particular embodiment, the instructions 2512 may reside completely, or at least partially, within the memory 2504 and/or within the processor 2502 during execution by the computer system 2500. The memory 2504 and the processor 2502 also may include computer-readable media as discussed above.

The present disclosure contemplates a computer-readable medium that includes instructions 2512 or receives and executes instructions 2512 responsive to a propagated signal, so that a device connected to a network 2520 can communicate voice, video, audio, images or any other data over the network 2520. Further, the instructions 2512 may be transmitted or received over the network 2520 via a communication interface 2518. The communication interface 2518 may be a part of the processor 2502 or may be a separate component. The communication interface 2518 may be created in software or may be a physical connection in hardware. The communication interface 2518 is configured to connect with a network 2520, external media, the display 2514, or any other components in system 2500, or combinations thereof. The connection with the network 2520 may be a physical connection, such as a wired Ethernet connection or may be established wirelessly as discussed below. Likewise, the additional connections with other components of the system 2500 may be physical connections or may be established wirelessly.

The network 2520 may include wired networks, wireless networks, or combinations thereof. The wireless network may be a cellular telephone network, an 802.11, 802.16, 802.20, or WiMax network. Further, the network 2520 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system for improving efficiency of an electronic trading system comprising a plurality of hardware match engines coupled therewith, each of the plurality of hardware match engines implementing a market for an associated financial instrument comprising at least one component, each hardware match engine being operative to attempt to match an incoming order for a transaction for the associated financial instrument with at least one other previously received but unsatisfied order for a transaction counter thereto for the associated financial instrument, to at least partially satisfy one or both of the incoming order or the at least one other previously received order, the system comprising:

a first logic component, coupled with each of the plurality of hardware match engines, operative to receive match event data from each of the plurality of hardware match engines indicative of whether the hardware match engine was able to match an incoming order to that hardware match engine for at least one transaction for the associated financial instrument associated with that hardware match engine with at least one previously received but unsatisfied order for a transaction counter thereto for the associated financial instrument, in at least partial satisfaction of one or both of the incoming order or the at least one other previously received order;

the first logic component being further operative to, when the match event data indicates that the incoming order has not been fully satisfied, to attempt to identify a set of previously received but unsatisfied orders received by any of the plurality of match engines wherein, for any residual of each particular of the at least one component of the associated financial instrument of the incoming order, the set includes a previously received but unsatisfied order for a counter transaction for another financial instrument comprising at least the particular component to at least partially satisfy one or both of the residual of the particular component of the associated financial instrument of the incoming order or the component of the determined previously received order and wherein the first logic component is further operative to attempt to identify and include in the set, for any component of the financial instrument of any previously received but unsatisfied orders included in the set and not at least partially satisfied by any of the components of the associated financial instrument of the incoming order, another previously received but unsatisfied order for a counter transaction for a financial instrument including at least the component of the financial instrument of the previously received but unsatisfied order, such that the incoming order together with the set of previously received but unsatisfied orders, if the transactions for the financial instruments thereof were completed there between, includes no fully unsatisfied orders; and a second logic component operative to, when the incoming order together with the identified set of previously received but unsatisfied orders, if the components of the financial instruments thereof were completed there between, include no fully unsatisfied orders, generate, for each financial instrument of the incoming order and the set of previously received but unsatisfied orders, a set of unique synthetic counter orders, each for a transaction of another of the financial instruments of the incoming order and the set of previously received but unsatisfied orders comprising at least one component in common, and submit each synthetic counter order to the particular hardware match engine of the plurality of hardware match engines associated with the financial instrument for which the counter order is for.

2. A system for improving efficiency of an electronic trading system comprising a plurality of hardware match engines coupled therewith, each of the plurality of hardware match engines implementing a market for an associated financial instrument comprising at least one component, each hardware match engine being operative to attempt to match an incoming order for a transaction for the associated financial instrument with at least one other previously received but unsatisfied order for a transaction counter thereto for the associated financial instrument, to at least partially satisfy one or both of the incoming order or the at least one other previously received order, the system comprising:

an implicator coupled with each of the plurality of hardware match engines and operative to receive match event data from each of the plurality of hardware match engines indicative of whether the hardware match engine was able to match an incoming order to that hardware match engine for at least one transaction for the associated financial instrument associated with that hardware match engine with at least one previously received but unsatisfied order for a transaction counter thereto for the associated financial instrument, in at least partial satisfaction of one or both of the incoming order or the at least one other previously received order;

the implicator being further operative, when the match event data indicates that the incoming order has not been fully satisfied, to attempt to identify a set of previously received but unsatisfied orders received by any of the plurality of match engines wherein, for any residual of each particular of the at least one component of the associated financial instrument of the incoming order, the set includes a previously received but unsatisfied order for a counter transaction for another financial instrument comprising at least the particular component to at least partially satisfy one or both of the residual of the particular component of the associated financial instrument of the incoming order or the component of the determined previously received order and wherein the implicator is further operative to attempt to identify and include in the set, for any component of the financial instrument of any previously received but unsatisfied orders included in the set and not at least partially satisfied by any of the components of the associated financial instrument of the incoming order, another previously received but unsatisfied order for a counter transaction for a financial instrument including at least the component of the financial instrument of the previously received but unsatisfied order, such that the incoming order together with the set of previously received but unsatisfied orders, if the transactions for the financial instruments thereof were completed there between, includes no fully unsatisfied orders; and an order generator coupled with the implicator and operative to, when the incoming order together with the identified set of previously received but unsatisfied orders, if the components of the financial instruments thereof were completed there between, include no fully unsatisfied orders, generate, for each financial instrument of the incoming order and the set of previously received but unsatisfied orders, a set of unique synthetic counter orders, each for a transaction of another of the financial instruments of the incoming order and the set of previously received but unsatisfied orders comprising at least one component in common, and submit each synthetic counter order to the particular hardware match engine of the plurality of hardware match engines associated with the financial instrument for which the counter order is for.

3. The system of claim 2 wherein the financial instrument comprises more than one component.

4. The system of claim 2 wherein the financial instrument comprise one of a futures contract, an option contract, a spread contract, or combinations thereof.

5. The system of claim 2 wherein the incoming order further specifies a price, a quantity and an intent to one buy or sell the specified quantity of the financial instrument at the specified price.

6. The system of claim 2 wherein at least one of the other financial instruments of the previously received but unsatisfied orders is associated with a match engine different from the match engine associated with the financial instrument of the incoming order.

7. The system of claim 2 wherein the order generator is further operative to submit each synthetic order to the match engine associated with the financial instrument thereof.

8. The system of claim 7 wherein the match event data is further communicated to a plurality of market participants, the implicator being operative to attempt to identify the set of previously received but unsatisfied orders, generate the set of synthetic orders and submit each synthetic order to the match engine associated with the financial instrument thereof, prior to receipt by the associated match engine of an order generated by any one of the plurality of market participants response to the receipt of the match event data.

9. The system of claim 2 wherein the order generator is further operative to, when the incoming order together with the identified set of previously received but unsatisfied orders, if the transactions for the components of the financial instruments thereof were completed there between, includes at least one fully unsatisfied order, cause the unsatisfied portion of the incoming order to be treated as a previously received but unsatisfied order to await another subsequently received incoming order counter thereto for the associated financial instrument, in at least partial satisfaction of one or both of the subsequently received incoming order or the unsatisfied portion of the incoming order.

10. The system of claim 2 further comprising a memory coupled with the implicator and operative to store data indicative of the received match event data received from each match engine, the implicator being further operative to access the memory to facilitate the attempt to identify the set of previously received but unsatisfied orders.

11. The system of claim 2 wherein the implicator is operative to attempt to identify the set of previously received but unsatisfied orders based on an implied matching algorithm.

12. The system of claim 2 wherein, upon the identification by the implicator of more than one set of previously received but unsatisfied orders, the implicator is further operative to select one of the more than one set of previously received but unsatisfied orders for further generation of synthetic orders.

13. The system of claim 12 wherein the implicator is further operative to select the one of the more than one set of previously received but unsatisfied orders containing the least number of previously received but unsatisfied orders.

14. A computer implemented method for improving efficiency of an electronic trading system comprising a plurality of hardware match engines coupled therewith, each of the plurality of hardware match engines implementing a market for an associated financial instrument comprising at least one component, each hardware match engine being operative to attempt to match an incoming order for a transaction for the associated financial instrument with at least one other previously received but unsatisfied order for a transaction counter thereto for the associated financial instrument, to at least partially satisfy one or both of the incoming order or the at least one other previously received order, the method comprising:

receiving, by a processor coupled with the plurality of hardware match engines, match event data from each of the plurality of hardware match engines indicative of whether the hardware match engine was able to match an incoming order to that hardware match engine for at least one transaction for the associated financial instrument associated with that hardware match engine with at least one previously received but unsatisfied order for a transaction counter thereto for the associated financial instrument, in at least partial satisfaction of one or both of the incoming order or the at least one other previously received order;

attempting, when the match event data indicates that the incoming order has not been fully satisfied, to identify a set of previously received but unsatisfied orders received by any of the plurality of match engines wherein, for any residual of each particular of the at least one component of the associated financial instrument of the incoming order, the set includes a previously received but unsatisfied order for a counter transaction for another financial instrument comprising at least the particular component to at least partially satisfy one or both of the residual of the particular component of the associated financial instrument of the incoming order or the component of the determined previously received order and further attempting to identify and include in the set, for any component of the financial instrument of any previously received but unsatisfied orders included in the set and not at least partially satisfied by any of the components of the associated financial instrument of the incoming order, another previously received but unsatisfied order for a counter transaction for a financial instrument including at least the component of the financial instrument of the previously received but unsatisfied order, such that the incoming order together with the set of previously received but unsatisfied orders, if the transactions for the financial instruments thereof were completed there between, includes no fully unsatisfied orders; and generating, by the processor, when the incoming order together with the identified set of previously received but unsatisfied orders, if the components of the financial instruments thereof were completed there between, include no fully unsatisfied orders, for each financial instrument of the incoming order and the set of previously received but unsatisfied orders, a set of unique synthetic counter orders, each for a transaction of another of the financial instruments of the incoming order and the set of previously received but unsatisfied orders comprising at least one component in common, and submit each synthetic counter order to the particular hardware match engine of the plurality of hardware match engines associated with the financial instrument for which the counter order is for.

15. The method of claim 14 wherein the financial instrument comprises more than one component.

16. The method of claim 14 wherein the financial instrument comprise one of a futures contract, an option contract, a spread contract, or combinations thereof.

17. The method of claim 14 wherein the incoming order further specifies a price, a quantity and an intent to one buy or sell the specified quantity of the financial instrument at the specified price.

18. The method of claim 14 wherein at least one of the other financial instruments of the previously received but unsatisfied orders is associated with a match engine different from the match engine associated with the financial instrument of the incoming order.

19. The method of claim 14 further comprising submitting each synthetic order to the match engine associated with the financial instrument thereof.

20. The method of claim 19 wherein the match event data is further communicated to a plurality of market participants, the method further comprising attempting to identify the set of previously received but unsatisfied orders, generate the set of synthetic orders and submitting each synthetic order to the match engine associated with the financial instrument thereof, prior to receipt by the associated match engine of an order generated by any one of the plurality of market participants response to the receipt of the match event data.

21. The method of claim 14 further comprising causing, when the incoming order together with the identified set of previously received but unsatisfied orders, if the transactions for the components of the financial instruments thereof were completed there between, includes at least one fully unsatisfied order, the unsatisfied portion of the incoming order to be treated as a previously received but unsatisfied order to await another subsequently received incoming order counter thereto for the associated financial instrument, in at least partial satisfaction of one or both of the subsequently received incoming order or the unsatisfied portion of the incoming order.

22. The method of claim 14 further comprising storing data indicative of the received match event data received from each match engine, and accessing the memory to facilitate the attempt to identify the set of previously received but unsatisfied orders.

23. The method of claim 14 further comprising attempting to identify the set of previously received but unsatisfied orders based on an implied matching algorithm.

24. The method of claim 14 further comprises selecting, upon the identification by the implicator of more than one set of previously received but unsatisfied orders, one of the more than one set of previously received but unsatisfied orders for further generation of synthetic orders.

25. The method of claim 24 wherein the selecting further comprises selecting the one of the more than one set of previously received but unsatisfied orders containing the least number of previously received but unsatisfied orders.

26. A system for improving efficiency of an electronic trading system comprising a plurality of hardware match engines coupled therewith, each of the plurality of hardware match engines implementing a market for an associated financial instrument comprising at least one component, each hardware match engine being operative to attempt to match an incoming order for a transaction for the associated financial instrument with at least one other previously received but unsatisfied order for a transaction counter thereto for the associated financial instrument, to at least partially satisfy one or both of the incoming order or the at least one other previously received order, the system comprising:

means for receiving, coupled with the plurality of hardware match engines, match event data from each of the plurality of hardware match engines indicative of whether the hardware match engine was able to match an incoming order for at least one transaction for the associated financial instrument associated with that hardware match engine with at least one previously received but unsatisfied order for a transaction counter thereto for the associated financial instrument, in at least partial satisfaction of one or both of the incoming order or the at least one other previously received order;

means for attempting, when the match event data indicates that the incoming order has not been fully satisfied, to identify a set of previously received but unsatisfied orders received by any of the plurality of match engines wherein, for any residual of each particular of the at least one component of the associated financial instrument of the incoming order, the set includes a previously received but unsatisfied order for a counter transaction for another financial instrument comprising at least the particular component to at least partially satisfy one or both of the residual of the particular component of the associated financial instrument of the incoming order or the component of the determined previously received order and identifying and including in the set, for any component of the financial instrument of any previously received but unsatisfied orders included in the set and not at least partially satisfied by any of the components of the associated financial instrument of the incoming order, another previously received but unsatisfied order for a counter transaction for a financial instrument including at least the component of the financial instrument of the previously received but unsatisfied order, such that the incoming order together with the set of previously received but unsatisfied orders, if the transactions for the financial instruments thereof were completed there between, includes no fully unsatisfied orders; and means for generating, when the incoming order together with the identified set of previously received but unsatisfied orders, if the components of the financial instruments thereof were completed there between, include no fully unsatisfied orders, for each financial instrument of the incoming order and the set of previously received but unsatisfied orders, a set of unique synthetic counter orders, each for a transaction of another of the financial instruments of the incoming order and the set of previously received but unsatisfied orders comprising at least one component in common, and submit each synthetic counter order to the particular hardware match engine of the plurality of hardware match engines associated with the financial instrument for which the counter order is for.

* * * * *